(12) United States Patent
Katsuyama

(10) Patent No.: US 6,632,312 B1
(45) Date of Patent: Oct. 14, 2003

(54) METHOD FOR MANUFACTURING TUBULAR FILM

(75) Inventor: Hitoshi Katsuyama, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 258 days.

(21) Appl. No.: 09/713,237

(22) Filed: Nov. 16, 2000

(30) Foreign Application Priority Data

Nov. 22, 1999 (JP) .......................................... 11-332065
Oct. 30, 2000 (JP) ....................................... 2000-331056

(51) Int. Cl.⁷ ............................................. B32B 31/00
(52) U.S. Cl. ....................... 156/194; 156/184; 156/191; 156/245
(58) Field of Search ................. 156/184, 189, 156/191, 194, 242, 245

(56) References Cited

U.S. PATENT DOCUMENTS

| | | | | |
|---|---|---|---|---|
| 2,988,968 A | * | 6/1961 | Bodendoerfer | 493/156 |
| 3,148,102 A | * | 9/1964 | Eakins | 156/161 |
| 4,174,243 A | * | 11/1979 | Magarian | 156/175 |
| 4,604,307 A | * | 8/1986 | Spreeuwers | 428/34.2 |
| 4,959,109 A | * | 9/1990 | Swain et al. | 156/73.4 |
| 5,071,506 A | * | 12/1991 | Nelson et al. | 156/441 |
| 5,944,930 A | | 8/1999 | Takeuchi et al. | 156/218 |
| 5,968,300 A | * | 10/1999 | Shimura et al. | 156/190 |
| 6,132,815 A | * | 10/2000 | Takahashi et al. | 427/553 |

FOREIGN PATENT DOCUMENTS

| | | | |
|---|---|---|---|
| CN | 87100385 | | 1/1987 |
| CN | 1128700 | | 11/1995 |
| GB | 2188280 A | * | 9/1987 |
| JP | 3-297715 A | * | 12/1991 |
| JP | 4-133084 A | * | 5/1992 |
| JP | 5-307291 | | 11/1993 |
| JP | 8-187773 | | 7/1996 |
| JP | 10-16093 | | 1/1998 |

* cited by examiner

Primary Examiner—Jeff H. Aftergut
(74) Attorney, Agent, or Firm—Fitzpatrick, Cella, Harper & Scinto

(57) ABSTRACT

A tubular film manufacturing method includes the steps of winding a sheet film on a cylindrical member, cutting a winding end portion of the sheet film, and inserting the cylindrical member, on which the sheet film is wound, into a tubular mold member. The sheet film is molded into a tubular film by heating. In the inserting step, the cylindrical member is inserted into the tubular mold member while the winding end portion of the sheet film is pressed by an elastically deformable brush member.

1 Claim, 48 Drawing Sheets

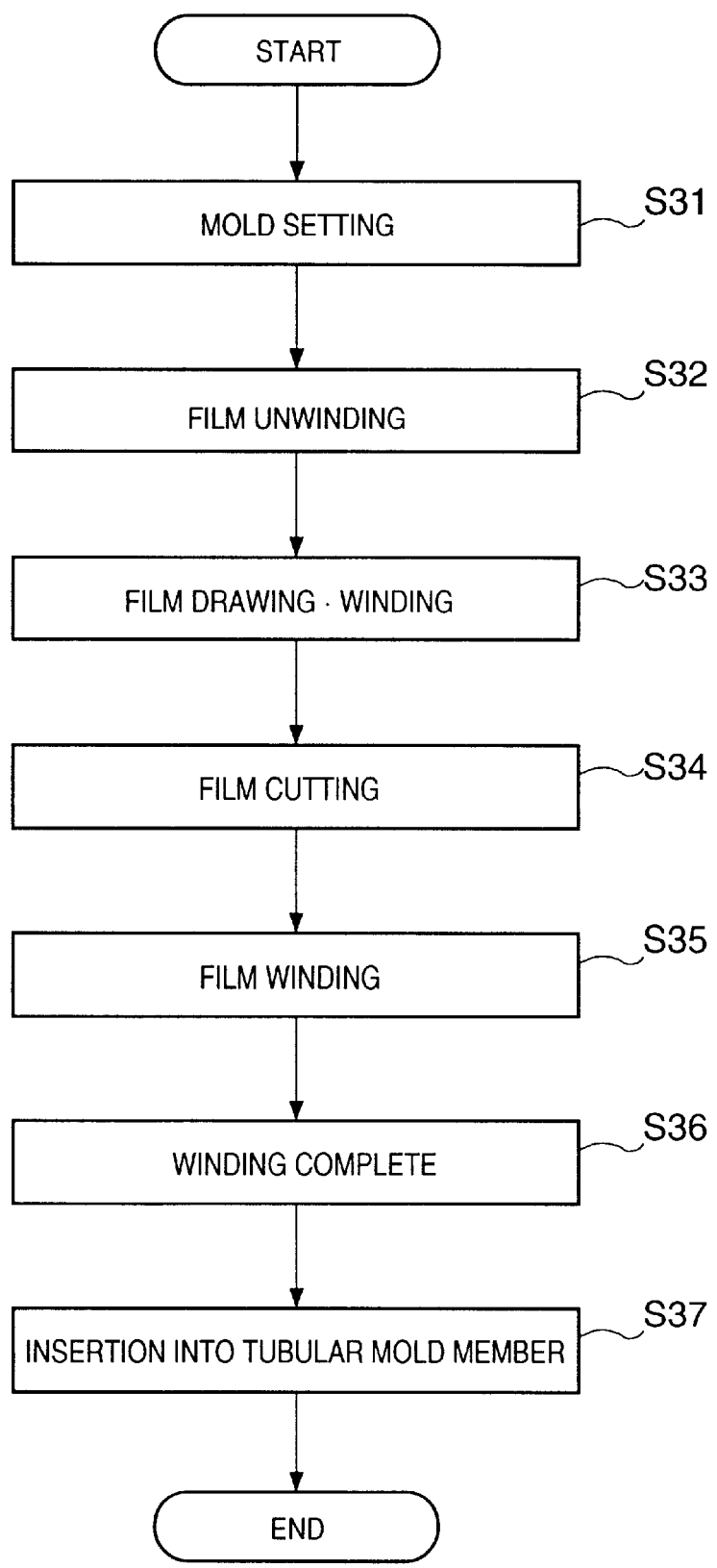

METHOD FOR MANUFACTURING TUBULAR FILM

FIELD OF THE INVENTION

The present invention relates to a method and apparatus for manufacturing annular, tubular, cylindrical, and belt-like films used as a conveyor belt for conveying precision parts to a predetermined position with high positional accuracy, and a closed package for packaging or containing goods.

The present invention is principally used as functional parts of an image forming apparatus.

BACKGROUND OF THE INVENTION

A conventional tubular film manufacturing method and apparatus for forming a sheet film into a tubular film use a heating furnace as a film heating means as proposed in Japanese Patent Laid-Open No. 8-187773.

In this prior art, however, a cylindrical member on which a sheet film is wound and a tubular mold member are placed in a heating furnace held at a certain predetermined temperature. Therefore, the heat is conducted from the tubular mold member as an outer member, so it takes a long time for the film and the cylindrical member to reach the temperature necessary for molding.

Also, since the heat is conducted from the tubular mold member as an outer member, this tubular mold member expands first by the heat to increase the gap with respect to the film wound on the cylindrical member. This makes the conduction of heat to the film and the cylindrical member more and more difficult. Consequently, it takes a long time to reach the necessary molding temperature.

Additionally, in the technique disclosed in Japanese Patent Laid-Open No. 8-187773, the tubular mold member and the cylindrical member used in heat-molding have straight shapes.

FIG. 19 shows the shapes of the conventional tubular mold member and cylindrical member. A sheet film 1006 is wound on a cylindrical member 1002 having a constant outside diameter. This sheet film 1006 wound on the cylindrical member 1002 is inserted into a tubular mold member 1004 and molded by heating. After that, the film formed into the shape of a tube is peeled from the tubular mold member 1004 and cut into a predetermined size to complete a tubular film.

In this prior art, however, the workability of the operation of winding the sheet film on the cylindrical member is low, and this operation cannot be easily automated.

Also, when the tubular film is peeled from the tubular mold member after the heat-molding step, the workability is very low because the tubular film is sticking to the inner surface of the tubular mold member and there is no portion to start peeling. This operation is also difficult to automate.

Ribs can be formed on the inner circumferential surface at the two end portions of the tubular film to prevent meandering of the film when the film is incorporated into a product. When this is the case, ribs must be adhered in a post-process.

Conventionally, to cut a tubular film an operator cuts the two ends of the film by using a cutter or the like.

Also, a method disclosed in Japanese Patent Laid-Open No. 5-307291 is known as a method of extending wrinkles of a film.

In these prior art references, however, it is difficult to cut the end portions of a tubular film perpendicularly to the edge line of the film. Also, a tubular film is creased when cut. Furthermore, since wrinkles produced on a tubular film when the film is cut cannot be removed, the end portions of the film cannot be linearly cut.

No effective means has been proposed which extends wrinkles of a tubular film with high workability or without complicating the apparatus.

Conventionally, when a tubular film is manufactured by winding a sheet film on a cylindrical member, as shown in FIG. 36, the end portion of a sheet film 1006 is temporarily fastened by adhesive tapes 1008 or the like so as to prevent displacement from the outer circumferential surface of a cylindrical member 1002. If the end portion of the sheet film is not fixed to the cylindrical member, the sheet film is loosely wound to produce winding displacement or wrinkles. Consequently, no tubular film having a desired thickness can be obtained after molding.

Also, as disclosed in Japanese Patent Laid-Open No. 10-16093, a suction portion can be formed over the entire width on the outer circumferential surface of a cylindrical member on which a sheet film is wound.

In the former prior art, however, when the adhesive tapes are peeled after the sheet film is wound on the cylindrical member, the sheet film sometimes breaks, and the operation of peeling is troublesome. This makes the operation difficult to automate.

The method disclosed in Japanese Patent Laid-Open No. 10-16093 has the following problem. The sheet film wound on the cylindrical member is inserted into a tubular mold member in the subsequent step and molded into a tubular film by heating. However, since suction holes are formed over the entire width in the outer circumferential surface of the cylindrical member, portions of the film on these suction holes enter the holes during heat-molding. This forms projections as functional defects in the product.

SUMMARY OF THE INVENTION

The present invention, therefore, has been made in consideration of the above situation, and has as its object to provide a manufacturing method and apparatus capable of obtaining a high-accuracy tubular film at low cost by performing molding within a short time period.

It is another object of the present invention to provide a manufacturing method and apparatus capable of obtaining a high-accuracy tubular film at low cost by automatization.

It is still another object of the present invention to provide a cutting apparatus having good workability and capable of accurately cutting end portions of a tubular film at low cost.

It is still another object of the present invention to provide a manufacturing method and apparatus capable of obtaining a high-accuracy tubular film at low cost by automatizing winding of a sheet film.

To solve the above conventional problems and achieve the objects, a tubular film manufacturing method according to the present invention is a tubular film manufacturing method of winding a thermoplastic sheet film on a cylindrical member, fitting a tubular mold member on the outside of the wound film, and heating the film together with the cylindrical member and the tubular mold member, thereby molding the sheet film into a tubular film, characterized in that heating means is placed in a central portion of the cylindrical member to heat the cylindrical member from the central portion and join winding start and end portions of the film.

A tubular film manufacturing apparatus of the present invention is a tubular film manufacturing apparatus for winding a thermoplastic sheet film on a cylindrical member, fitting a tubular mold member on the outside of the wound film, and heating the film together with the cylindrical member and the tubular mold member, thereby molding the sheet film into a tubular film, characterized in that heating means is placed in a central portion of the cylindrical member to heat the cylindrical member from the central portion and join winding start and end portions of the film.

A tubular film manufacturing method according to the present invention is a tubular film manufacturing method of winding a thermoplastic sheet film on a cylindrical member, fitting a tubular mold member on the outside of the wound film, and heating the film together with the cylindrical member and the tubular mold member, thereby molding the sheet film into a tubular film, characterized in that the outer diameter at two end portions of the cylindrical member is made smaller than the outer diameter at a central portion thereof, and the length in an axial direction of the central large-diameter portion is made shorter than the width of the sheet film.

A tubular film cutting apparatus according to the present invention is a tubular film cutting apparatus for cutting two end portions of a tubular film, characterized by comprising a rotatable support member for supporting an inner-diameter portion of the tubular film, a driving source for rotating the support member, a first roller capable of contacting the support member, a second roller disposed downstream of the first roller along a rotating direction of the support member, and a cutting blade capable of moving back and forth with respect to the tubular film mounted on the support member.

A tubular film manufacturing method according to the present invention is a tubular film manufacturing method of winding a thermoplastic sheet film on a cylindrical member, fitting a tubular mold member on the outside of the wound film, and heating the film together with the cylindrical member and the tubular mold member, thereby molding the sheet film into a tubular film, characterized in that the sheet film has a width larger than a functionally necessary length of the tubular film, and a winding start portion of the sheet film is held by suction holes formed in an outer circumferential surface at two end portions of the cylindrical member.

A tubular film manufacturing apparatus according to the present invention is a tubular film manufacturing apparatus for winding a thermoplastic sheet film on a cylindrical member, fitting a tubular mold member on the outside of the wound film, and heating the film together with the cylindrical member and the tubular mold member, thereby molding the sheet film into a tubular film, characterized in that the sheet film has a width larger than a functionally necessary length of the tubular film, and suction holes for holding a winding start portion of the sheet film are formed in an outer circumferential surface at two end portions of the cylindrical member.

A tubular film according to the present invention is characterized in that a sheet film member is wound on a cylindrical member and loaded into a tubular member with two ends of the sheet film member overlapped, and the wound sheet film is heated while being rotated together with the tubular member, thereby welding the two overlapped end portions and molding the sheet film into a tubular film.

A tubular film according to the present invention is characterized in that a sheet film is wound on a cylindrical member and loaded into a tubular member with two ends of the sheet film member overlapped, open ends of the wound film member are narrowed, and the wound film member is heated to weld the overlapped portions, thereby molding the film member into a tubular film and the narrowed end portions into ribs.

A tubular film according to the present invention is characterized in that a film member is wound on a cylindrical member having an inclined portion in at least one end portion thereof such that two end portions of the film member overlap each other, the wound film member is loaded into a tubular member and heated to weld the overlapped portions with an end portion of the wound film aligned with the inclined portion of the cylindrical member, thereby molding the wound film member into a tubular film and the inclined portion of the film into a rib.

A tubular film manufacturing apparatus according to the present invention is characterized by comprising a cylindrical member having an inclined portion in at least one end portion, a tubular member for loading the cylindrical member having a sheet film wound on it, the tubular member having an inclined portion corresponding to the inclined portion of the cylindrical member, and heating means for heat-welding the film, wherein the inclined portion of the cylindrical member can be divided.

A tubular film manufacturing apparatus according to the present invention is characterized by comprising a cylindrical member having a stepped portion in at least one end portion, a tubular member for loading the cylindrical member having a sheet film wound on it, the tubular member having a stepped portion corresponding to the stepped portion of the cylindrical member, and heating means for heat-welding the film, wherein the stepped portion of the cylindrical member can be divided.

A tubular film according to the present invention is characterized in that end portions of a sheet film are joined to form a tubular film, and end portions of the tubular film are cut while the tubular film is rotated.

A tubular film cutting method according to the present invention is characterized in that a tubular film is fitted on a rotary member and rotated, a portion of the film is extended on the surface of the rotary member, and the extended portion of the film is cut by a cutting blade.

A tubular film cutting apparatus according to the present invention is a tubular film cutting apparatus characterized by comprising a rotary member for fitting a tubular film on it, pressing means for pressing the tubular film against the rotary member, and cutting means for cutting the tubular film pressed against the rotary member by the pressing means.

A tubular film manufacturing method according to the present invention is a tubular film manufacturing method of winding a sheet film on a cylindrical member, loading the sheet film into a tubular member, and heating the sheet film to form a tubular film, characterized in that the sheet film is wound on the cylindrical member by holding an end portion of the sheet film to the cylindrical member by suction.

A fitting method according to the present invention is a method of winding a sheet film on a cylindrical member and fitting a tubular member on the outside of the cylindrical member having the film wound on it, characterized in that the tubular member is fitted on the cylindrical member while a winding end portion of the film is pressed by an elastically deformable press member which deforms in accordance with the shape of an end portion of the tubular member.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 31 is a flow chart showing an outline of the operation of the fourth embodiment;

DETAILED DESCRIPTION OF THE PREFERRED EMBODIMENTS

Preferred embodiments of the present invention will be described in detail below with reference to the accompanying drawings.

First Embodiment

Figure 1:
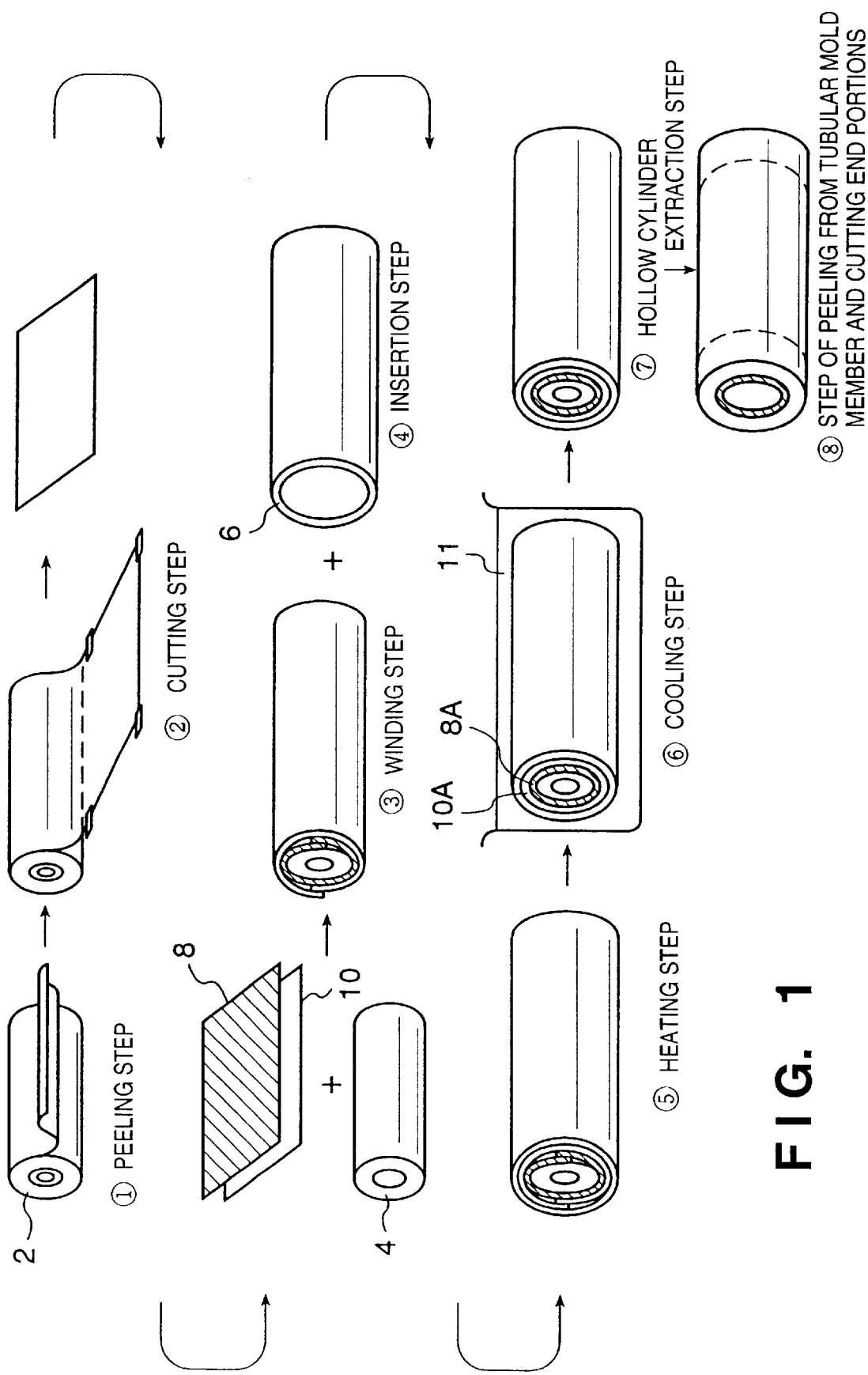
FIG. 1 is a view showing the whole manufacturing process of a tubular film.

FIG. 1 is a view showing tubular film manufacturing steps. Reference numeral 2 denotes a thermoplastic resin film wound into the shape of a roll; 4, a hollow cylindrical member; 6, a tubular member; 8 and 10, thermoplastic resin sheet films; 8A and 10A, thermoplastic resin tubular films; and 11, a cooling unit. This cooling unit 11 uses tap water stored in a water tank as a coolant. However, it is also possible to use cooling air or some other liquid provided that the liquid does not invade the hollow cylinder, tubular film, and tubular mold member.

The material of the hollow cylindrical member 4 must have a thermal expansion coefficient larger than that of the material of the tubular mold member 6.

Examples of the thermoplastic resin material of the sheet film are polyethylene, polypropylene, polymethylpentene-1, polystyrene, polyamide, polycarbonate, polysulfone, polyallylate, polyethyleneterephthalate, polybutyleneterephthalate, polyphenylenesulfide, polyethersulfone, polyethernitrile, a thermoplastic polyimide-based material, polyetheretherketone, a thermotropic liquid crystal polymer, polyamide acid, and a fluorine-based resin. It is also possible to use a film formed by blending, in any of these resin materials, at least one type of a fine organic or inorganic powder to improve the heat resistance and impart electrical conductivity and thermal conductivity.

One practical example will be described below.

The dimensions of a sheet film are selected in accordance with the inner diameter of a tubular film to be manufactured, and the sizes of the hollow cylindrical member 4 and the tubular mold member 6 are chosen accordingly. Referring to FIG. 1, the thermoplastic resin film 2 wound into the shape of a roll is peeled from the roll in peeling step ①  and cut in cutting step ②, thereby forming the sheet film 8. Similarly, the sheet film 10 is formed from another type of a film having a different composition.

In winding step ③, the prepared sheet film 8 is wound on the outer circumferential surface of the hollow cylindrical member 4 such that the two ends of the film 8 overlap each other. The width of these overlapped portions of the two ends of the film 8 is approximately 4.0 mm.

Subsequently, the prepared sheet film 10 is wound on the outer circumferential surface of the hollow cylindrical member 4 on which the film 8 is wound, so that the two ends of the film 10 overlap each other and these overlapped portions come to a position opposite to the overlapped portions of the film 8. The width of these overlapped portions of the two ends of the film 10 is also approximately 4.0 mm.

In insertion step ④, the films 8 and 10 wound on the hollow cylindrical member 4 are inserted together with this hollow cylindrical member 4 into the hollow of the tubular mold member 6.

In heating step ⑤, the hollow cylindrical member 4, the films 8 and 10, and the tubular mold member 6 are placed in a heating apparatus and heated. The heating time is determined on the basis of the melting temperatures of the film materials and the heat deterioration characteristics of the films. The temperatures of the hollow cylindrical member 4, the films 8 and 10, and the tubular mold member 6 rise by heating, and the hollow cylindrical member 4 and the tubular mold member 6 expand in accordance with their respective thermal expansion coefficients. The films 8 and 10 begin softening as their temperatures rise.

The hollow cylindrical member 4 and the tubular mold member 6 start expanding as their temperatures rise as described above. Since, however, the thermal expansion coefficient of the material of the hollow cylindrical member 4 is larger than that of the material of the tubular mold member 6, the dimensional gap between the outside diameter of the hollow cylindrical member 4 and the inside diameter of the tubular mold member 6 becomes narrower than that in the initial low-temperature state. As the gap between the hollow cylindrical member 4 and the tubular mold member 6 narrows, the films 8 and 10 sandwiched between them further soften.

When the films soften, the overlapped portions of the two ends of each film extend in the circumferential direction of the hollow cylindrical member 4 as the gap reduces, and the overlapped portions weld and join together. The films 8 and 10 also weld and join into a single tubular film.

The gap between the hollow cylindrical member 4 and the tubular mold member 6 finally becomes the same as the desired film thickness, and there is no step in the overlapped portions. This makes the film thickness uniform.

After the heating time described above has elapsed, heating is stopped and a cooling step starts. In this cooling step, the hollow cylindrical member 4, the tubular films 8A and 10A, and the tubular mold member 6 can be naturally cooled after heating is stopped. However, these components can also be rapidly cooled to reduce the cooling time.

In this example, after being heated these components are cooled by dipping them into tap water in a water tank as shown in cooling step ⑥. When the temperature becomes a cooling temperature close to room temperature by this cooling, the hollow cylindrical member 4 is extracted from the tubular mold member 6 in hollow cylinder extraction step ⑦. In this state, the films are sticking, in the form of a cylinder, to the inner surface of the tubular mold member 6, and the overlapped portions of the initial sheet films are joined. Depending on the materials of the films, water cooling is performed after air cooling, or only air cooling is performed. In either case, rapid cooling can be performed after the resins are cooled to a temperature at which they solidify.

Finally, the film is peeled from the tubular mold member 6 in step ⑧, and the tubular film is completed in an end portion cutting step.

Figure 2:
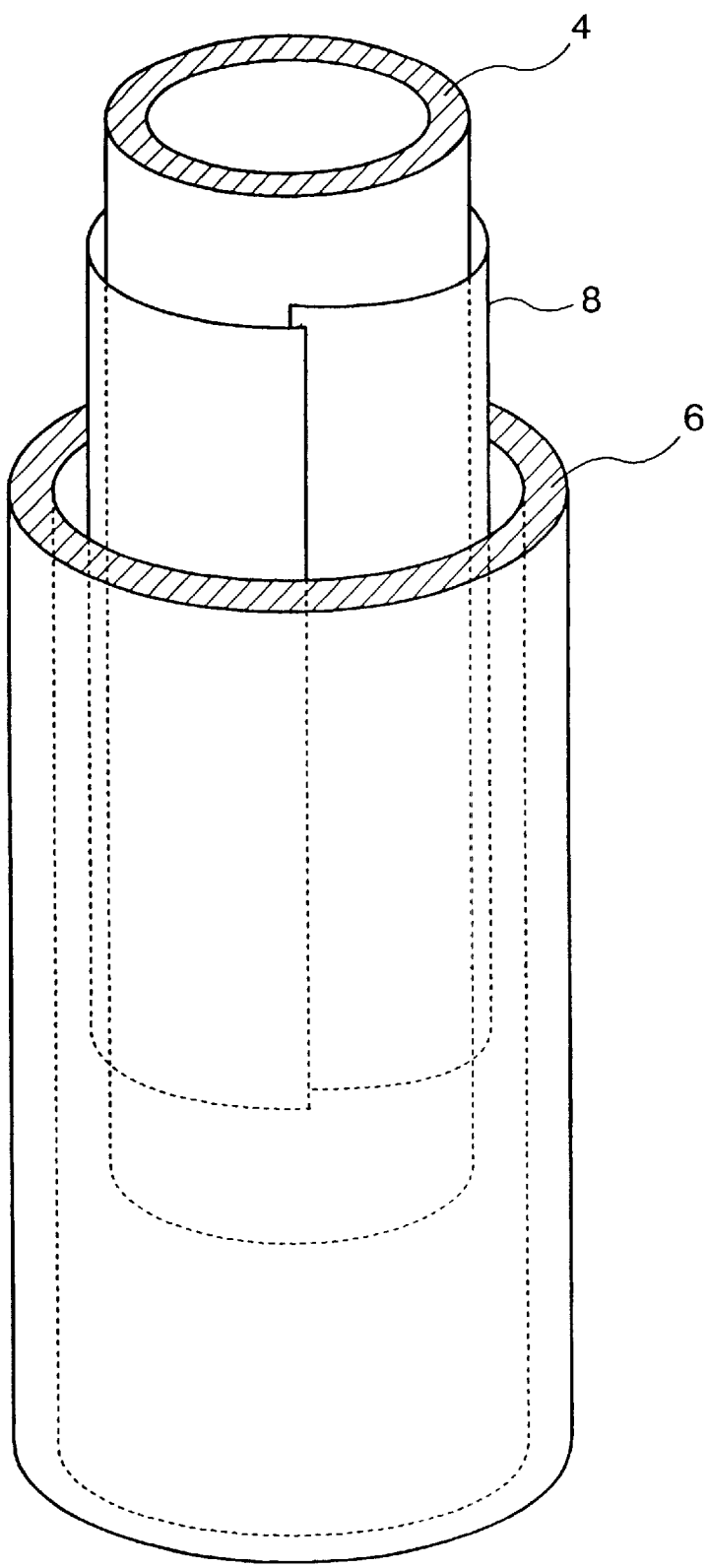
FIG. 2 is a view showing a hollow cylindrical member, tubular mold member, and sheet film used in the first embodiment.

FIG. 2 shows the hollow cylindrical member 4, the tubular mold member 6, and the sheet film 8 used in this embodiment.

Figure 3:
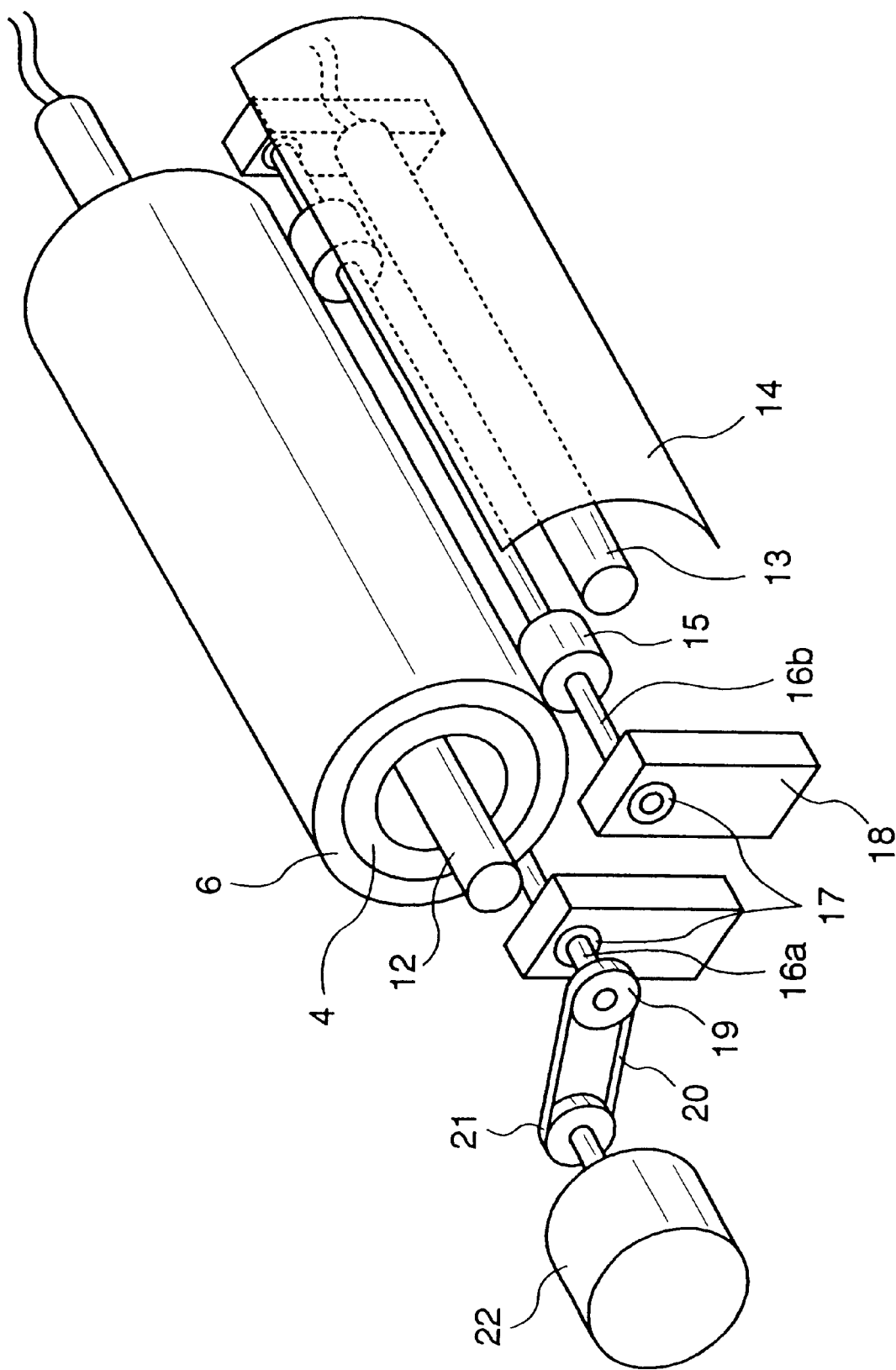
FIG. 3 is a perspective view showing a heating apparatus.

FIG. 3 is a view showing the heating apparatus of this embodiment.

The hollow cylindrical member 4 and the tubular mold member 6 are united and held by four rollers 15. These rollers 15 are made of a heat-insulating material and fitted on shafts 16a and 16b. The two ends of each of these shafts 16a and 16b are rotatably supported by bearings 17 which are fixed on a base plate (not shown) by blocks 18.

A chain sprocket 19 is attached to one end of the shaft 16a of the pair of shafts 16a and 16b. This chain sprocket 19 transmits the rotational driving force of a motor 22 via a chain 20 and a motor chain sprocket 21, thereby rotating the shaft 16a and the rollers 15.

A heater 12 is inserted inside the hollow cylindrical member 4. Heat radiated from this heater 12 heats the interior of the hollow cylindrical member 4 and is conducted to the films 8 and 10. The materials are so selected that the thermal expansion coefficient of the hollow cylindrical member 4 is larger than that of the tubular mold member 6. Since the films are heated from inside the hollow cylindrical member 4 and the amount of thermal expansion of this hollow cylindrical member 4 is large, the outer circumferential surface of the hollow cylindrical member 4 and the film surface closely contact each other. This efficiently conducts heat to these films.

The combination of the materials of the hollow cylindrical member and the tubular mold member is determined such that the thermal expansion coefficient of the hollow cylindrical member is larger than that of the tubular mold member. For example, the hollow cylindrical member is made of aluminum and the tubular mold member is made of iron such as stainless steel or carbon steel for mechanical structures, or the hollow cylindrical member is made of a heat-resistant resin such as Teflon and the tubular mold member is made of aluminum or iron.

The dimensions of the hollow cylindrical member and the tubular mold member are determined by the dimensions of a completed tubular film. If a tubular film molded by cooling after being heated sticks to the inner surface of the tubular mold member, the inner diameter of the tubular mold member is determined by the circumferential length of the tubular film. If a tubular film molded by cooling after being heated adheres to the outer surface of the hollow cylindrical member, the outer diameter of the hollow cylindrical member is determined by the circumferential length of the tubular film. After that dimension of a member which determines the circumferential length of a tubular film is thus determined, the dimension of the counterpart is determined from the gap amount at the molding temperature.

A heater 13 is placed apart from the outer circumferential surface of the tubular mold member 6. Also, a reflecting plate 14 is positioned at the back, when viewed from the tubular mold member 6, of this heater 13. This reflecting plate 14 efficiently radiates heat from the heater 13 toward the tubular mold member 6.

The amount of thermal expansion of the tubular mold member 6 is smaller than that of the hollow cylindrical member 4. Hence, heat conducted from inside the hollow cylindrical member 4 by the heater 12 and heat conducted from the outer circumferential surface of the tubular mold member 6 by the heater 13 are efficiently conducted to the films.

Figure 4:
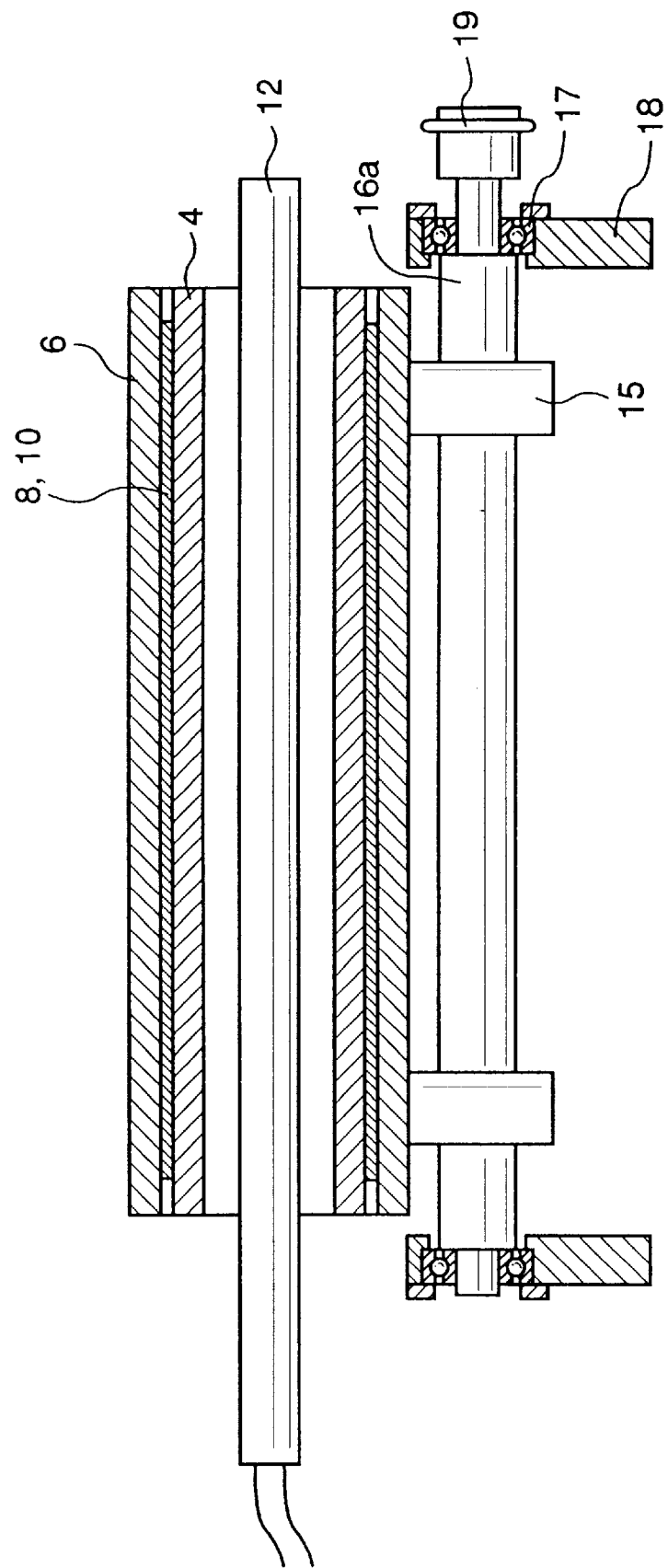
FIG. 4 is a front sectional view of the heating apparatus.
Figure 5:
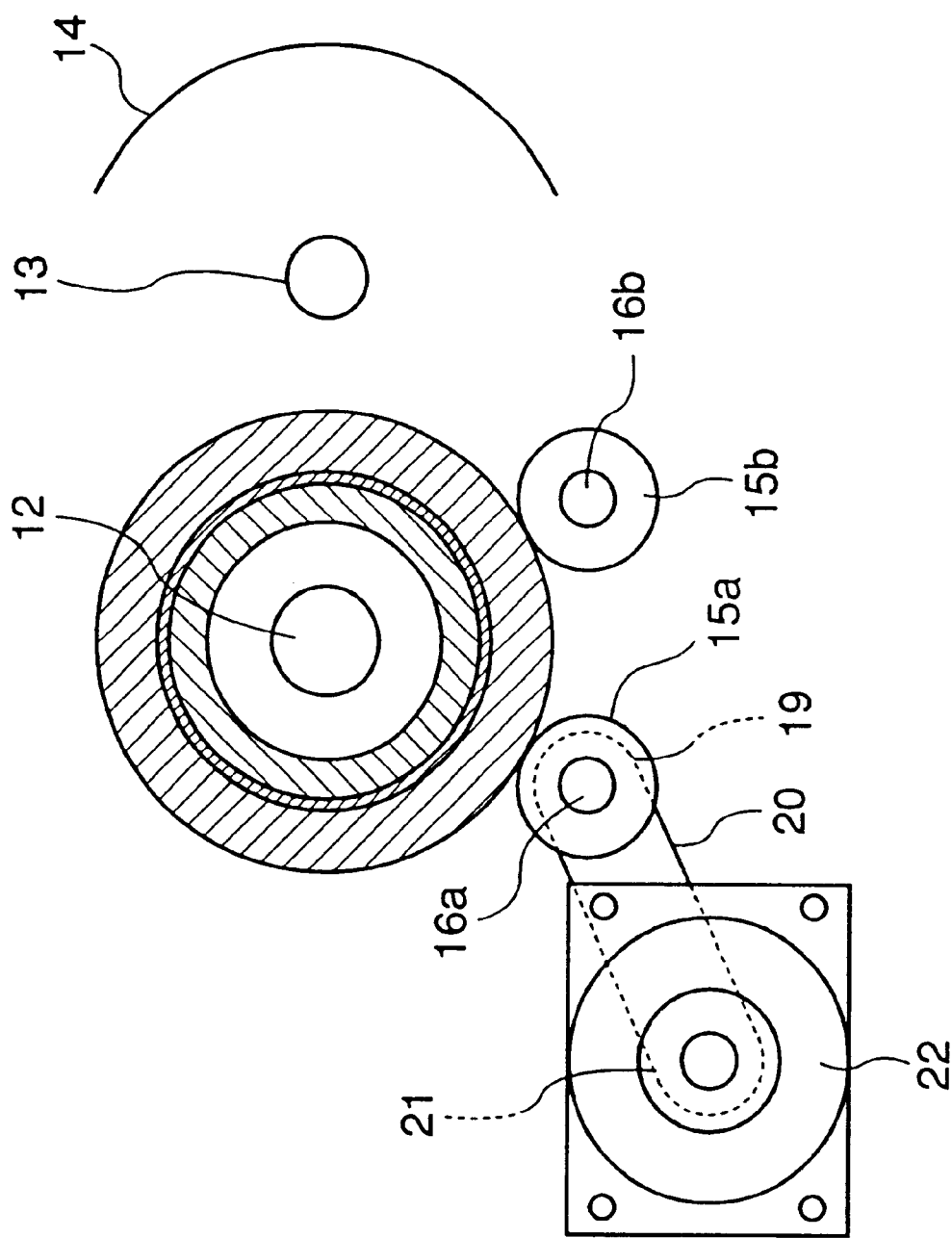
FIG. 5 is a side view of the heating apparatus.

FIG. 4 is a front sectional view of the heating apparatus. FIG. 5 is a side view of the heating apparatus.

The rotational driving force of the motor 22 is transmitted only to the shaft 16a, and the shaft 16b is a driven shaft.

When the shaft 16a rotates, rollers 15a fitted on the shaft 16a rotate, and the frictional force between the outer circumferential surface of the tubular mold member 6 and the rollers 15a rotates the tubular mold member 6. Accordingly, the films 8 and 10 and the hollow cylindrical member 4 also rotate. Although the rotational speed depends on the outside diameter of the tubular mold member 6, it is desirably 10 rpm or more. The higher the rotational speed, the smaller the heating unevenness, although it depends upon the arrangement of the heaters.

With this arrangement, no heating unevenness is produced even when the mounting position of the heater 12 is offset from the center of the hollow cylindrical member 4. Also, the outer circumferential surface of the tubular mold member 6 can be evenly heated although the heater 13 heats only from one side. The capacity of the heater is determined on the basis of the heat capacity and heating time resulting from the materials of the tubular mold member and hollow cylindrical member. More specifically, in this embodiment the mold weight (g) and the specific heat and heat capacity of the mold material are calculated. The power (W) is calculated in accordance with the heating rate (° C./min), and the heater capacity is calculated on the basis of the heating efficiency (about 50% for lamp heating). In this embodiment, PvdF resin (polyvinylidene fluoride: a fluorine-based resin) is used as the sheet film material, and the temperature is raised from 25° C. to 195° C. over 3 min. Since a resin material deteriorates when heated, the heating time is preferably as short as possible. Therefore, an infrared heater capable of short-time heating is desirable as the heater. Also, to improve the heating efficiency, the outer circumferential surface of the tubular mold member heated by using the external heater as a principal heat source and the inner circumferential surface of the hollow cylindrical member heated by using the internal heater as a main heat source are desirably blackened with a black paint or by plating.

Since heating is evenly performed from both inside and outside, heat is conducted to the films and the molding temperature is reached within short time periods. Therefore, a tubular film can be manufactured at low cost.

A tubular film manufactured by the tubular film manufacturing apparatus of this embodiment is used as a transfer belt of a copying machine, printer, or the like. One form of use will be described below with reference to FIG. 6.

Figure 6:
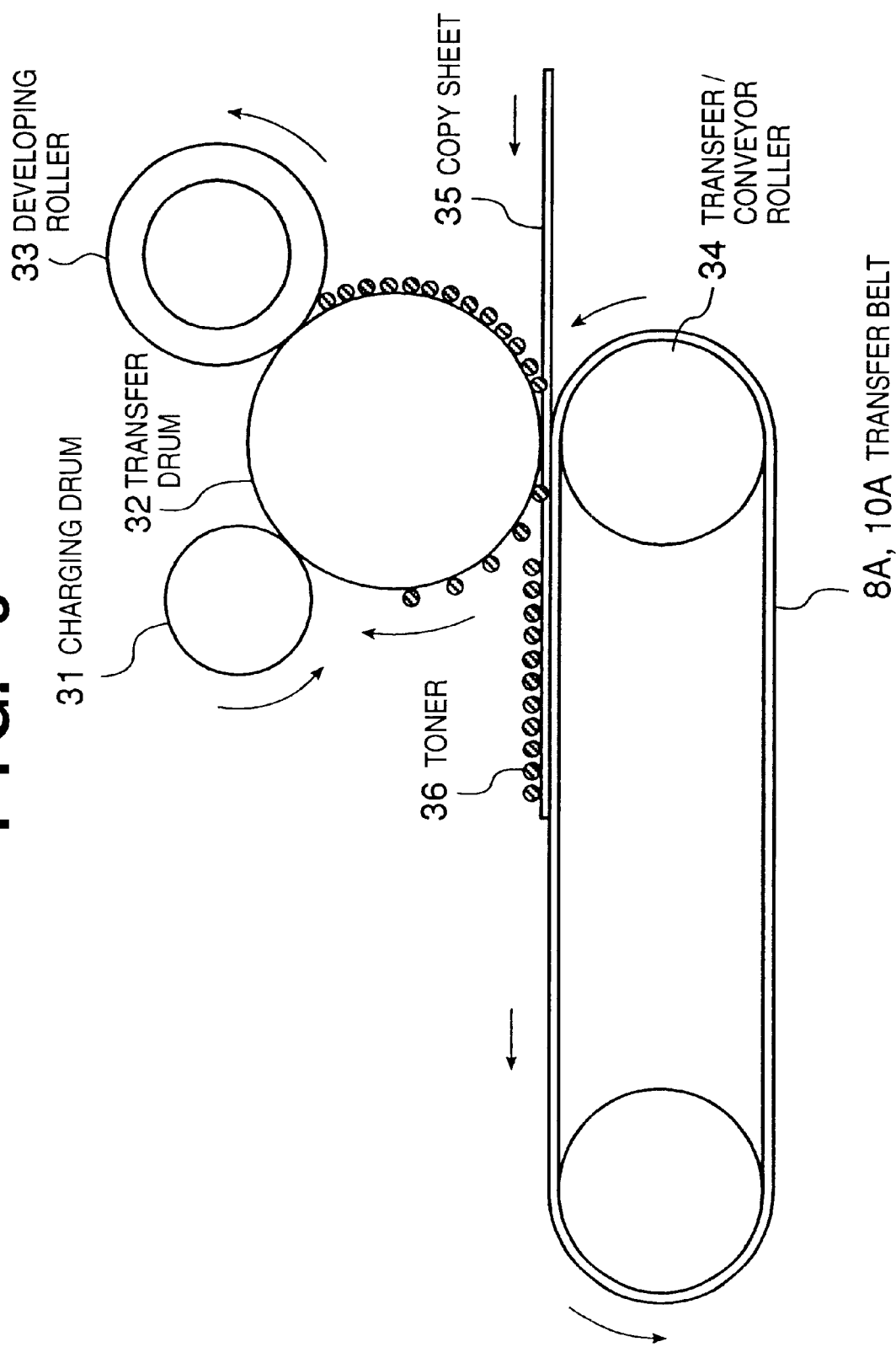
FIG. 6 is a view showing the form of use of a tubular film manufactured by a manufacturing apparatus of the first embodiment.

In FIG. 6, reference numerals 8A and 10A denote a transfer belt which is a tubular film manufactured by this embodiment; 31, a charging drum; 32, a transfer drum; 33, a developing roller; 34, a transfer/conveyor roller; 35, a copy sheet; and 36, toner. The transfer belt 8A, 10A is wound on the conveyor roller 34. First, the charging drum 31 applies the voltage of an image to the transfer drum 32. The developing roller 33 supplies toner to the transfer drum 32, and the toner is transferred in the form of the image. In this state, the transfer belt 8A, 10A has already supplied the copy sheet 35, so the toner is transferred from the transfer drum onto the copy sheet. This copy sheet on which the toner is transferred is conveyed to a fixing unit (not shown).

In this embodiment as described above, the heating means is placed in the center of the hollow cylindrical member, so molding can be performed within short time periods.

Also, the thermal expansion coefficient of the material of the hollow cylindrical member is larger than that of the material of the tubular mold member, so the hollow cylindrical member, tubular mold member, and films tightly contact each other. Accordingly, heat can be efficiently conducted to the films.

Additionally, another heating means is placed apart from the tubular mold member to oppose the outer circumferential surface of the tubular mold member. This can further shorten the molding time.

Furthermore, the tubular mold member is supported together with the cylindrical member by the rollers made of a heat-insulating material. Since the tubular mold member and the cylindrical member are heated while being rotated by rotating the rollers by the rotating means, the overlapped portions at the winding start and end positions of films can be joined without producing any heating temperature unevenness. Consequently, a tubular film having high film thickness uniformity can be manufactured.

The tubular film manufacturing apparatus according to this embodiment is constructed as above and hence can mold a tubular film within a short time period. Accordingly, a high-accuracy tubular film can be obtained at low cost.

Second Embodiment

The second embodiment will be described below.

Figure 7:
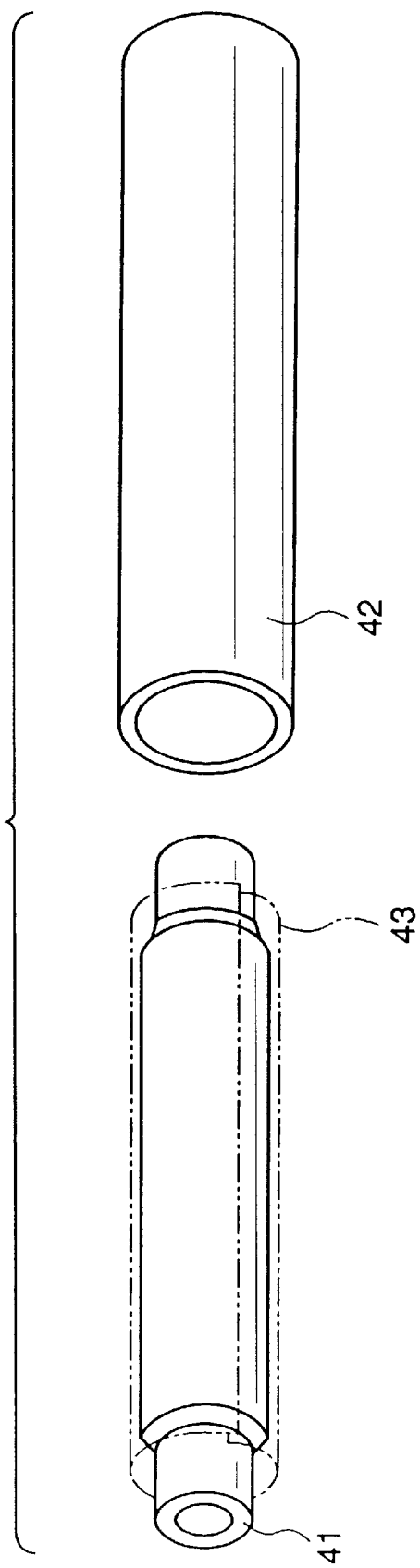
FIG. 7 is a view showing a cylindrical member, tubular mold member, and sheet film used in the second embodiment.

FIG. 7 is a view showing a cylindrical member 41, a tubular mold member 42, and a sheet film 43. The sheet film 43 is wound on the outer circumferential surface of the cylindrical member 41, inserted into the tubular mold member 42, and heat-molded into a tubular film by a heating apparatus (not shown).

Figure 8:
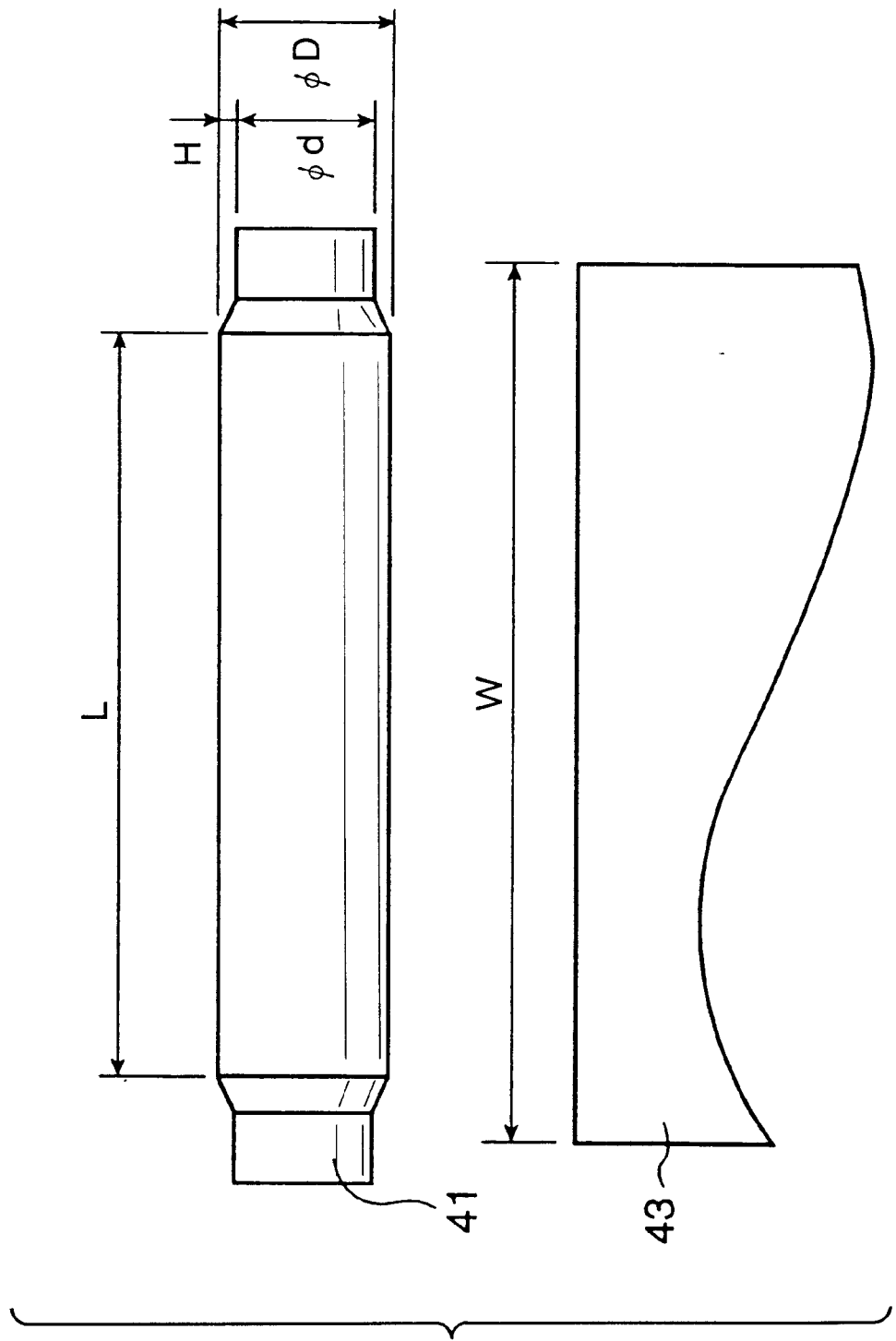
FIG. 8 is a view showing the cylindrical member and sheet film used in the second embodiment.

FIG. 8 shows the cylindrical member 41. An outer diameter $\phi D$ of a central portion is determined in accordance with the necessary diameter of a tubular film. A length L in the axial direction of the central portion having this outer diameter $\phi D$ is shorter than a width W of the sheet film 43. Also, the two end portions have an outer diameter $\phi d$ smaller than the outer diameter $\phi D$, and their stepped portions are tapered.

Figure 9:
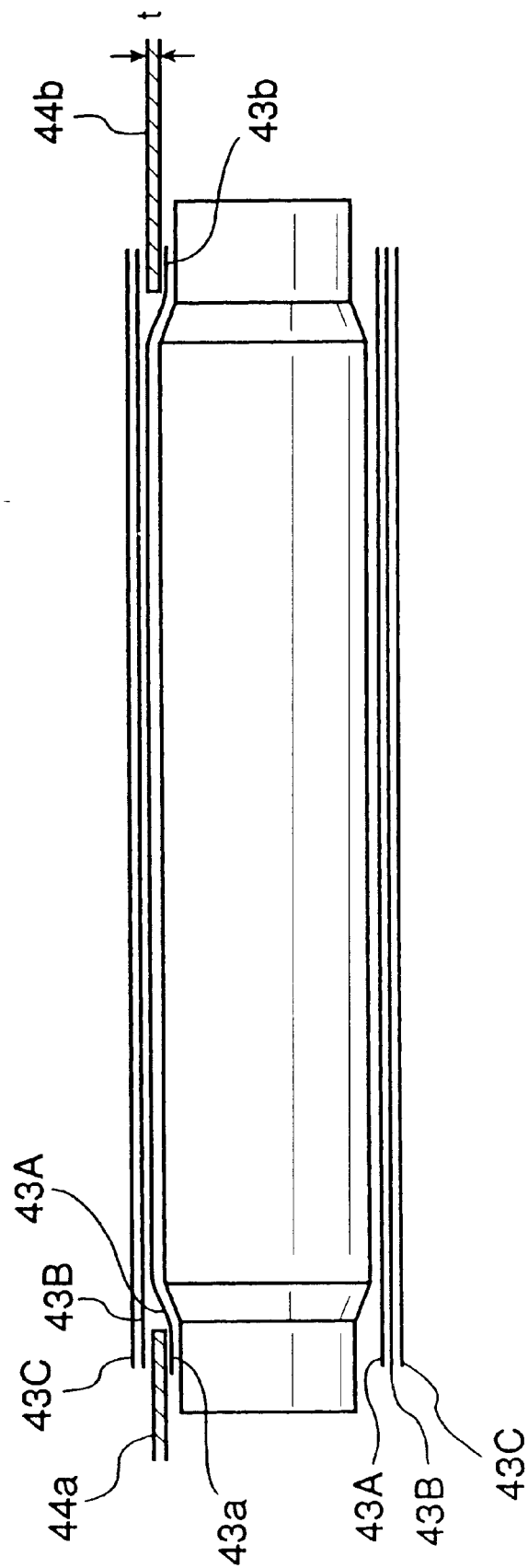
FIG. 9 is a view showing the state in which the sheet film is wound on the cylindrical member.

FIG. 9 is a view showing the state in which the sheet film 43 is wound on the cylindrical member 41.

The sheet film 43 fed from a film feeder (not shown) is supplied to the gap between clamp pawls 44a and 44b and the two small-diameter end portions of the cylindrical member 41. The clamp pawls 44a and 44b are operated by a driving means (not shown) to abut against the cylindrical member 41, thereby pressing the two end portions of the sheet film 43. The cylindrical member 41 is then rotated by a rotating means (not shown) to wind the sheet film 43 on it. If the clamp pawls 44a and 44b are not used as a pressing mechanism, slippage occurs when the film is wound. Consequently, the winding length varies or loose winding takes place.

After the sheet film 43 is completely wound on the cylindrical member 41, the clamp pawls 44a and 44b are removed, and the sheet film 43 is inserted into the tubular mold member 42.

A thickness t of the clamp pawls 44a and 44b is smaller than a difference H between the outside diameters φD and φd.

Since the clamp pawls 44a and 44b press the film end portions on the small-diameter φd portions, no loose winding occurs on the larger-diameter φD portion even when the film is further wound on it. For example, when the sheet film 43 is to be wound three times, a film 43A of the first round is present below the clamp pawls 44a and 44b. Films 43B and 43C for the second and third rounds are wound on the clamp pawls 44a and 44b. If the small-diameter φd portions do not exist in the cylindrical member 41, a gap equivalent to the thickness t of the clamp pawls 44a and 44b is formed between the film 43A and the films 43B and 43C when the clamp pawls 44a and 44b are removed, since the films 43B and 43C are wound on these clamp pawls 44a and 44b. This causes loose winding. The thickness t of the clamp pawls 44a and 44b is smaller than the difference H between the small-diameter φd and outside diameter φD. Therefore, the films 43B and 43C do not loosen even when the clamp pawls 44a and 44b are extracted after these films are wound. If loose winding occurs, this loosely wound portion is caught when the film is inserted into the tubular mold member 42, making the insertion of the film impossible.

Figure 10:
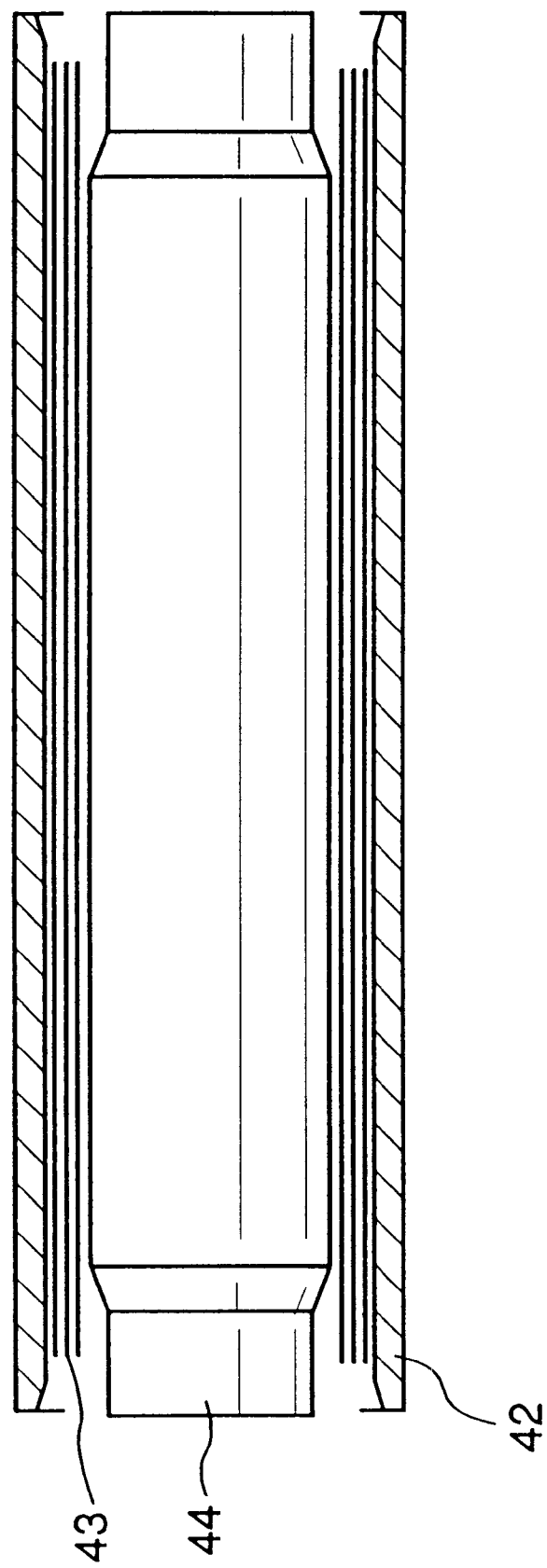
FIG. 10 is a view showing the state in which the cylindrical member is inserted into the tubular mold member.

FIG. 10 is a view showing the state in which the cylindrical member 41 on which the sheet film 43 is completely wound is inserted into the tubular mold member 42.

Figure 11:
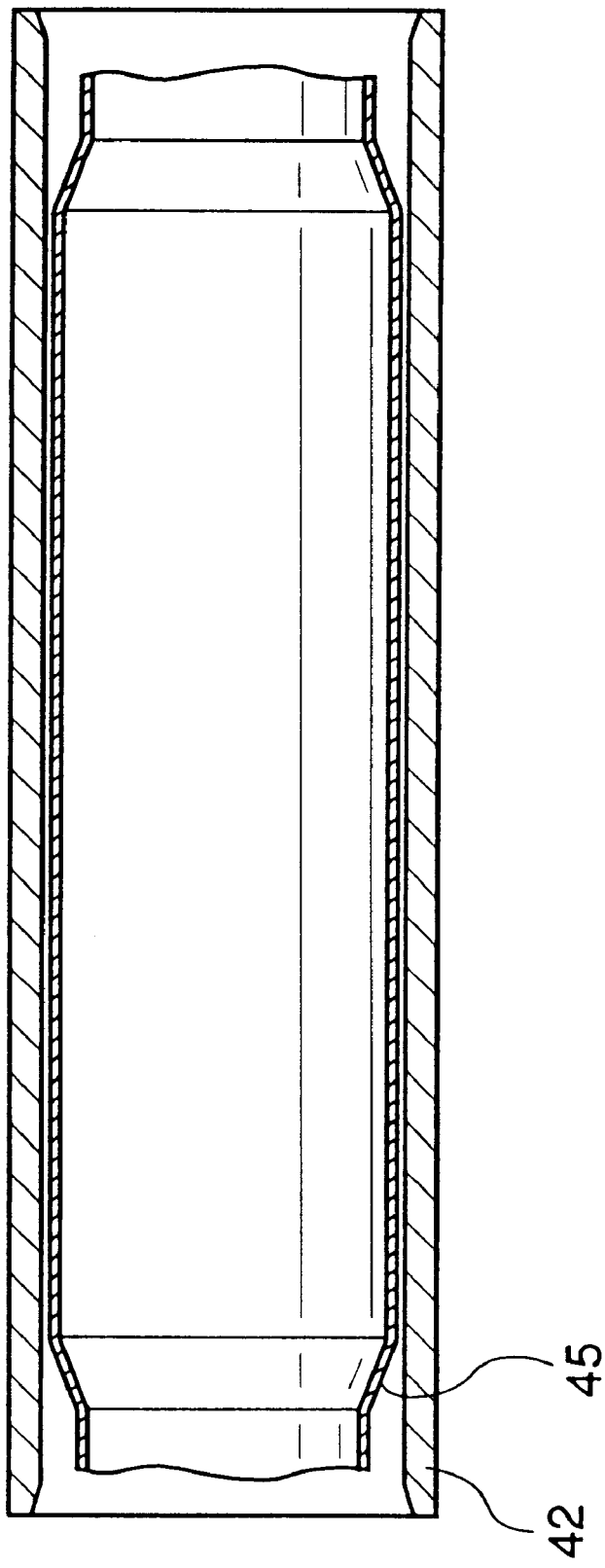
FIG. 11 is a view showing the state after heat-molding.

FIG. 11 is a view showing the state in which a heat-molded tubular film 45 is sticking to the tubular mold member 42. The tubular mold member 42 shown in FIG. 10 has a straight shape. However, the end portions of the heat-molded tubular film 45 assume a shape similar to the shape of the cylindrical member 41. Accordingly, these end portions of the tubular film 45 have peeled from the tubular mold member 42, so the entire tubular film can be peeled very easily. Also, the portions peeled from the tubular mold member 42 are inclined to allow easy entrance of air. Therefore, peeling by air can be easily performed.

Figure 12:
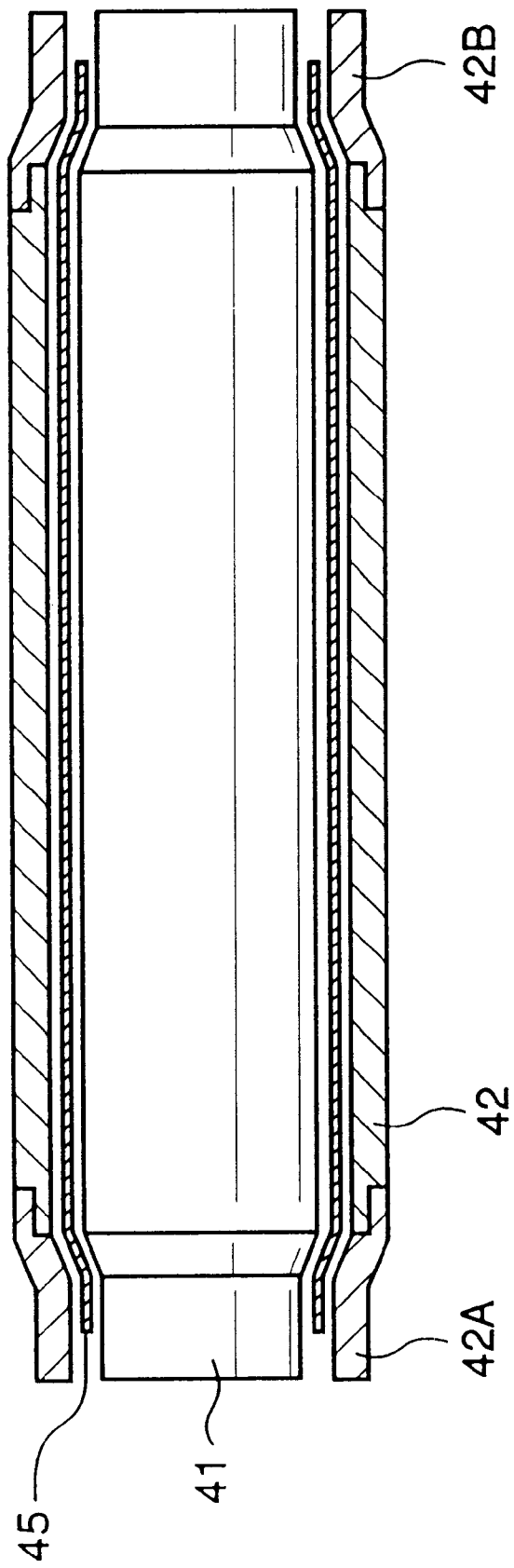
FIG. 12 is a view showing the shapes of the cylindrical member and tubular mold member.

FIG. 12 is a view showing the case in which the tubular mold member 42 has a shape matching the shape of the cylindrical member 41. The strength of a tubular film molded by a tubular mold member as shown in FIG. 10 lowers because no pressure is applied to the tapered portions during heat-molding. When the tubular film is peeled, only air pressure and tensile force of peeling are applied, so even this low strength is of no problem. However, this strength is unsatisfactory to use the film as a rib for prevent meandering. When the shape of the tubular mold member 42 matches the shape of the cylindrical member 41 and the pressure is applied on the tapered portions, the strength becomes high enough to use the film as a meandering preventing rib.

Two end portions 42A and 42B of the tubular mold member 42 are separately processed parts. These tubular mold end portion members 42A and 42B are inserted after the cylindrical member 41 on which the sheet film 43 is wound is inserted into the tubular mold member 42. When heat-molding is performed in a heating furnace (not shown) after that, the stepped tapered portions of the cylindrical member 41 are heat-molded under pressure when the cylindrical member 41 and the tubular mold member 42 expand in the axial direction, since the thermal expansion coefficient of the cylindrical member 41 is larger than that of the tubular mold member 42. Consequently, the tubular film 45 on every portion of which the pressure is applied is formed.

Extraction of this tubular film 45 will be described below. One of the two end portion members, e.g., the end portion member 42B is removed. The cylindrical member 41 is then extracted. Although the diameter of the central portion of the cylindrical member 41 is larger than that of the tapered portions of the tubular film 45, the cylindrical member 41 can be removed by the flexibility of the film. Subsequently, air is injected between those tapered portions of the tubular film 45, which are sticking to the inner surface of the tubular mold member, and the inner surface of the tubular mold member. Consequently, the tubular film 45 is peeled and extracted from the tubular mold member.

Figure 13:
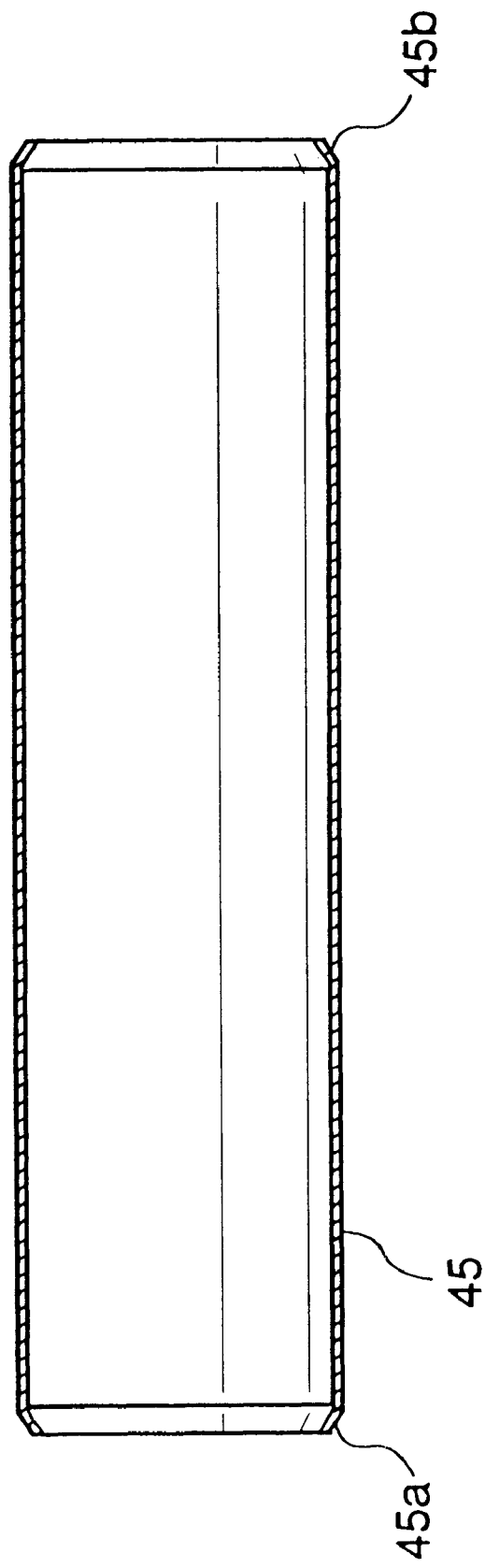
FIG. 13 is a view showing the state after the end portions of the tubular film are cut.

When the end portions of the tubular film 45 are cut by a cutting apparatus (not shown), tapered ribs 45a and 45b for preventing meandering are formed at the end portions of the tubular film 45, thereby completing the tubular film 45. The section is shown in FIG. 13.

Figure 14:
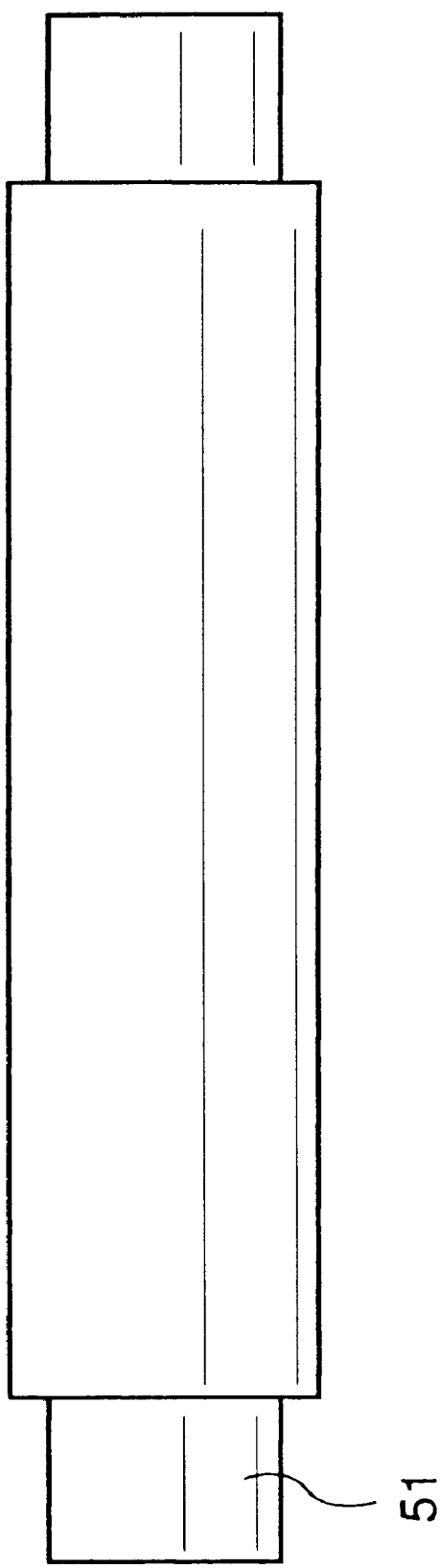
FIG. 14 is a view showing the state in which stepped portions of the cylindrical member have vertical surfaces.
Figure 15:
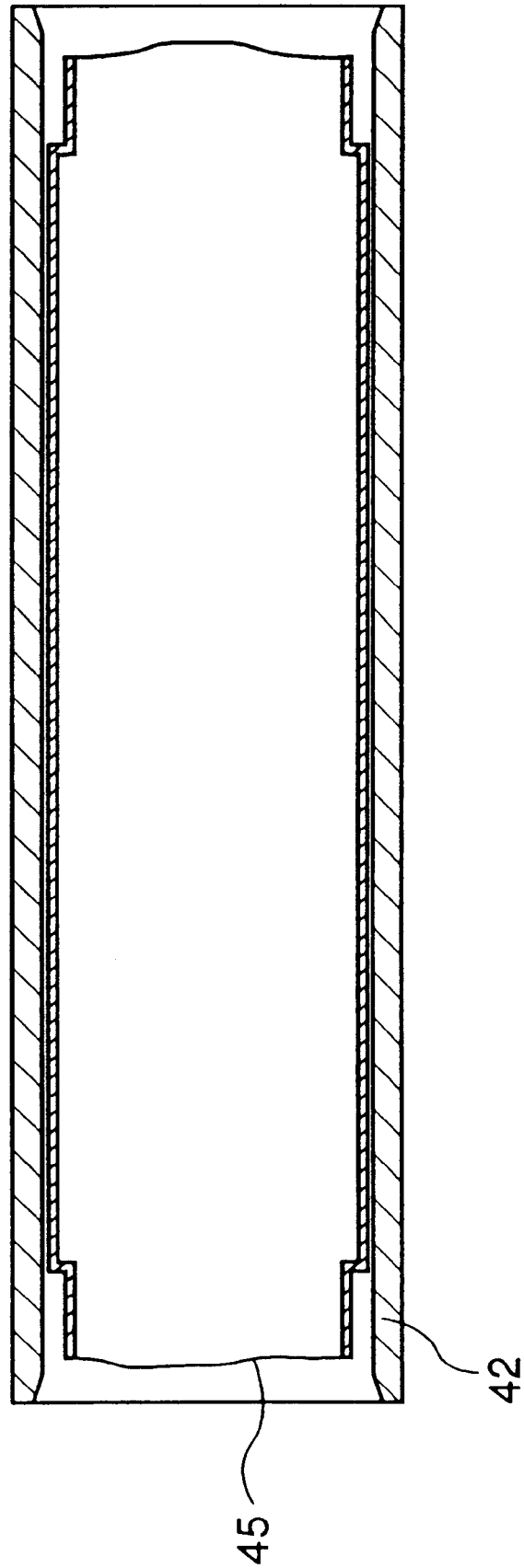
FIG. 15 is a view showing the state after heat-molding.

FIG. 14 is a view showing the case in which the stepped portions of a cylindrical member 51 have vertical surfaces. Even with this structure, the same effect as when tapered surfaces are used can be obtained by the stepped portions when the sheet film 43 is wound. Also, since the end portions are initially peeled after heat-molding, the entire tubular film can be very easily peeled. FIG. 15 shows the state in which this cylindrical member 51 is used to perform heat-molding and the heat-molded tubular film 45 is sticking to the tubular mold member 42.

Figure 16:
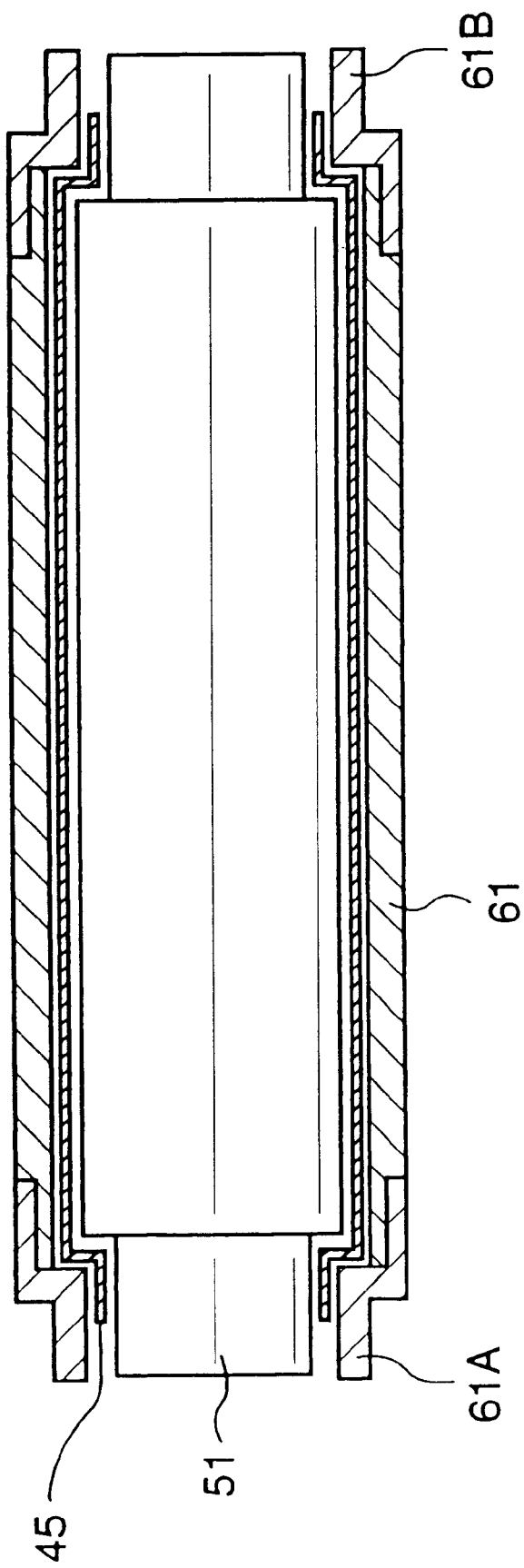
FIG. 16 is a view showing the shapes of the cylindrical member and tubular mold member.
Figure 17:
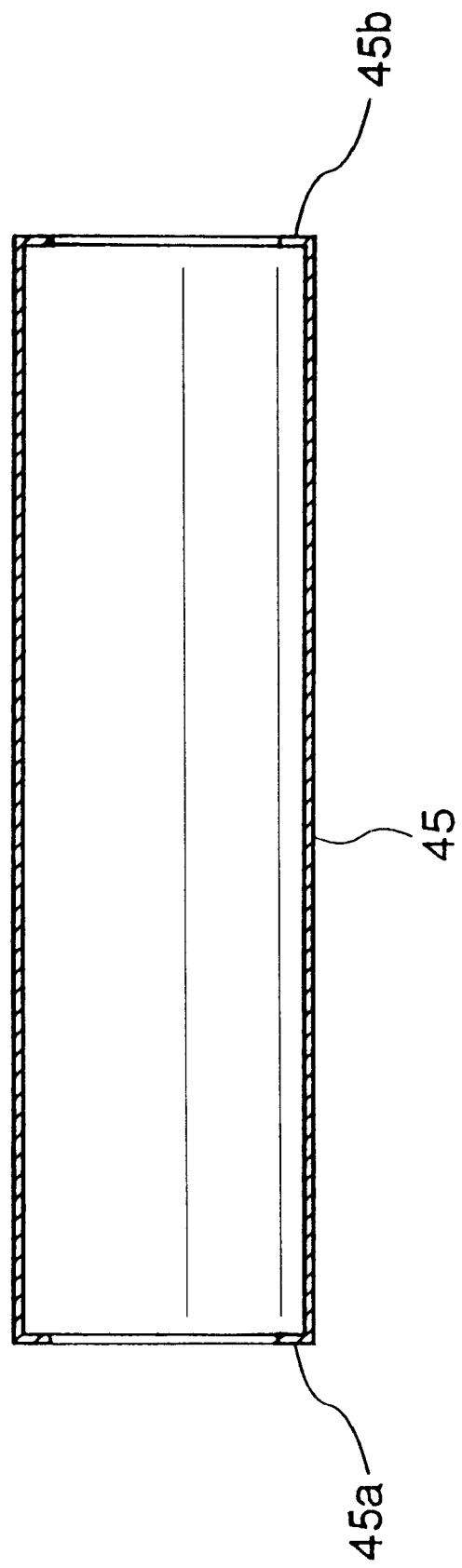
FIG. 17 is a view showing the state after the end portions of the tubular film are cut.

Also, as shown in FIG. 16, when end portions 61A and 61B of a tubular mold member 61 are formed as separately processed parts in accordance with the shape of the cylindrical member 51, pressure is also applied to the vertical surfaces of the stepped portions during heat-molding, so a strong tubular film is obtained. When the end portions of the tubular film 45 are cut by a cutting apparatus (not shown), as shown in FIG. 17, ribs 45a and 45b for preventing meandering are formed at the end portions of the tubular film 45. Since these ribs 45a and 45b are substantially perpendicular to the surface of the tubular film 45, meandering of the tubular film can be more reliably prevented.

Figure 18:
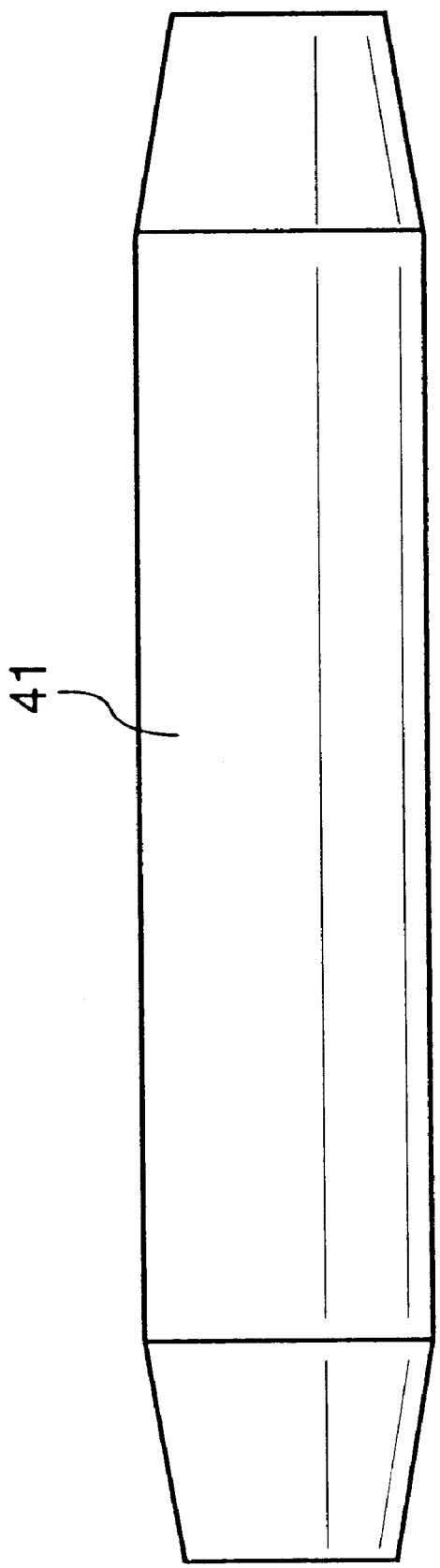
FIG. 18 is a view showing a cylindrical member having tapered end portions.
Figure 19:
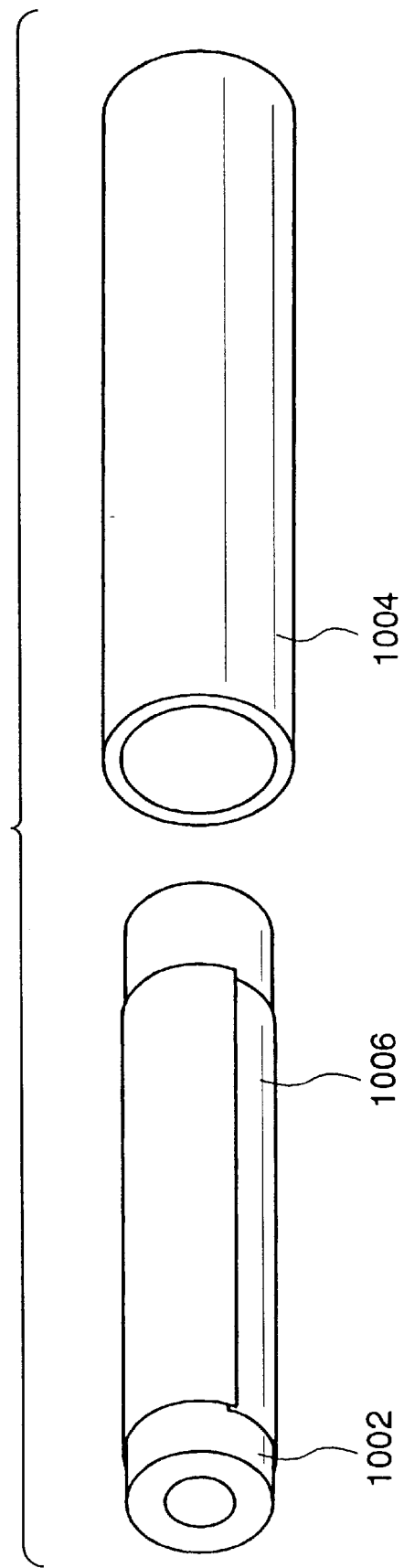
FIG. 19 is a view showing a conventional cylindrical member, tubular mold member, and sheet film.

The same effect as described above can be obtained even when the end portions of the cylindrical member 41 are tapered as shown in FIG. 18.

In this embodiment as described above, the outside diameter of the two end portions of the cylindrical member is smaller than the outside diameter of its central portion, and the length of the central large-diameter portion is shorter than the width of a sheet film. Therefore, press pawls can be used when the sheet film is wound on the cylindrical member. Hence, the film can be stably wound without causing any loose winding.

Also, since the stepped portions between the central large-diameter portion and the small-diameter portions at the two ends of the cylindrical member have inclined surfaces, peeling can be easily performed by air.

Alternatively, the stepped portions between the central large-diameter portion and the small-diameter portions at the two ends of the cylindrical member have vertical surfaces. This makes it possible to form ribs capable of certainly preventing meandering of a tubular film.

Furthermore, the two end portions of the tubular mold member have a shape matching the shape of the two end portions of the cylindrical member. This permits reliable application of pressure to the film end portions. Therefore, it is possible to form ribs having sufficient strength and capable of dependably preventing meandering of a tubular film.

The tubular film manufacturing apparatus according to this embodiment is constructed as above. Hence, this apparatus allows automatic winding and easy peeling and can form ribs capable of reliably preventing meandering of a tubular film. Accordingly, a high-accuracy tubular film can be obtained at low cost.

Third Embodiment

The third embodiment will be described below. This embodiment relates to a cutting apparatus for cutting the two end portions of a molded tubular film.

Figure 20:
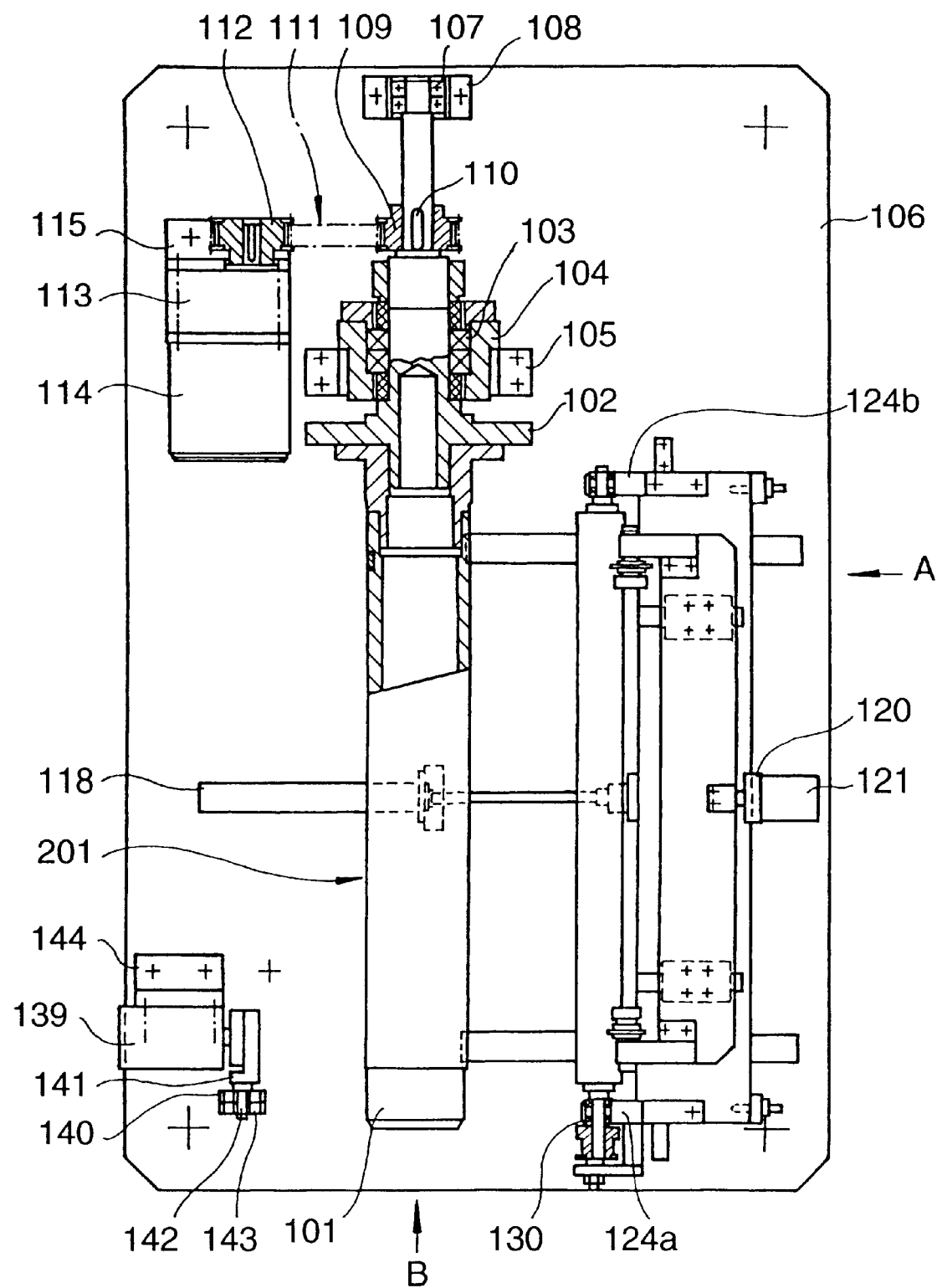
FIG. 20 is a plan view showing a tubular film cutting apparatus according to the third embodiment.

FIG. 20 is a plan view showing the cutting apparatus of this embodiment from the above.

A support member 101 is coaxially attached to a mounting flange 102 which is rotatably supported by a bearing 103. This mounting flange 102 is mounted on a base plate 106 by a bearing holder 104 and a mounting block 105.

The shaft end of the mounting flange 102 is supported by a flange 107 and mounted on the base plate 106 by a block 108.

A pulley 109 is fitted on the shaft end of the mounting flange 102. The rotational force of this pulley 109 is transmitted to the mounting flange 102 by a key 110.

The rotational force of a motor 114 is reduced by a reduction gear 113 and transmitted to the pulley 109 via a pulley 112 and a timing belt 111, thereby rotating the mounting flange 102. The motor 114 is mounted on the base plate 106 by a mounting angle 115.

Figure 21:
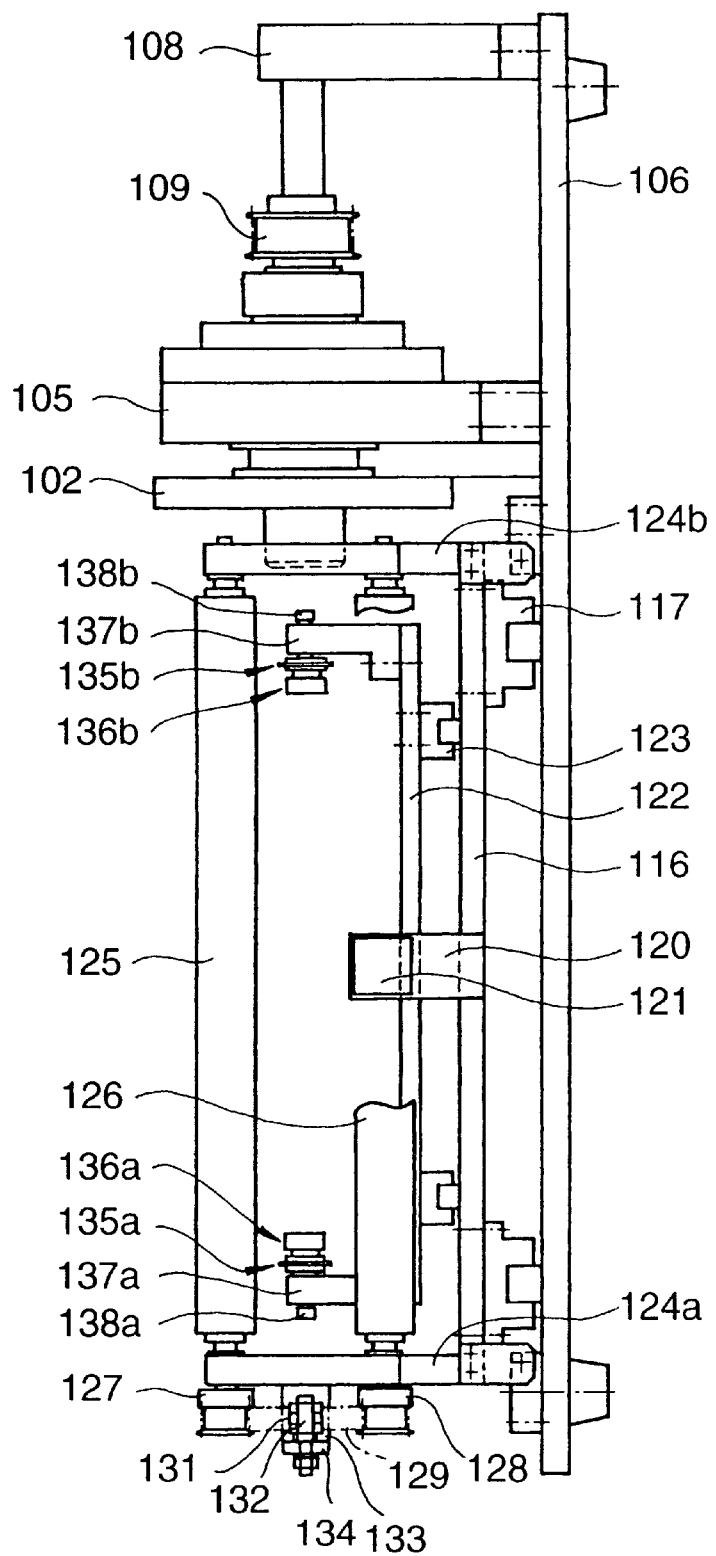
FIG. 21 is a view showing FIG. 20 in the direction of an arrow A.

FIG. 21 is a view showing FIG. 20 in the direction of an arrow A.

A first roller 125 and a second roller 126 are arranged to be parallel to the axis of the support member 101. The two ends of each of the first and second rollers 125 and 126 are supported by support plates 124a and 124b and rotatably supported by bearings 130.

The support plates 124a and 124b are mounted on a slide base plate 116. These support plates 124a and 124b can move, as they are guided by linear guide bearings 117, in a direction perpendicular to the axis of the support member 101 by a cylinder 118.

A backup roller 140 suppresses deflection when the first and second rollers 125 and 126 come in contact with the support member 101. This backup roller 140 is rotatably supported by a bearing 143 and mounted on a block 141 via a shaft 142. The block 141 is attached to a backup cylinder 139 and can move back and forth with respect to the support member 101. The backup cylinder 139 is mounted on the base plate 106 by a mounting block 144.

On the side of the support plate 124a, a first pulley 127 is fitted on the shaft end of the first roller 125, and a second pulley 128 is fitted on the shaft end of the second roller 126. A timing belt 129 is looped between the first and second pulleys 127 and 128. An idler 131 is placed in the middle of these pulleys 127 and 128 and gives tension to the timing belt 129. This idler 131 is composed of three bearings and attached to a plate 134 by a shaft 132. The plate 134 is mounted on the support plate 124a by a block 133.

Figure 22:
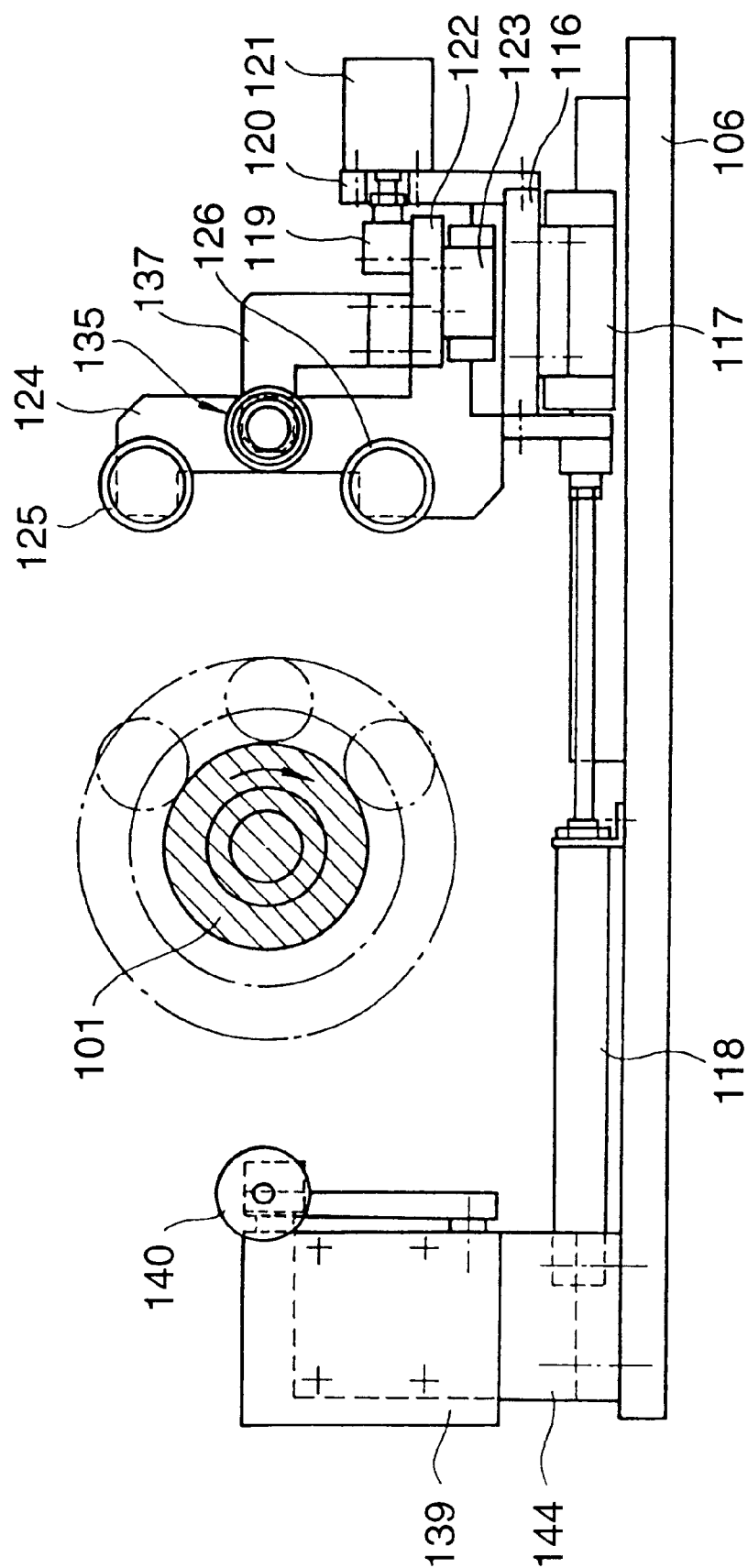
FIG. 22 is a view showing FIG. 20 in the direction of an arrow B.

FIG. 22 is a view showing FIG. 20 in the direction of an arrow B.

Referring to FIG. 22, the support member 101 rotates clockwise. The second roller 126 is attached downstream of the first roller 125.

Cutters 135a and 135b are positioned in the middle of the first and second rollers 125 and 126. These cutters 135a and 135b are rotary blades. The cutters 135a and 135b are fitted on mounting shafts 138a and 138b and fixed by nuts 136a and 136b, respectively. The mounting shafts 138a and 138b are rotatably supported by bearings (not shown) and mounted on the slide plate 122 by mounting blocks 137a and 137b, respectively. The cutters 135a and 135b are positioned on the left- and right-hand sides, respectively, in accordance with the cutting width of a tubular film 201. The slide plate 122 can move, as it is guided by a linear guide bearing 123, in the direction perpendicular to the axis of the support member 101 by a cylinder 121. This cylinder 121 is mounted on the slide base plate 116 via a cylinder mounting plate 120 and can move independently of the first and second rollers 125 and 126.

Figure 23:
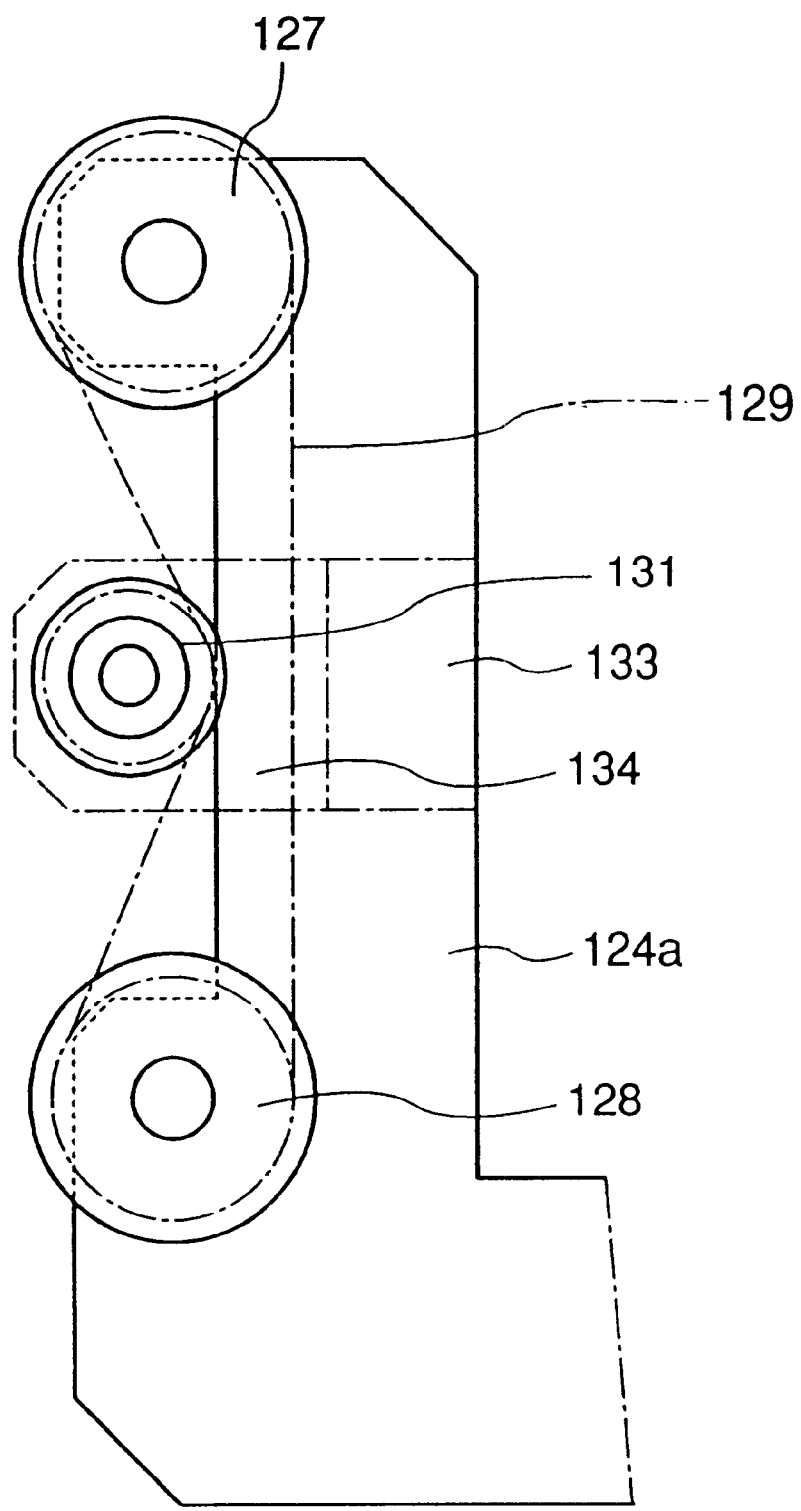
FIG. 23 is a view showing details of pulleys.

FIG. 23 is a view showing details of the pulleys fitted on the shaft end portions of the first and second rollers 125 and 126.

The number of teeth of the first pulley 127 is larger than that of the second pulley 128. For example, the number of teeth of the first pulley 127 is 21, and the number of teeth of the second pulley 128 is 20. Accordingly, when the first pulley 127 rotates once, the second pulley 128 rotates a 21/20 of a turn, i.e., rotates more by a 1/20 of a turn than the first pulley 127.

Figure 24:
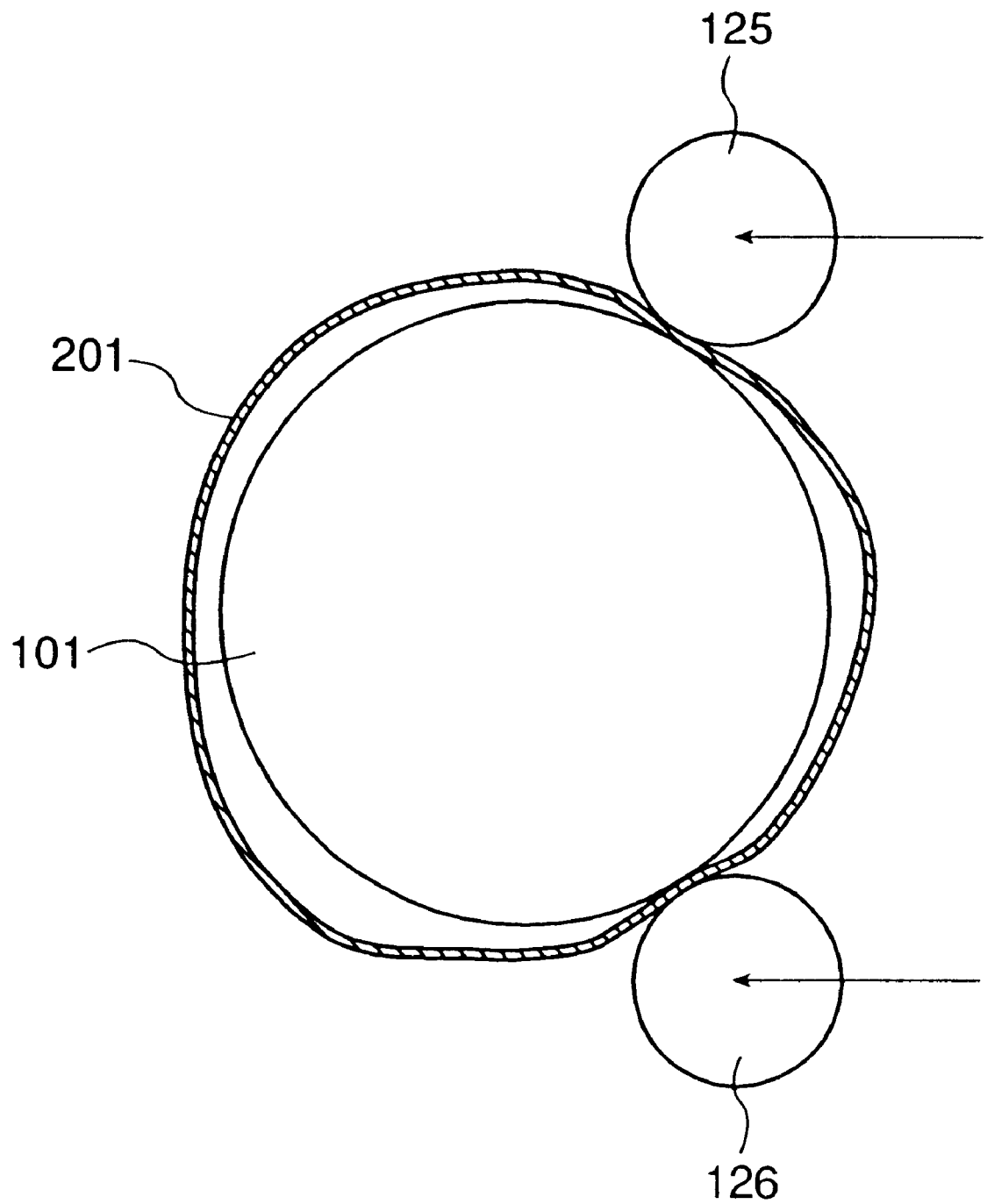
FIG. 24 is a view showing the state in which a tubular film is inserted into a support member.

FIG. 24 shows the state in which the support member 101 is inserted into the tubular film 201.

The outside diameter of the support member 101 is smaller than that of the tubular film 201, so the support member 101 can be smoothly inserted into the tubular film 201. When the first and second rollers 125 and 126 advance and come in contact with the support member 101 after the insertion, the tubular film 201 slackens at the position of the cutter 135. This slack varies in the longitudinal direction of the tubular film 201. Hence, the tubular film 201 cannot be accurately cut in this state because its end portions are obliquely cut.

Figure 25:
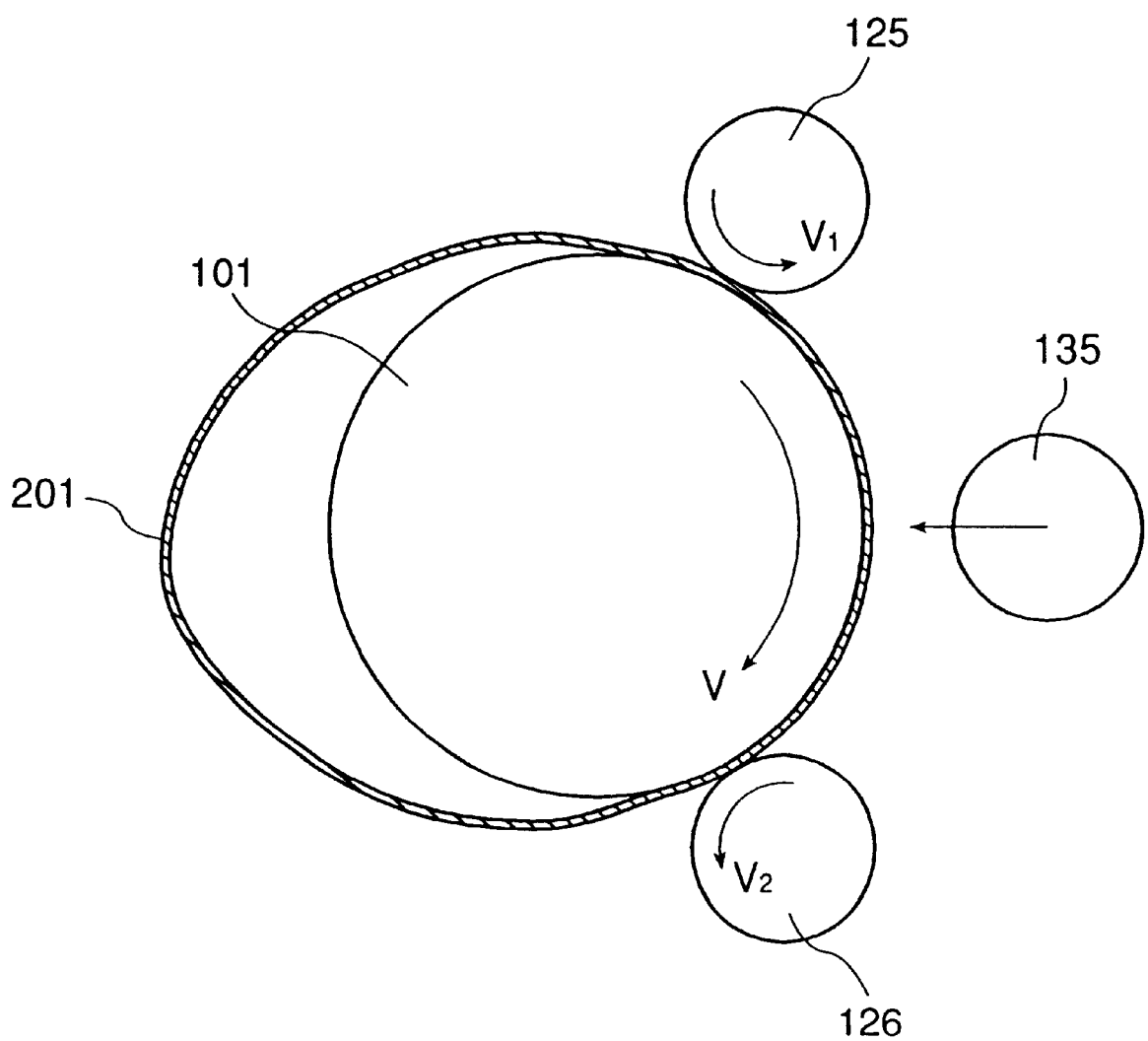
FIG. 25 is a view showing the state in which wrinkles on the tubular film are extended by rotating the support member.

FIG. 25 is a view showing the state in which wrinkles of the tubular film 201 are extended by rotating the support member 101.

When the support member 101 is rotated at a velocity (peripheral speed) V, the first roller 125 rotates at a velocity V1. This velocity V1 equals the velocity V if there is no slippage between the support member 101 and the first roller 125. A velocity V2 of the second roller 126 is higher than that of the first roller 125, so the second roller 126 rotates more than the first roller 125. Consequently, wrinkles and slack of the tubular film 201 produced between the first and second rollers 125 and 126 are extended. When the wrinkles and slack of the tubular film 201 are thus extended, the second roller 126 slips on the tubular film 201. After the support member 101 rotates several times, the cutter 135 advances to cut the tubular film 201.

If the support member 101 rotates at the velocity (peripheral speed) V and there is no slippage between the support member 101 and the second roller 126, the velocity V2 equals the velocity V. In this state, the velocity of the first roller 125 is lower than that of the second roller 126, so the first roller 125 rotates less than the second roller 126. Consequently, while the tubular film 201 is pulled at the velocity V, the first roller 125 functions as a frictional load on the tubular film 201. Accordingly, wrinkles and slack of the tubular film 201 produced between the first and second rollers 125 and 126 are extended. When the wrinkle and slack of the tubular film 201 are thus extended, the first roller 125 slips on the tubular film 201.

Figure 26:
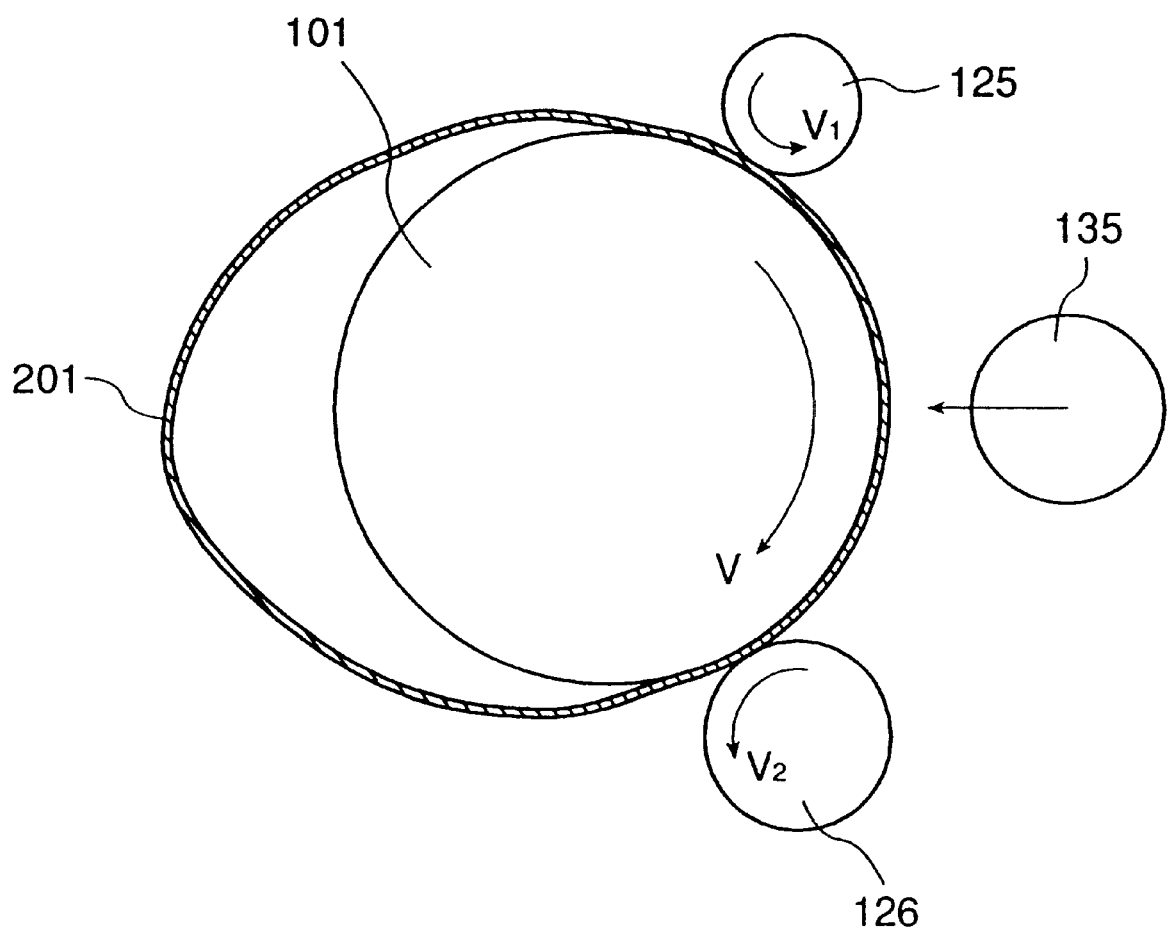
FIG. 26 is a view showing the state in which the support member is rotated by changing the diameters of rollers.

FIG. 26 is a view showing the state in which the support member 101 is rotated by changing the diameters of the rollers. That is, the numbers of teeth of the first and second pulleys 127 and 128 are made equal, and the diameter of the first roller 125 is made smaller than that of the second roller 126. In this case, the rotational speeds of the first and second rollers 125 and 126 are equal, but the velocity (peripheral speed) of the first roller 125 is lower than that of the second roller 126 because the diameter of the first roller 125 is smaller. As a consequence, wrinkles and slack of the tubular film 201 are extended in the same manner as described above.

Figure 27:
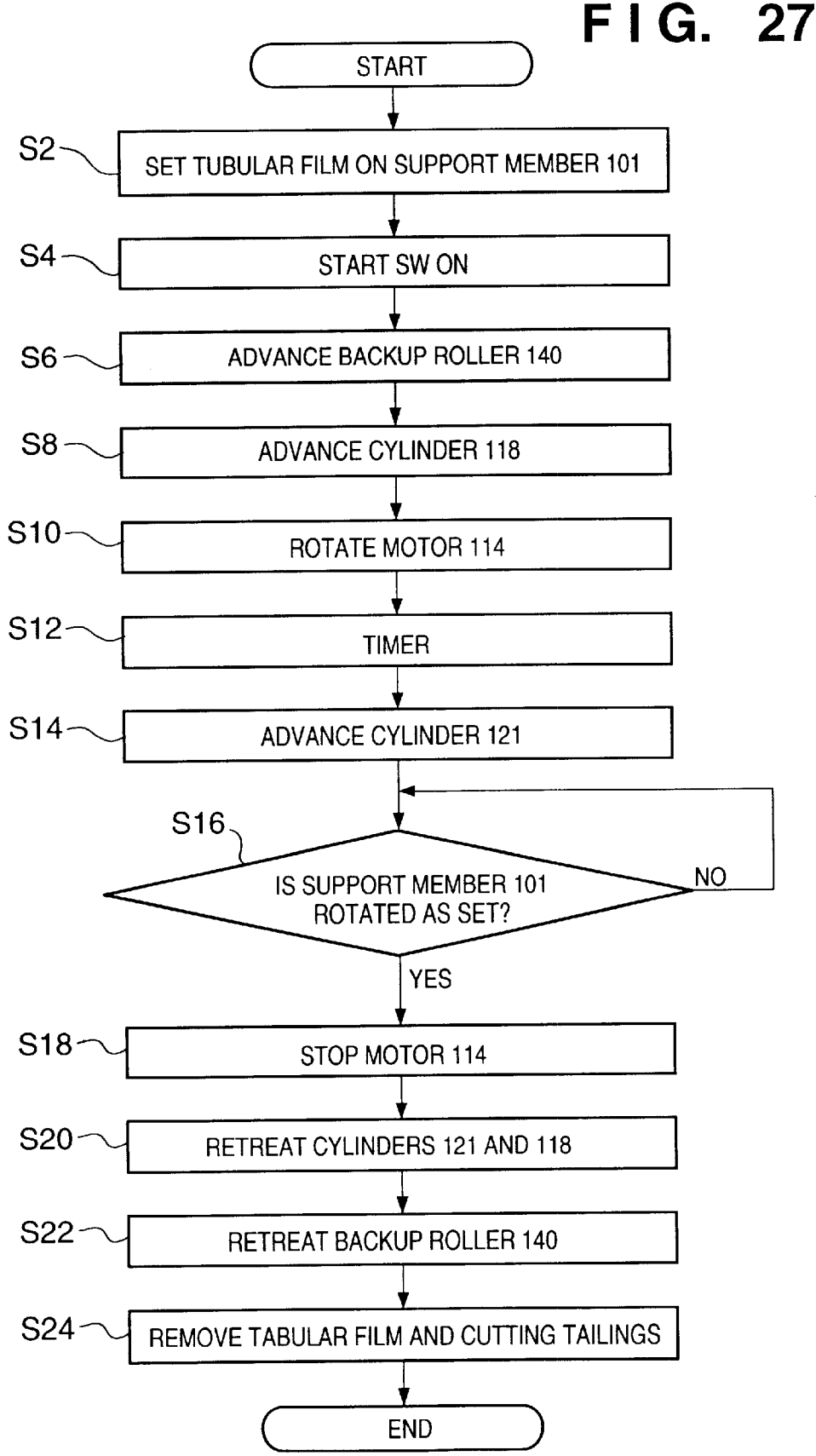
FIG. 27 is a flow chart showing the operation of the third embodiment.

FIG. 27 is a flow chart showing the operation of this apparatus.

An operator sets the tubular film 201 on the support member 101 (step S2) and presses a start switch to start automatic operation (step S4). The backup roller 140 advances to prevent a fall of the support member 101 (step S6). The cylinder 118 then advances to bring the first and second rollers 125 and 126 into contact with the support member 101 (step S8). The motor 114 rotates to rotate the support member 101 and extend wrinkles and slack of the tubular film 201 (step S10). Although the time of rotation is controlled by a timer, this rotating time can also be controlled by counting the number of turns (step S12). The cylinder 121 advances to move the cutters 135 forward to cut the tubular film 201 (step S14). In this embodiment, the number of turns of the support member 101 is counted by a sensor (not shown). When the set value is reached (YES in step S16), the motor 114 is stopped (step S18). When the cutting is complete, the cylinder 121 retreats to move the cutters 135 backward, and the cylinder 118 goes back to move the first and second rollers 125 and 126 backward (step S20). Subsequently, the backup roller 140 retreats to terminate the automatic operation (step S22). The cut tubular film 201 and the cutting tailings are removed (step S24) to complete the operation.

In this embodiment as described above, only the support member for supporting the inner-diameter portion of a tubular film has a rotational driving source. The first and second rollers arranged along the rotating direction of the support member rotate when the rotational force of the support member is transmitted by friction. Therefore, a tubular film cutting apparatus can be constructed without complicating its structure.

Also, the workability of insertion can be improved because the outer diameter of the support member is smaller than the inner diameter of the tubular film.

Furthermore, the two ends of each of the first and second rollers are supported by the support plates, and the first and second pulleys are attached to the end portions of the first and second rollers, respectively. Since the rotational force is transmitted by the timing belt looped between the first and second pulleys, one of the first and second rollers can be rotated asynchronously with respect to the rotation of the support member.

Since the number of teeth of the first pulley is larger than that of the second pulley, the rotational speed of the first roller can be made lower than that of the second roller.

Additionally, when the numbers of teeth of the first and second pulleys are equal and the diameter of the first roller is made smaller than that of the second roller, a speed difference finer than that obtained by the teeth number difference between the pulleys can be obtained.

The tubular film manufacturing apparatus according to this embodiment has the above construction. Hence, it is possible to obtain a cutting apparatus having high workability and capable of high-accuracy cutting at low cost with a few driving sources, without complicating the apparatus.

Fourth Embodiment

The fourth embodiment will be described below.

Figure 28A:
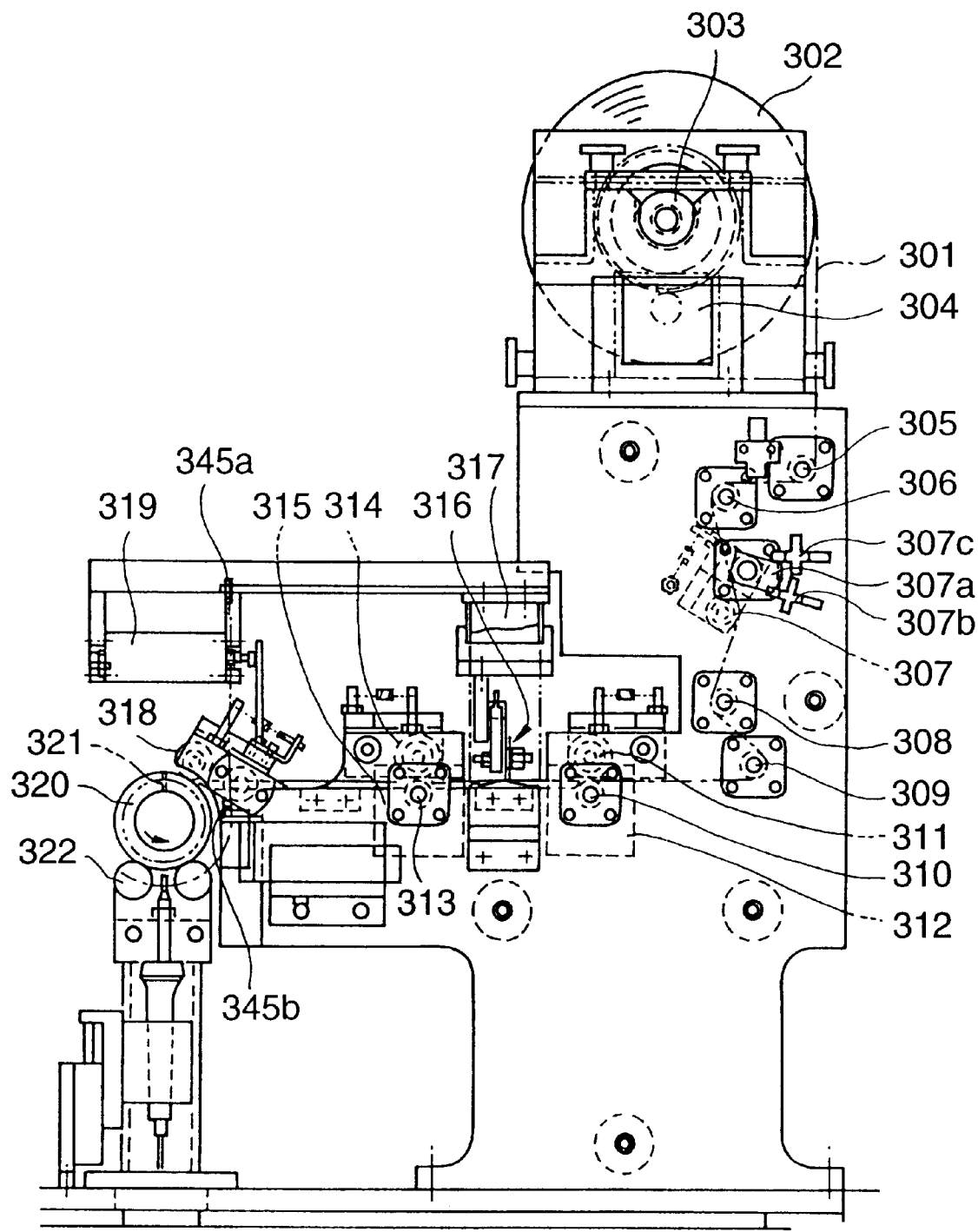
FIG. 28A is a view showing a winding apparatus used in the fourth embodiment.
Figure 28B:
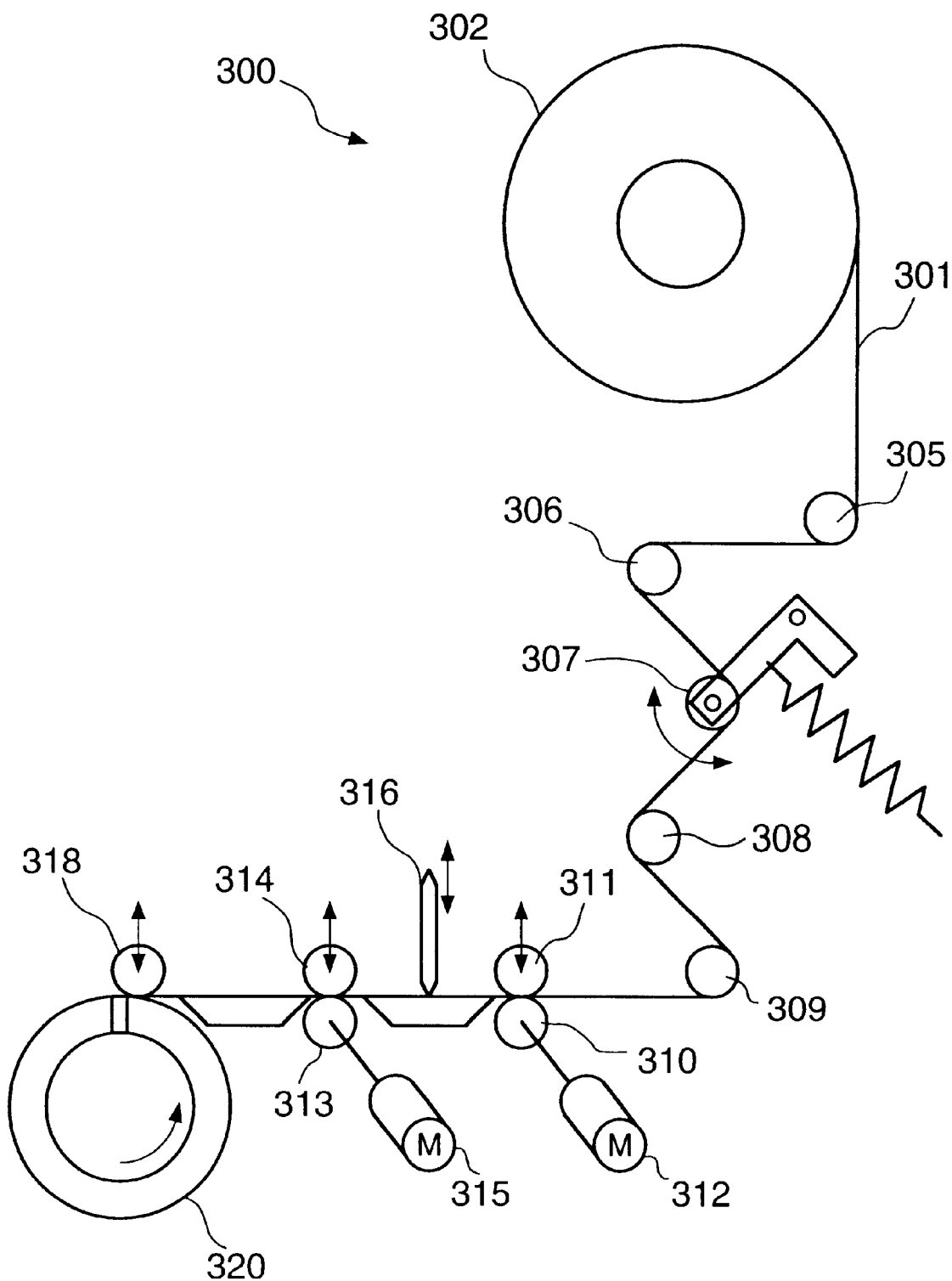
FIG. 28B is a schematic view plainly showing the main components of the winding apparatus shown in FIG. 28A.

FIG. 28A is a view showing a winding apparatus used in the fourth embodiment of the present invention. FIG. 28B is a schematic view plainly showing the major components of FIG. 28A.

A sheet film 301 is drawn from a film roll material 302. A shaft 303 extends through a central portion of the film roll material 302 to support it. A gear is fixed to one end of the shaft 303. A film unwind motor 304 rotates the film roll material 302 to draw the sheet film 301.

Rollers 305, 306, 308, and 309 guide the sheet film 301.

A dancer roller 307 removes any slack of the sheet film 301. Also, this dancer roller 307 unwinds the sheet film 301 in cooperation with an arm 307a attached to the dancer roller 307 and sensors 307b and 307c for sensing the position of the arm 307a.

A film feed driving roller 310 is positioned before a cutter 316. After the sheet film 301 is cut by the cutter 316, the film feed driving roller 310 feeds a new film. A press roller 311 presses the sheet film 301 against the film feed driving roller 310. This press roller 311 can move forward and backward by a cylinder (not shown). Hence, the press roller 311 can press the sheet film 301 against the film feed driving roller 310 and release the pressing.

A film feed driving motor 312 is coupled with the film feed driving roller 310 to rotate it.

A film feed driving roller 313 is placed downstream of the cutter 316. After the sheet film 301 is cut by the cutter 316, the film feed driving roller 313 feeds the end portion of the film.

A press roller 314 presses the sheet film 301 against the film feed driving roller 313. This press roller 314 can move forward and backward by a cylinder (not shown). Hence, the press roller 314 can press the sheet film 301 against the film feed driving roller 313 and release the pressing.

A film feed driving motor 315 is coupled with the film feed driving roller 313 to rotate it.

The cutter 316 is a rotary cutter having a rotary blade. This cutter 316 is pressed against the sheet film 301 by the biasing force of a spring (not shown) and moved by a cylinder 317 to cut the sheet film 301.

A touch roller 318 can move close to and away from a cylindrical member 320 by a cylinder 319. This touch roller 318 presses the sheet film 301 against the cylindrical member 320.

The cylindrical member 320 has suction holes 321 and can draw the end portion of the sheet film 301 by suction.

Film passage sensors 345a and 345b are arranged before the cylindrical member 320. These film passage sensors 345a and 345b can sense that the sheet film 301 is fed by the film feed driving motors 312 and 315 to the vicinity of the cylindrical member 320.

Figure 29A:
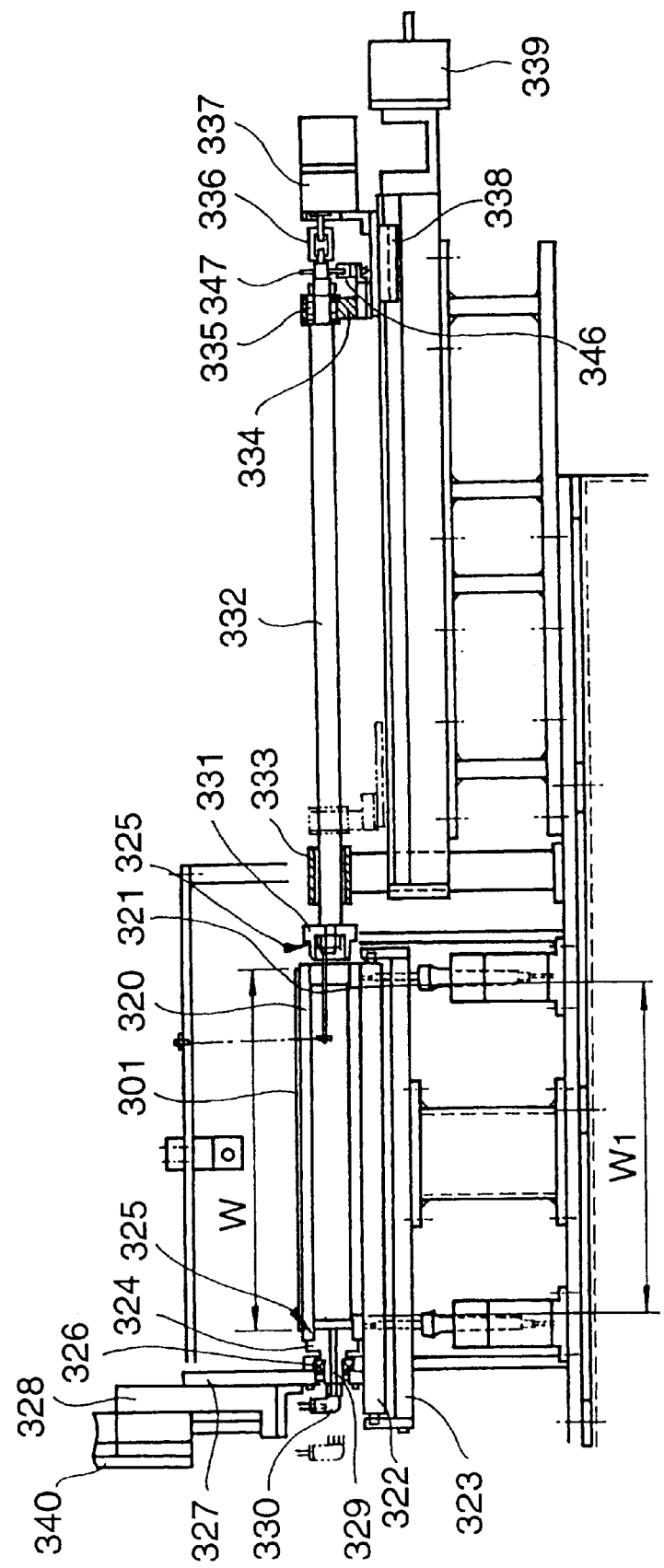
FIG. 29A is a view showing the winding apparatus in the film conveyance direction.
Figure 29B:
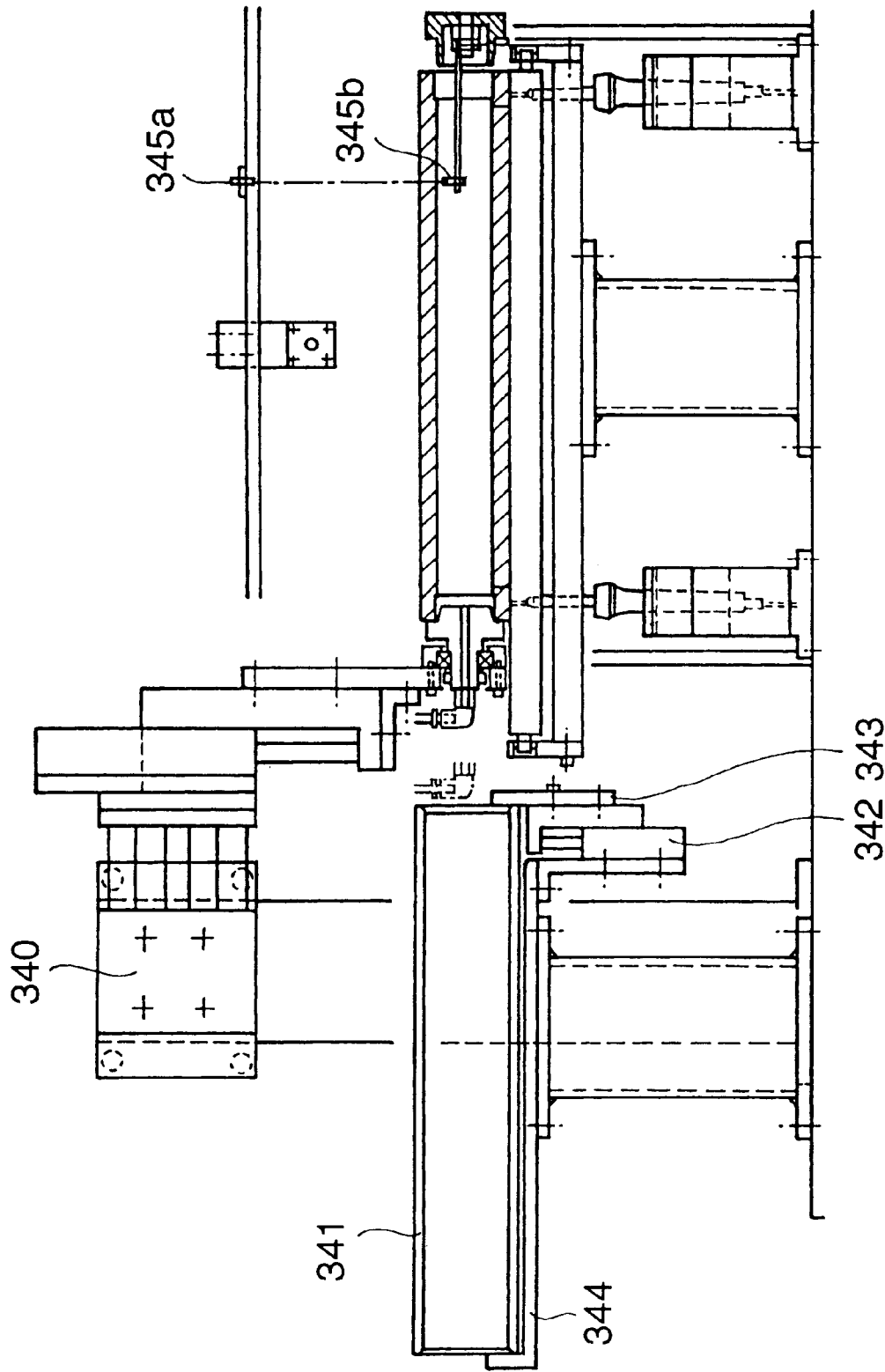
FIG. 29B is a view showing the winding apparatus in the film conveyance direction.

FIG. 29A is a view showing the winding apparatus in the conveyance direction of the sheet film 301. FIG. 29B is a view showing a part to the left of FIG. 29A. FIGS. 30A, 30B, 30C, and 30D are schematic views plainly showing the overall arrangement combining FIGS. 29A and 29B.

The suction holes 321 are formed at a pitch w1 in the two end portions of the cylindrical member 320. The sheet film 301 has a width W larger than this width w1. A width w0 of a tubular film necessary for product functions is narrower than w1. That is, the relationship is $$W > w1 > w0$$

A support roller 322 is mounted on a support plate 323 to rotatably support the cylindrical member 320.

A rotation holding member 324 supports the cylindrical member 320 by fitting in the end portion hole of the cylindrical member 320. A bearing 326 is attached to a support plate 327 for supporting the rotation holding member 324 and rotatably supports the rotation holding member 324. The support plate 327 is attached to an up/down cylinder 328, which, in turn, is mounted on a forward/backward cylinder 340. This allows the rotation holding member 324 to move forward, backward, up, and down with respect to the cylindrical member 320.

A suction hole 329 is formed in the rotation holding member 324 and connected to an external suction source via a rotary joint 330. An O-ring 325 is attached to that end face of the rotation holding member 324, which abuts against the cylindrical member 320, thereby preventing a leak of suction air.

A driving-side rotation support member 331 is attached to the other end portion of the cylindrical member 320. This driving-side rotation support member 331 gives rotational force to the cylindrical member 320 and rotatably support it. An O-ring 325 is attached to that end face of the driving-side rotation support member 331, which abuts against the cylindrical member 320, thereby preventing a leak of suction air.

The driving-side rotation support member 331 is attached to a shaft 332. The end portion of this shaft 332 is rotatably supported by a bearing 335 and a support block 334. The end portion of the shaft 332 is further coupled with a motor 337 via a coupling 336. The rotation of the motor 337 rotates the driving-side rotation support member 331. The support block 334 and the motor 337 are mounted on a straight moving table 338. The driving-side rotation support member 331 in rotation can move straight by a straight driving motor 339. A sensor dog 347 is attached to the end portion of the shaft 332, and a cylindrical member rotation count sensor 346 counts the number of turns of the shaft 332. Accordingly, it is possible to count the number of turns of the sheet film 301 wound on the cylindrical member 320.

FIG. 29B is a view showing a portion to the left of FIG. 29A.

A tubular mold member 341 is supported by a support member 344. This support member 344 has, e.g., a V-shaped member (not shown) and supports and positions the tubular mold member 341 by this V-shaped member. In this way, the tubular mold member 341 is set coaxially with the cylindrical member 320 shown on the right-hand side of FIG. 30A positioning member 343 positions the tubular mold member 341 so that the tubular mold member 341 does not protrude. This positioning member 343 can vertically move by a cylinder 342. The cylindrical member 320 on which the sheet film 301 is wound is held by the rotation holding member 331 shown in FIG. 29A, moved straight by the straight driving motor 339, and inserted into the tubular mold member 341. In this state, the positioning member 343 is moved down by the cylinder 342.

When the driving-side rotation support member 331 retreats after the insertion is completed, the positioning member 343 rises to prevent deviation of the cylindrical member 320. Consequently, the winding of the film onto the cylindrical member 320 and the insertion into the tubular mold member 341 are completed.

Figure 30A:
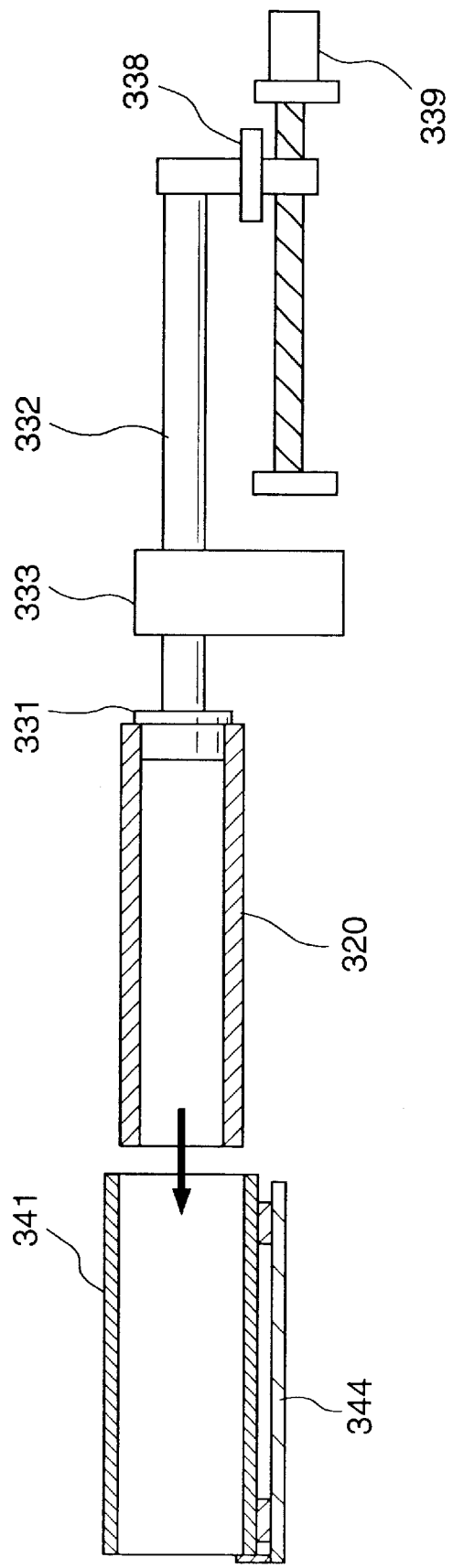
FIG. 30A is a schematic view plainly showing the overall arrangement of the structures shown in FIGS. 29A and 29B.
Figure 30B:
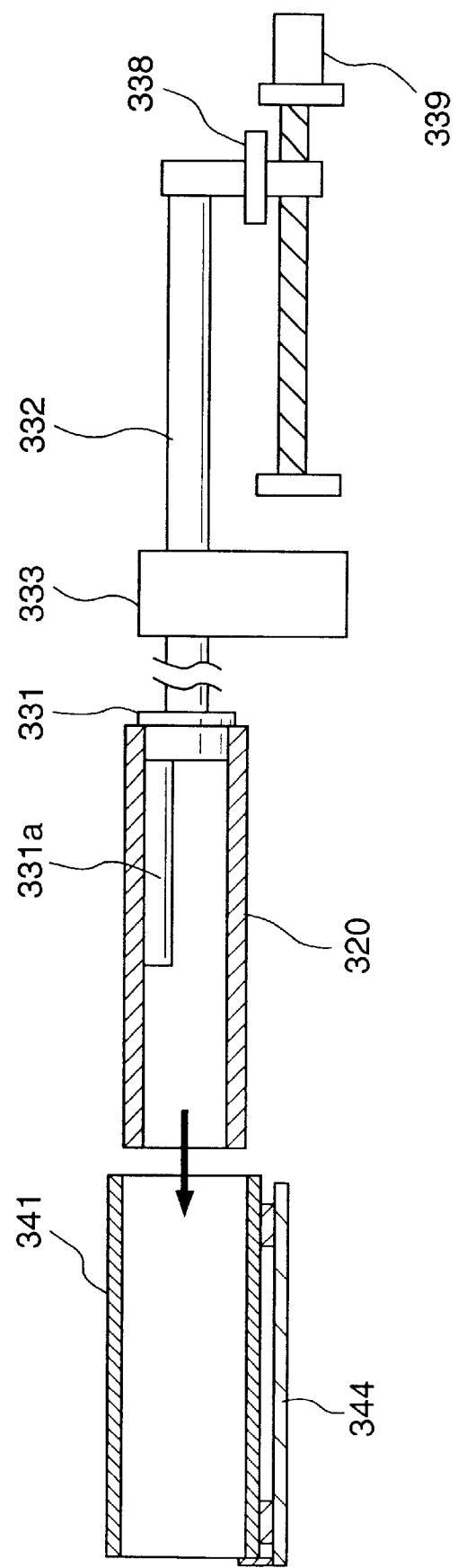
FIG. 30B is a schematic view plainly showing the overall arrangement of the structures shown in FIGS. 29A and 29B.
Figure 30C:
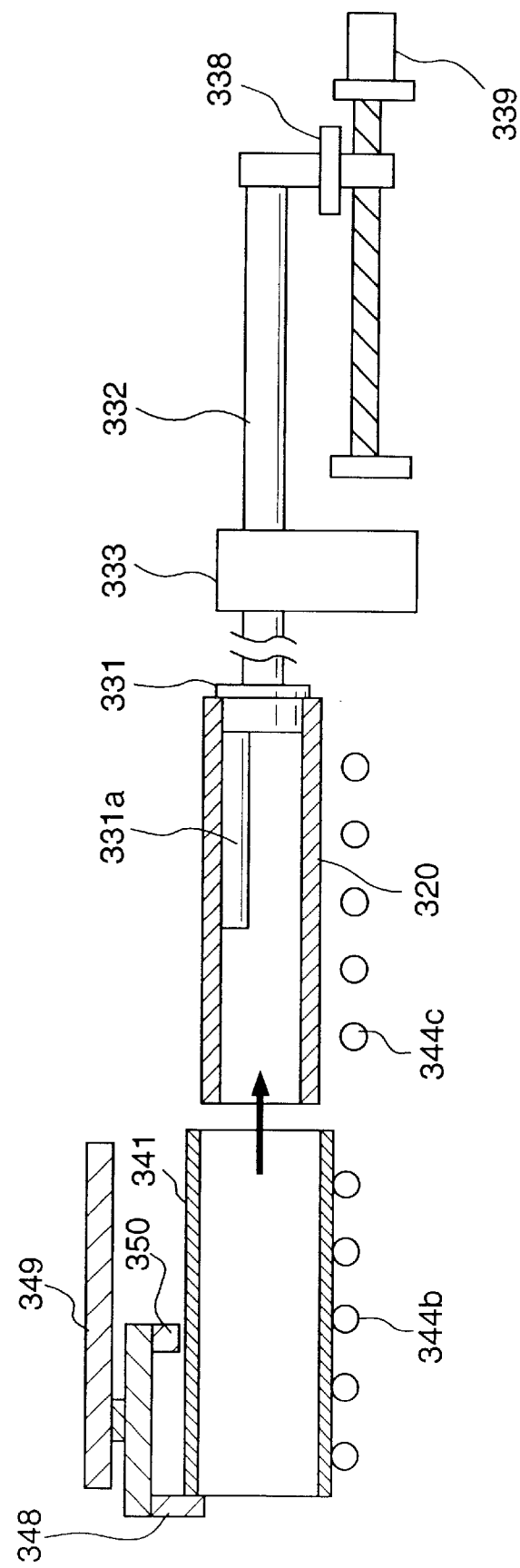
FIG. 30C is a schematic view plainly showing the overall arrangement of the structures shown in FIGS. 29A and 29B.
Figure 30D:
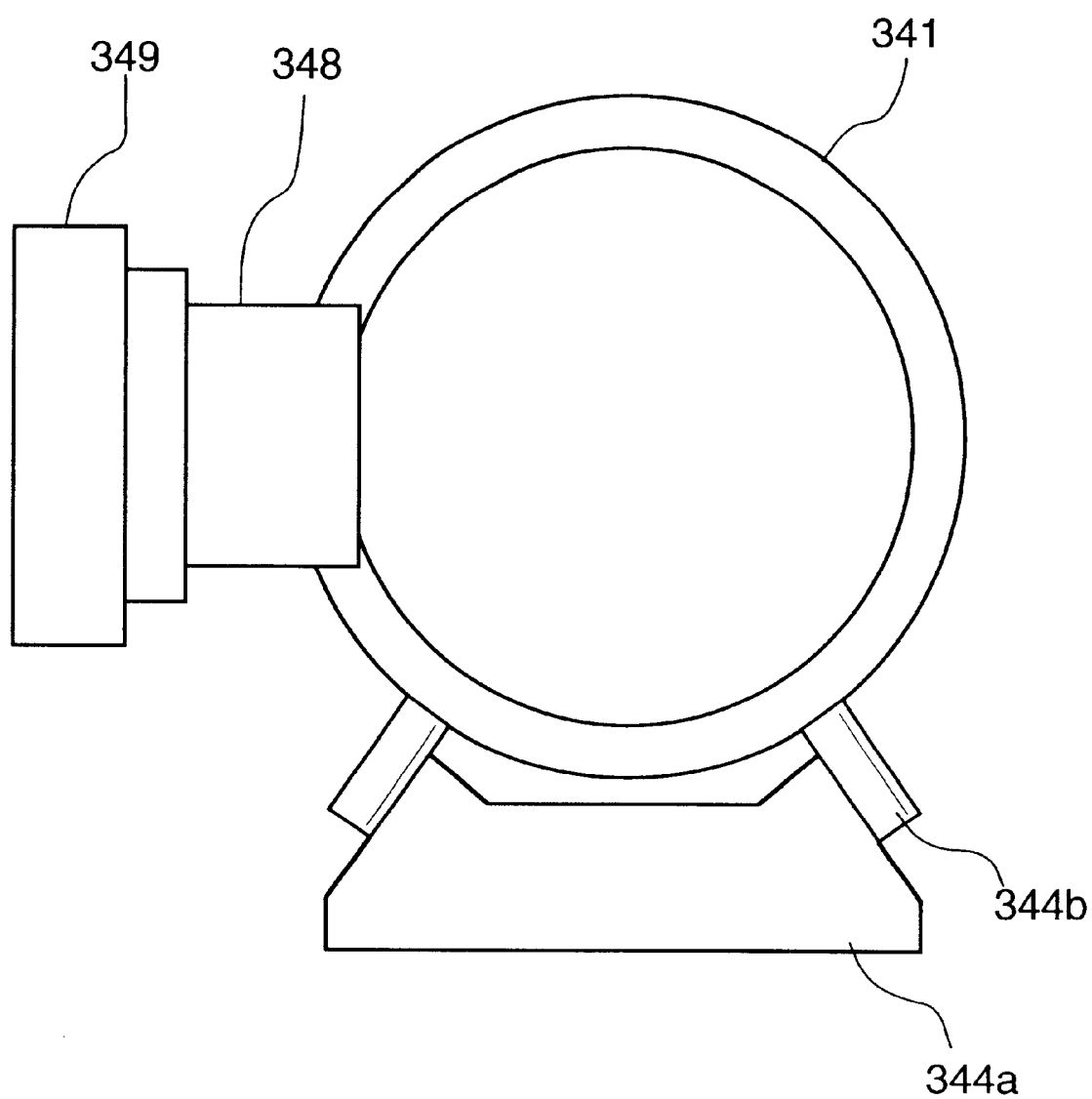
FIG. 30D is a view showing the left-hand side of FIG. 30C.

As shown in FIGS. 30C and 30D, the support member 344 includes rollers 344b for slidably supporting the tubular mold member 341 and rollers 344c for slidably supporting the cylindrical member 320. The rollers 344b are attached in the shape of V to a support plate 344a. This allows the tubular mold member 341 to slide while being positioned. A returning member 350 attached to a push cylinder 349 is driven by a cylinder (not shown) and brought into contact with the front end portion of the tubular mold member 341. As the push cylinder 349 moves backward, the cylindrical member 320 and the tubular mold member 341 fitted on it are returned toward the rollers 344b.

The operation will be described below.

FIG. 31 is a flow chart showing an outline of the overall operation.

The first step is mold setting in which the operator sets the cylindrical member 320 and the tubular mold member 341 (step S31). The sheet film 301 is unwound from the film roll material 302 (step S32), drawn by suction by the suction holes formed in the cylindrical member 320, and wound on the cylindrical member 320 (step S33). Before the winding is completed, the sheet film 301 is cut (step S34), and the cut sheet film 301 is further wound on the cylindrical member 320 (step S35), thereby completing the winding (step S36) The cylindrical member 320 on which the sheet film 301 is wound is inserted into the tubular mold member 341 (step S37) to complete the whole procedure by the winding apparatus.

In the next step, the sheet film 301 is heat-molded into a tubular film by a heating apparatus (not shown). Additionally, the two end portions that include portions corresponding to the suction holes and are functionally unnecessary in a product are cut by a cutting apparatus (not shown), thereby completing the desired tubular film.

Figure 32:
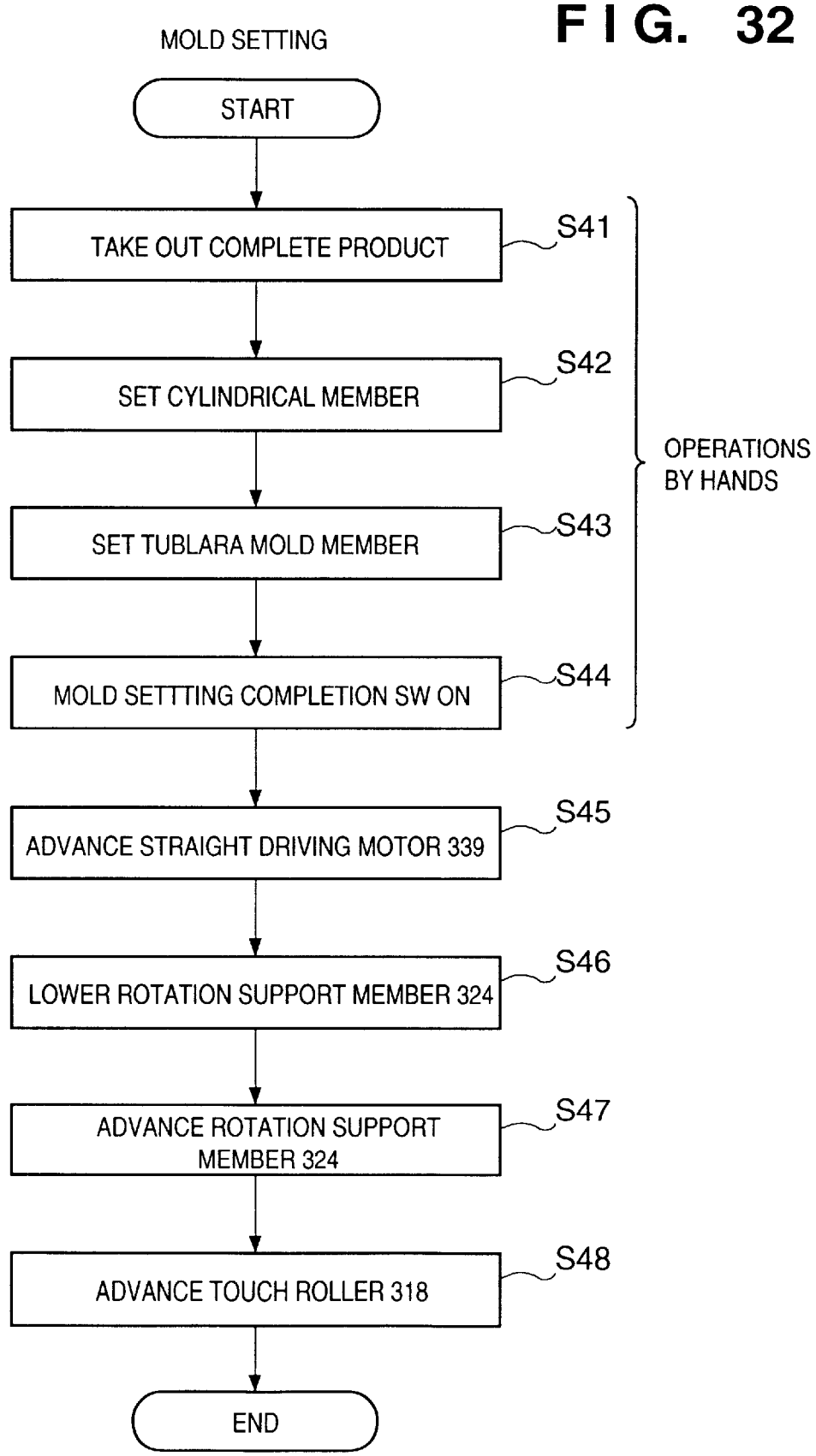
FIG. 32 is a flow chart showing the steps of mold setting.

FIG. 32 is a flow chart for explaining details of the mold setting step.

First, the operator takes out from the apparatus the complete product in which the cylindrical member 320 having the sheet film 301 wound on it is inserted into the tubular mold member 341 (step S41). The operator sets the cylindrical member 320 in an apparatus (step S42) and sets the tubular mold member 341 (step S43). When the mold setting is complete, the operator presses a mold setting completion switch to start automatic operation (step S44).

First, the straight driving motor 339 advances to move the driving-side rotation support member 331 forward (step S45). The rotation support member 324 is moved down by the cylinder 328 for vertically moving the rotation support member 324 (step S46). The cylinder 340 moves the rotation support member 324 forward to sandwich the cylindrical member 320 between the driving-side rotation support member 331 and the rotation support member 324, allowing the cylindrical member 320 to be rotated by the cylindrical member rotating motor 337 (step S47). The touch roller 318 then advances to push the sheet film 301 against the cylindrical member 320 (step S48).

Figure 33:
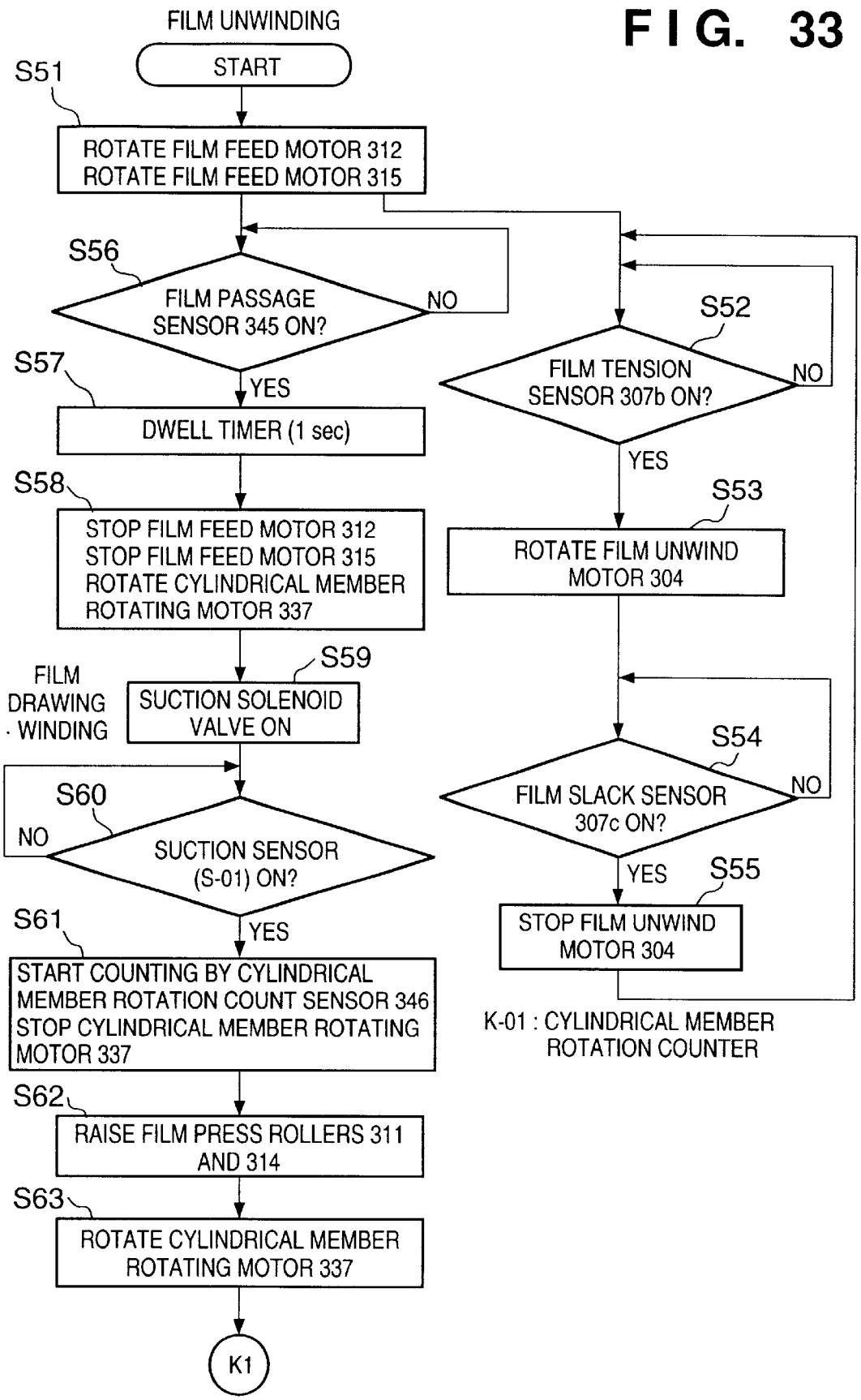
FIG. 33 is a flow chart showing the steps of film unwinding.

FIG. 33 is a flow chart for explaining details of the film unwinding step and the film drawing-winding step.

When the mold setting step is complete, the film winding step starts.

When the film feed driving motors 312 and 315 are rotated to convey the sheet film 301 (step S51), the arm 307a attached to one end of the dancer roller 307 activates the film tension sensor 307b (step S52). When the sensor 307b is activated (YES in step S52), the film unwind motor 304 rotates to rotate the film roll material 302 and feed the sheet film 301 (step S53). When the film roll member 302 rotates, the arm 307a attached to one end of the dancer roller 307 activates the film slack sensor 307c (step S54). When the sensor 307c is activated (YES in step S54), the film unwind motor 304 stops to stop the film roll material 302 (step S55).

The film feed driving motors 312 and 315 are rotated to convey the sheet film 301. When the film passage sensor 345 senses the sheet film 301, the film feed driving motors 312 and 315 are stopped after an elapse of about one second (step S57). Consequently, the end portion of the sheet film 301 passes by the touch roller 318 and comes to the upper surface of the cylindrical member 320. The cylindrical member rotating motor 337 is rotated (step S58), and a suction solenoid valve (not shown) connected to a suction source (not shown) is activated (step S59). When the cylindrical member 320 is set in the apparatus, the positions of the suction holes 321 are unknown. However, when the suction holes 321 come in contact with the sheet film 301 by rotating the cylindrical member 320 while a suction operation is performed, the suction holes 321 draw the film by suction, and a suction sensor S-01 (not shown) installed inside a suction path operates (step S60). By stopping the cylindrical member rotating motor 337 at that position, the suction holes 321 of the cylindrical member 320 and the end portions of the sheet film 301 can be aligned.

The cylindrical member rotating motor 337 again rotates from that position, and at the same time the cylindrical member rotation count sensor 346 senses the rotation of the cylindrical member 320, counting turns of the cylindrical member 320 (step S61). Subsequently, the film press rollers 311 and 314 pressing the sheet film 301 against the film feed driving rollers 310 and 313 are raised (step S62). This is to wind up the sheet film 301 only by the rotational force of the cylindrical member 320, in order to prevent elongation and wrinkles of the sheet film 301 caused by the difference between the feed rates of the film feed driving motor and the cylindrical member rotating motor 337.

Figure 34:
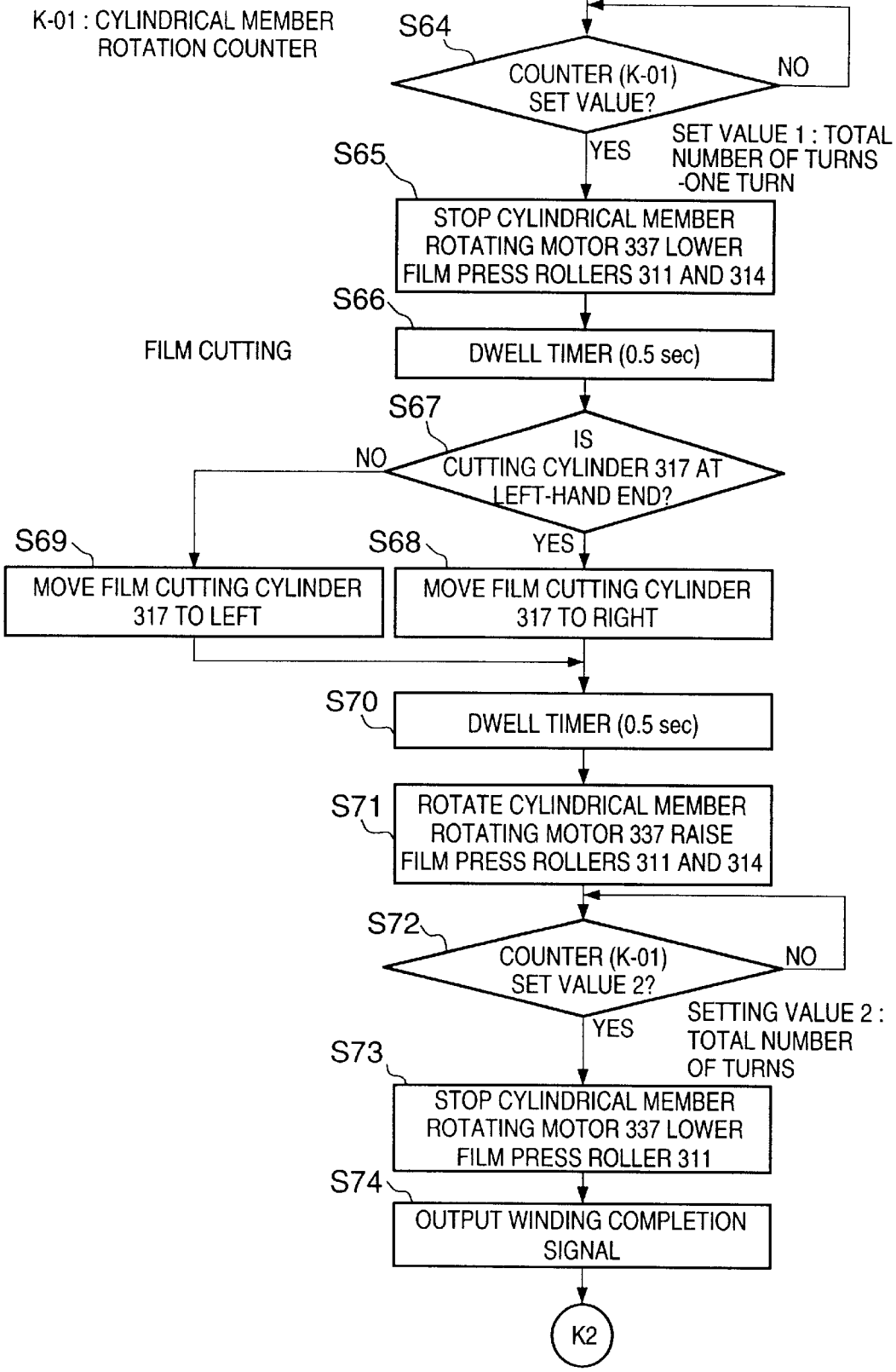
FIG. 34 is a flow chart showing the steps of film winding and cutting.

FIG. 34 is a flow chart showing the film winding and cutting steps.

The cylindrical member rotating motor 337 rotates the cylindrical member 320 to wind the sheet film 301 on the cylindrical member 320. The cylindrical member rotation count sensor 346 counts the number of turns of the cylindrical member. If the cylindrical member rotation count sensor 346 counts the number of turns smaller by one than the total number of turns, e.g., counts two turns when the total number of turns is 3 (counter setting 1), the cylindrical member rotating motor 337 is stopped (step S64). This is so because the distance from the position of the end portion of the sheet film 301, when the end portion is conveyed to the upper surface of the cylindrical member, to the rotary cutter 316 is approximately the length of one turn. When the cylindrical member rotating counter reaches setting 1, the cylindrical member rotating motor 337 is stopped, and the film press rollers 311 and 314 are moved down to press the sheet film 301 (step S65). The cutting cylinder 317 is driven to cut the sheet film 301 by the rotary cutter 316. This cutting cylinder 317 cuts the sheet film 301 one way. Therefore, if the cutting cylinder 317 is at the left-hand end, the cutting cylinder 317 moves to the right; if the cutting cylinder 317 is at the right-hand side, the cutting cylinder 317 moves to the left (steps S67 to S69).

Subsequently, the film press rollers 311 and 314 are moved up, and the cylindrical member rotating motor 337 is again rotated to continue the winding operation (step S71). When the cylindrical member rotation counter reaches the desired number of turns (setting 2) (YES in step S72), the cylindrical member rotating motor 337 is stopped, and the film press rollers 311 and 314 are moved down to complete the film winding step (steps S73 and S74).

Figure 35:
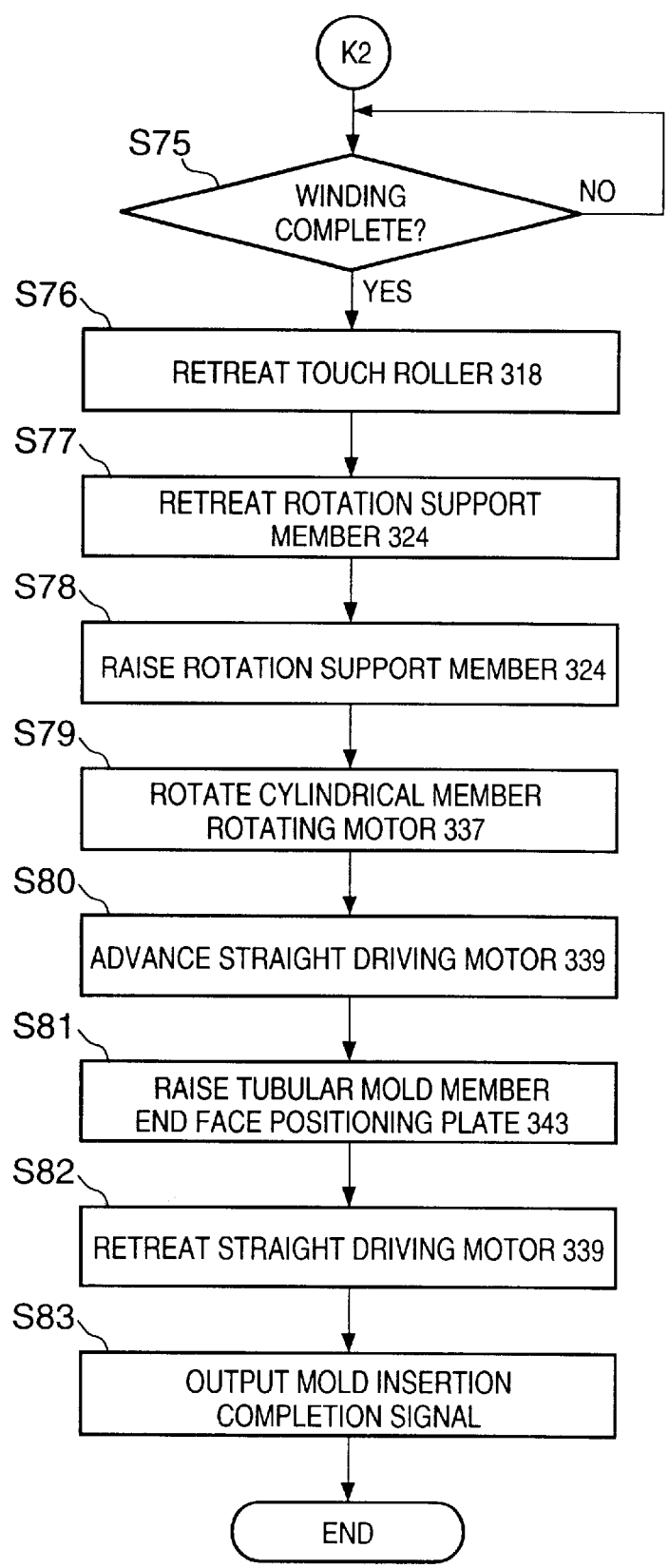
FIG. 35 is a flow chart showing the steps of mold insertion.
Figure 36:
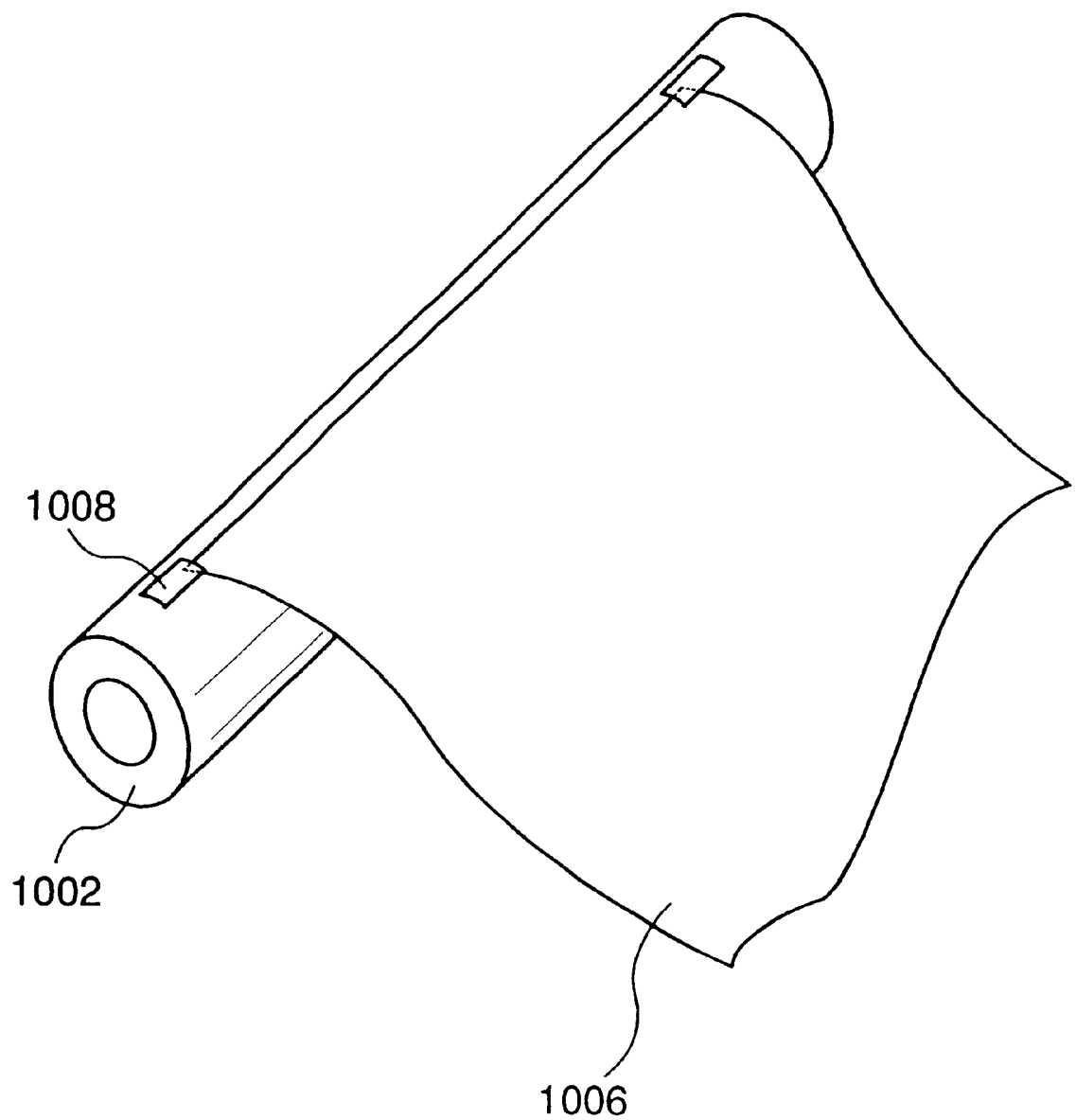
FIG. 36 is a view showing one prior art.

FIG. 35 is a flowchart showing the mold insertion step.

When the winding is complete (YES in step S75), the touch roller 318 retreats (step S76), and the rotation support member 324 retreats and rises (steps S77 and S78).

While the driving-side rotation support member 331 is rotated to rotate the cylindrical member 320 (step S79), the cylindrical member 320 having the film wound on it is advanced and inserted into the tubular mold member 341 by the straight driving motor 339 (step S80). The cylindrical member 320 is rotated to prevent the winding end portion of the sheet film 301 from being caught by the inner surface of the tubular mold member 341. When the cylindrical member 320 is moved to the front end by the straight driving motor 339, the tubular mold member end face positioning plate 343 is raised (step S81), and the driving-side rotation support member 331 is retreated by the straight driving motor 339 (step S82) In this manner, the mold insertion step is completed, and this completes the whole automatic process (step S83).

In this embodiment as described above, a film can be stably wound up by a simple arrangement without producing any loose winding.

Also, portions functionally unnecessary in a product are drawn by suction. Therefore, even when projections are formed after heat-molding in those portions of a film which correspond to suction holes, the film can be used as a product with no problem.

Since the tubular film manufacturing apparatus according to this embodiment has the above arrangement, it is possible to perform automatic winding and obtain a high-accuracy tubular film at low cost.

Fifth Embodiment

In the above fourth embodiment, the trailing end portion of a sheet film wound on the cylindrical member 320 is pressed against the cylindrical member 320 by the touch roller 318. In this fifth embodiment, an elastic press member such as a brush presses the trailing end portion of a sheet film against a cylindrical member.

Conventionally, when a sheet film is wound on a cylindrical member and inserted into a tubular mold member, the film end portion rises by the elasticity of the film if the winding end portion is not fixed. Consequently, when inserted into the tubular mold member the film is peeled from its trailing end portion or removed from the cylindrical member. This makes insertion difficult. In the above fourth embodiment, therefore, the cylindrical member 320 is rotated to prevent the end portion of the film from rising from the cylindrical member. This fifth embodiment further facilitates inserting a sheet film wound on a cylindrical member into a tubular mold member.

Figure 37:
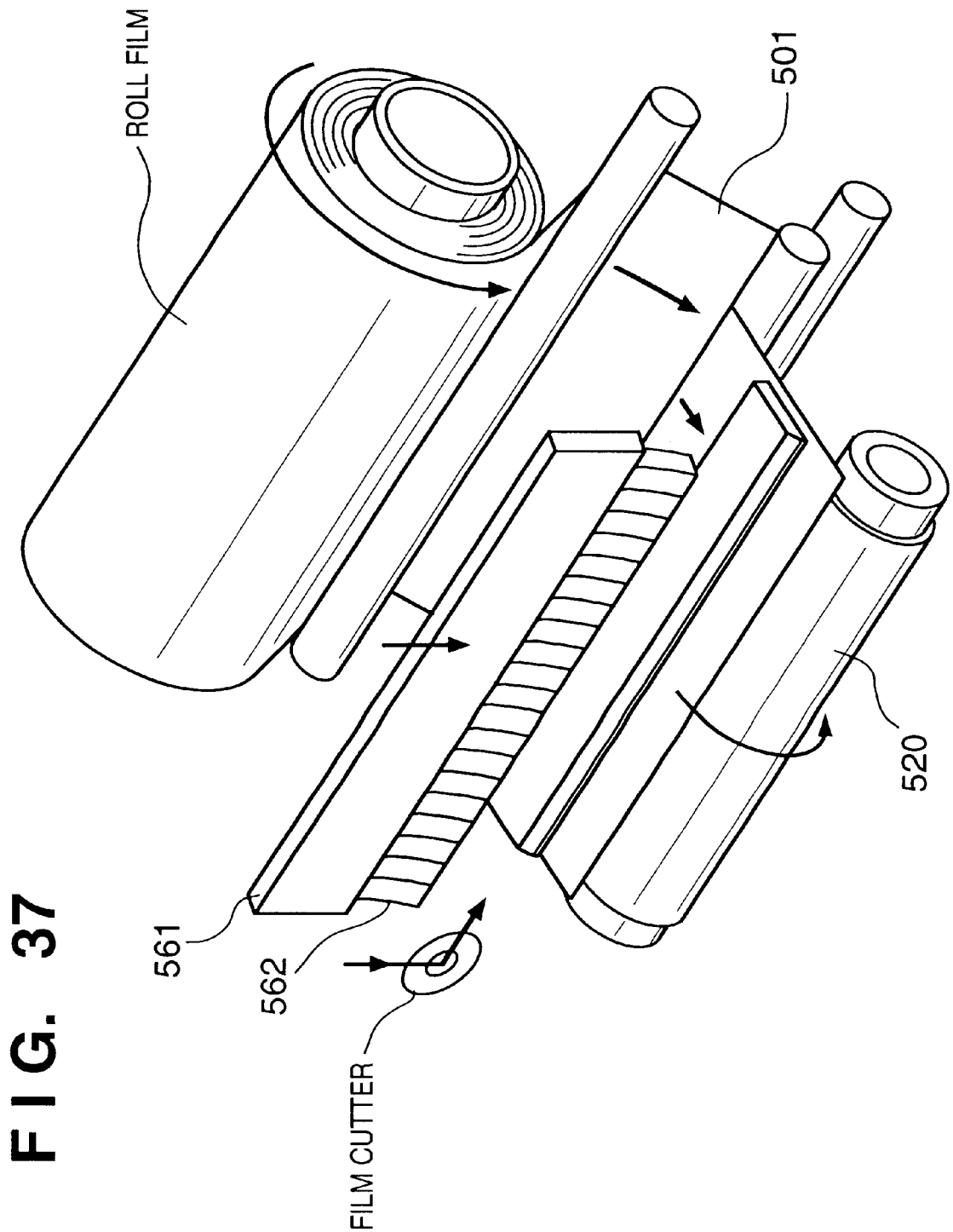
FIG. 37 is a view showing a cylindrical member, press member, and sheet film used in the fifth embodiment.

FIG. 37 is a view showing a cylindrical member 520 and a sheet film 501 used in this embodiment. The sheet film 501 is wound on the cylindrical member 520, inserted into a tubular mold member 541 (FIG. 40), and heat-molded into a tubular film by a heating apparatus (not shown).

Figure 38:
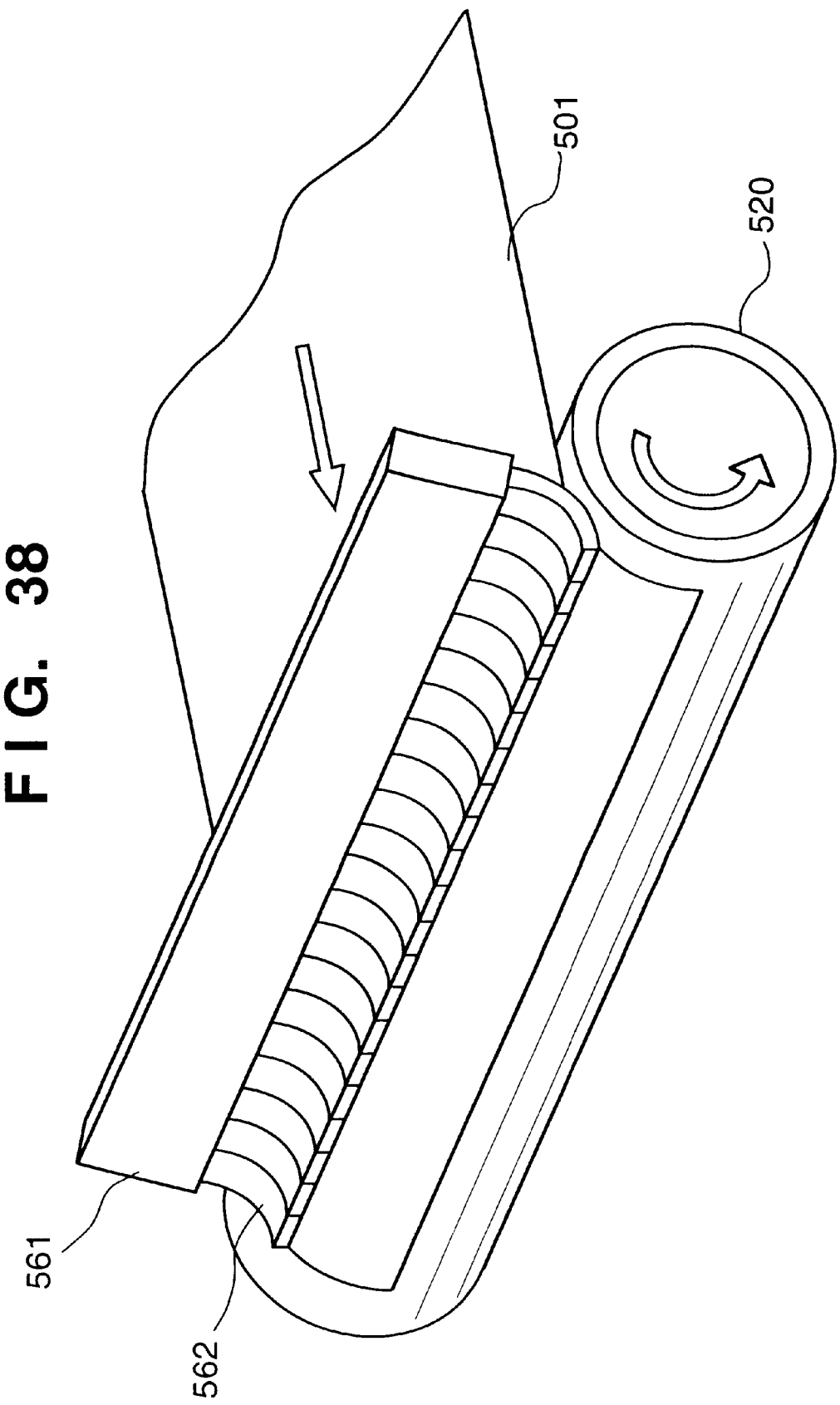
FIG. 38 is a view showing the state in which the sheet film is wound on the cylindrical member.

FIG. 38 is a view showing the state in which the sheet film 501 is wound on the cylindrical member 520.

The two end portions of the sheet film 501 fed from a film feeder (not shown) are held by suction by suction holes formed in the cylindrical member 520. The cylindrical member 520 is rotated by a rotating means (not shown) to wind the sheet film 501 on the cylindrical member 520.

A press member 560 is composed of a holder 561 and a brush 562 of thin bristles of, e.g., nylon. Examples of the material of the brush 562 are nylon, polypropyrene, and vinyl chloride. Although the bristle diameter is 0.3 mm or less, it can also be larger than 0.3 mm depending on the material of the film. The bristle length is determined by the film pressing force and the bristle diameter. When the bristle diameter is small, the bristle length is preferably short. However, the bristle length must be 30 mm or more because when the film is inserted into the tubular mold member the bristles must deform along the insertion direction.

The overall length of the press member 560 is made able to cover the whole length of the film 501 in the axial direction of the cylindrical member 520.

Figure 39:
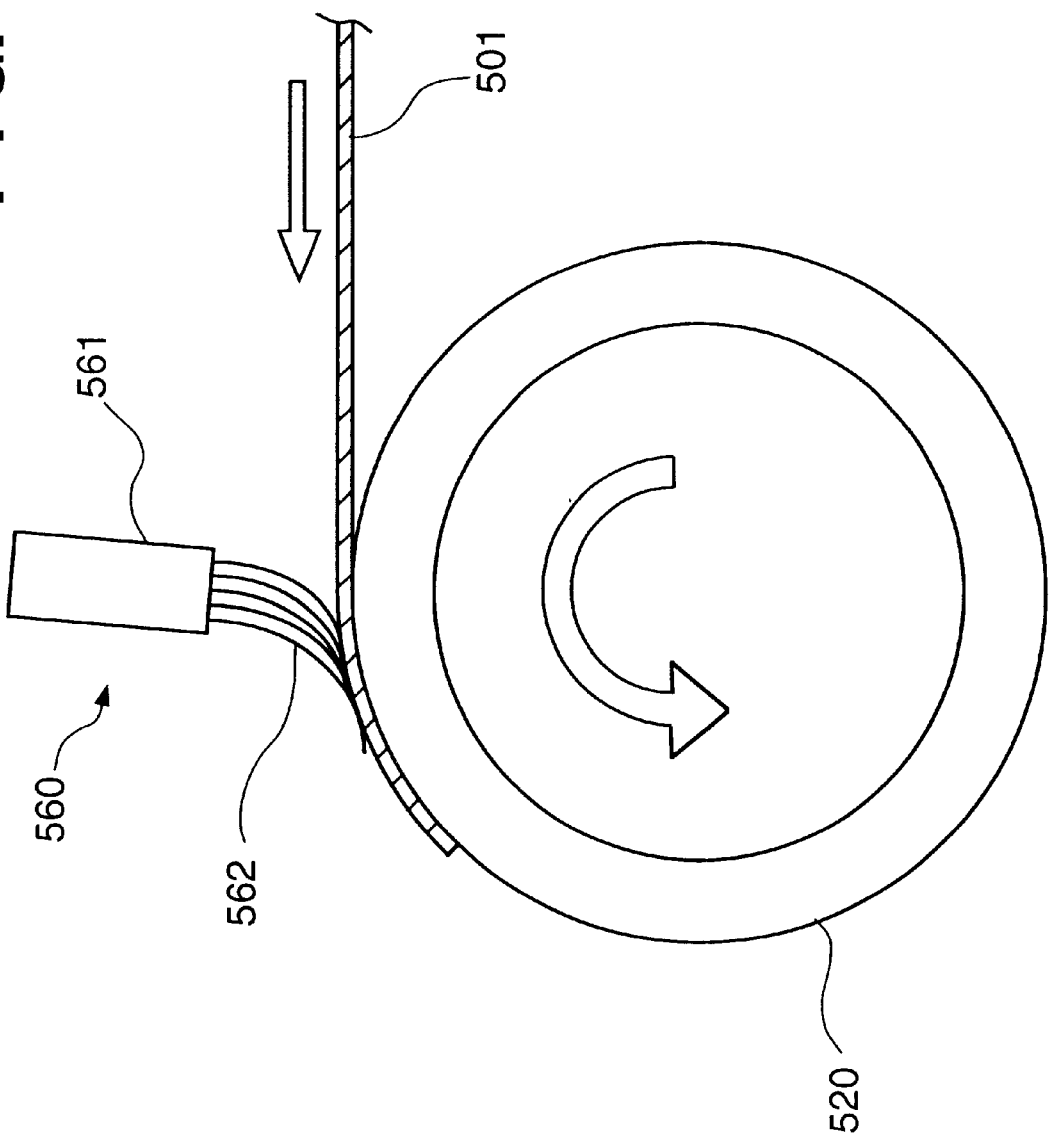
FIG. 39 is a side view showing the state in which the sheet film is wound on the cylindrical member.

FIG. 39 is a side view showing FIG. 38 in the axial direction.

The holder 561 is mounted to be slightly inclined above the cylindrical member 520. This is to deform the brush 562 in the winding direction when the press member 560 moves down.

The brush 562 elastically deforms along the winding direction indicated by an arrow in FIG. 39. By the pressing force of this brush 562, the film 501 is closely wound with no wrinkles on the cylindrical member 520.

When the sheet film 501 is completely wound on the cylindrical member 520, the film 501 is cut by a cutting means (not shown) and inserted into the tubular mold member 541.

Figure 40:
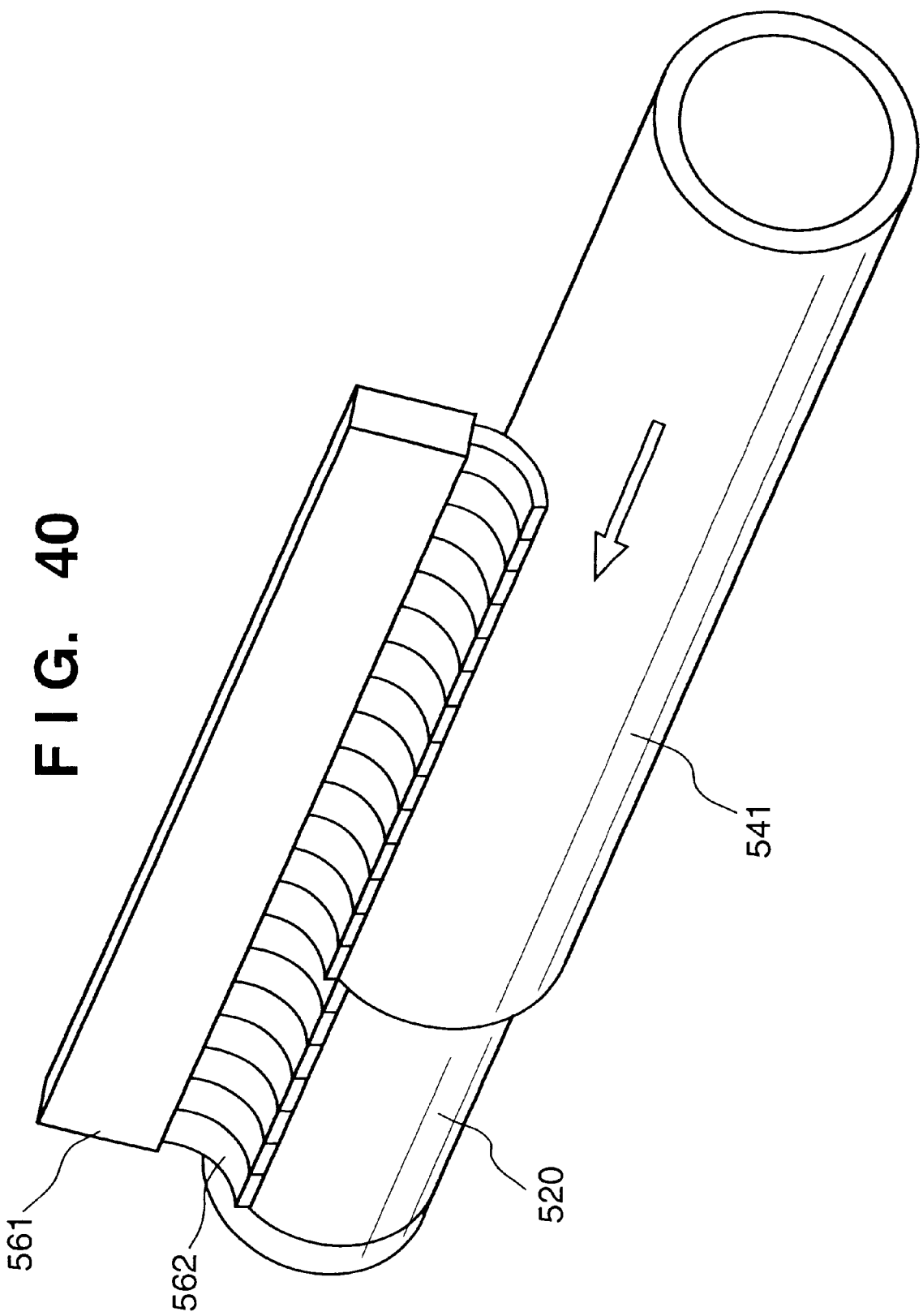
FIG. 40 is a view showing the state in which a tubular mold member is being fitted.

FIG. 40 is a view showing the state in which the film is being inserted into the tubular molding member 541.

The inner surface of the cylindrical member 520 is supported by a support means (not shown). The tubular mold member 541 is mounted on a guide which is so adjusted that the axis of the tubular mold member 541 aligns with the axis of the cylindrical member 520, and fitted on the cylindrical member 520 by a sliding means (not shown). Since the brush 562 is held in the state when the film is wound, the brush 562 elastically deforms in the winding direction as shown in FIG. 39 and presses the film 501. When the cylindrical member 520 is inserted into the tubular mold member 541, the brush 562 elastically deforms along the direction of insertion. However, in a portion not covered with the tubular mold member 541, the film 501 is pressed against the cylindrical member 520 by the brush 562. Accordingly, the film 501 does not deviate in the insertion direction when inserted into the tubular mold member 541.

Figure 41:
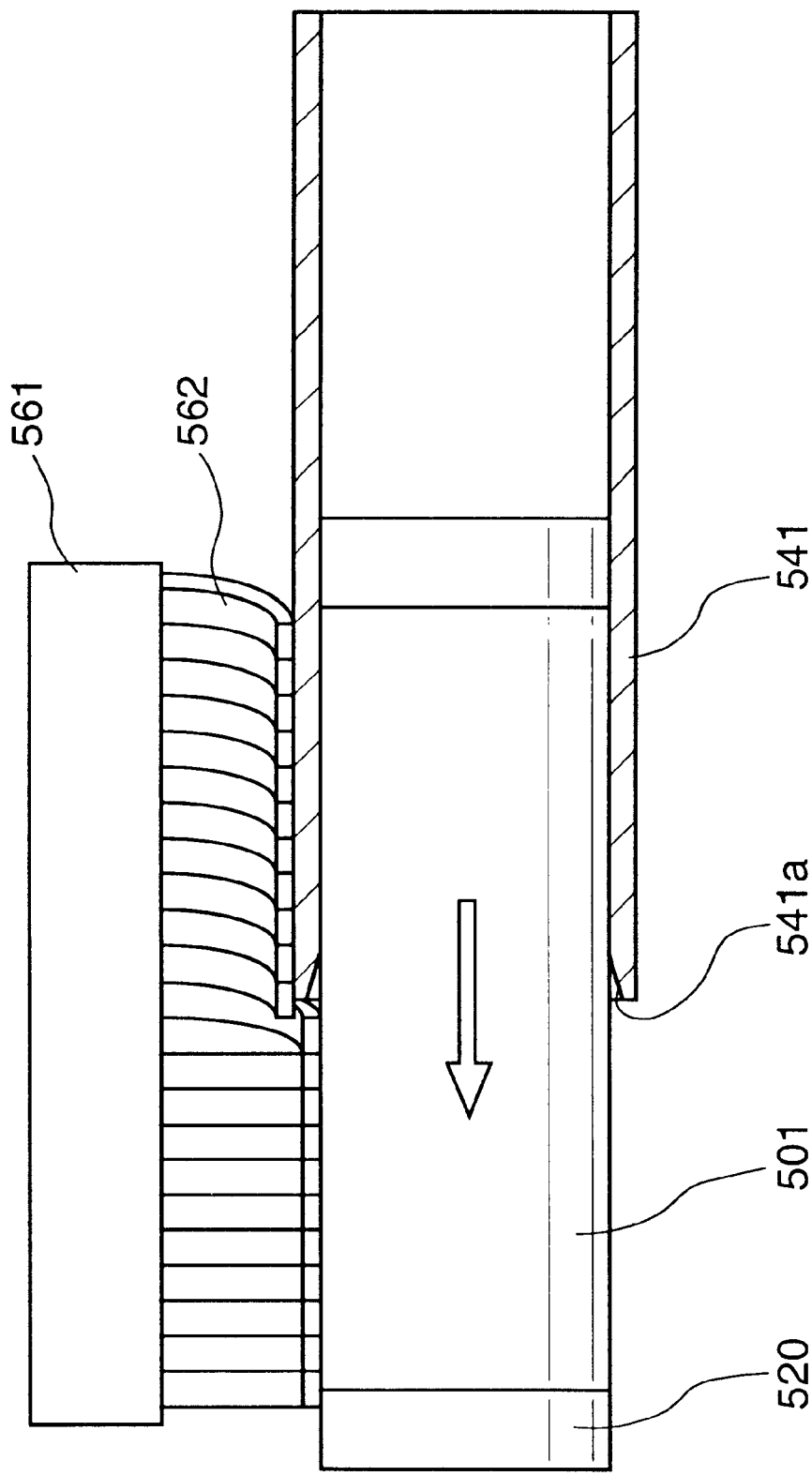
FIG. 41 is a view showing the state in which the tubular mold member is being fitted.

FIG. 41 is a front view of FIG. 40.

A chamfered portion 541a is formed on the inner circumferential surface at the end of the tubular mold member 541. This allows smooth insertion with no sticking at the beginning of insertion.

Figure 42:
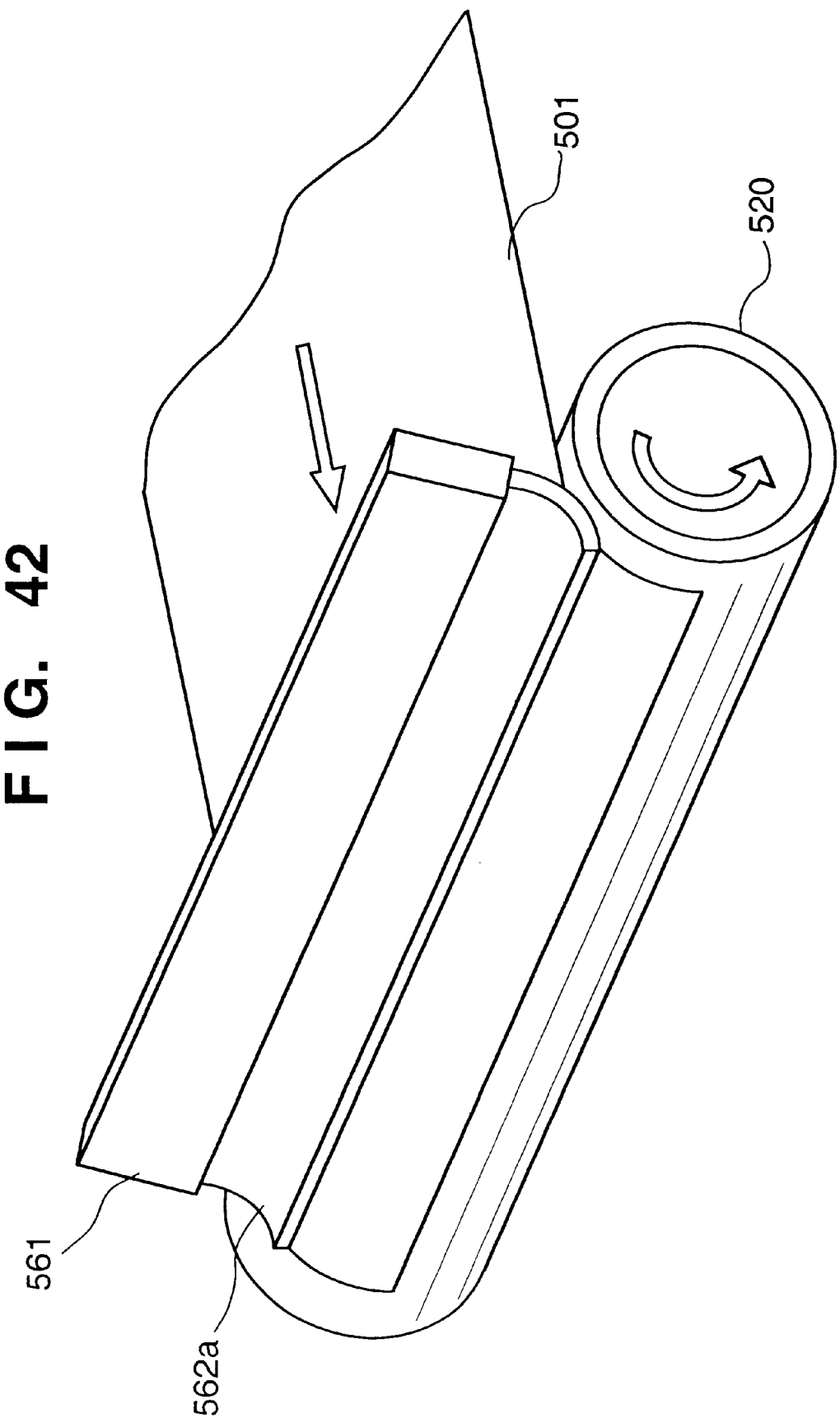
FIG. 42 is a view showing the state in which the sheet film is wound by a blade.

FIG. 42 is a view showing the case in which a thin rubber blade is used as an elastic deformation member.

A blade 562a is attached to the holder 561. When the sheet film 501 is fed and held by suction holes in the cylindrical member 520, the blade 562 comes down and presses the sheet film 501 when it is wound. As a consequence, the sheet film 501 is closely wound on the cylindrical member 520. The holder 561 is mounted to be slightly inclined above the cylindrical member 520. This is to deform the blade 562a in the winding direction when the press member 560 descends.

Examples of the material of the blade 562a are urethane rubber, fluorine rubber, and foamed urethane rubber. The thickness and height of the blade 562a are 4 determined by the pressing force. In this embodiment, a urethane rubber sheet about 1 mm high and 20 to 25 mm thick is used.

Figure 43:
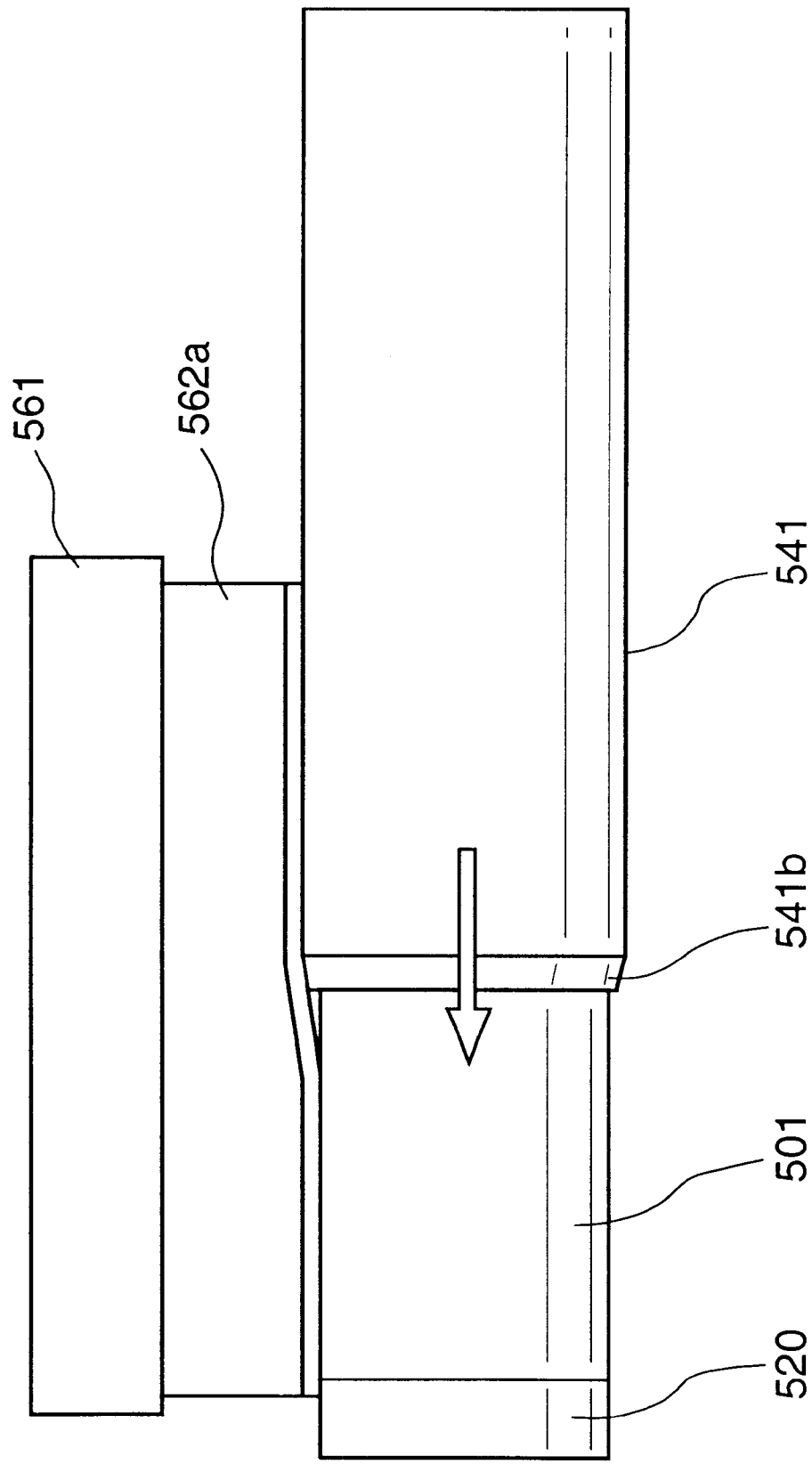
FIG. 43 is a view showing the state in which the tubular mold member is being fitted.

FIG. 43 is a front view of FIG. 42.

To push the blade 562a upwards when the tubular mold member 541 advances, a tapered chamfered portion 541b is formed at the front end portion of the outer circumferential surface of the tubular mold member 541. This allows smooth advancement of the tubular mold member 541. Also, a portion of the sheet film 501 immediately before the tubular mold member 541 in its advancing direction is pressed by the blade 562a. If this chamfered portion 541b is not formed, the blade 562a at the front end portion of the tubular mold member 541 floats from the sheet film 501. This may make smooth insertion impossible.

In the subsequent step, the sheet film 501 is heat-molded into a tubular film by a heating apparatus (not shown). Finally, the two end portions which include portions corresponding to the suction holes and are functionally unnecessary in a product are cut by a cutting apparatus (not shown) to complete the desired tubular film.

In the fifth embodiment, a brush or a blade is used to press the end portion of a sheet film against the cylindrical member. However, the present invention is not limited to the use of a brush or a blade. For example, it is naturally possible to use another elastic material such as sponge.

In this embodiment as described above, it is possible to dependably press the end portion of a sheet film with a simple arrangement and smoothly insert the sheet film wound on the cylindrical member 520 into the tubular mold member 541 without any deviation.

Since the chamfered portion is formed on the inner circumferential surface of the tubular mold member, smooth insertion can be performed with no sticking at the beginning of insertion.

Also, the chamfered portion formed on the outer circumferential surface of the tubular mold member allows the film to be reliably pressed at the front end portion of the tubular mold member. This makes smooth insertion feasible.

As described above, this embodiment makes smooth insertion possible and can manufacture a low-cost tubular film.

In the above embodiments as described above, molding can be performed within short time periods, so a high-accuracy tubular film can be obtained at low cost.

Also, a high-accuracy tubular film can be obtained at low cost because automatization is possible.

Additionally, high workability enables a tubular film to be accurately cut at low cost.

Since winding of a sheet film can be automated, a high-accuracy tubular film can be obtained at low cost.

Furthermore, a cylindrical member having a sheet film wound on it can be smoothly inserted into a tubular mold member.

The present invention is not limited to the above embodiments and various changes and modifications can be made within the spirit and scope of the present invention. Therefore, to apprise the public of the scope of the present invention the following claims are made.

What is claimed is:

1. A tubular film manufacturing method comprising the steps of:
    winding a sheet film on a cylindrical member;
    cutting a winding end portion of the sheet film;
    inserting the cylindrical member, on which the sheet film is wound, into a tubular mold member; and
    molding the sheet film into a tubular film by heating the sheet film.
    wherein, in the inserting step, the cylindrical member is inserted into the tubular mold member while the winding end portion of the sheet film is pressed by an elastically deformable brush press member.

* * * * *

UNITED STATES PATENT AND TRADEMARK OFFICE
CERTIFICATE OF CORRECTION

PATENT NO.    : 6,632,312 B1
DATED         : October 14, 2003
INVENTOR(S)   : Hitoshi Katsuyama It is certified that error appears in the above-identified patent and that said Letters Patent is hereby corrected as shown below:

<u>Drawings</u>.
Sheet 27, Fig. 27, "TABULAR" should read -- TUBULAR --.
Sheet 37, Fig. 32, "TUBLARA" should read -- TUBULAR --.

<u>Column 20</u>,
Line 64, "polypropyrene," should read -- polypropylene, --.

Signed and Sealed this

Ninth Day of March, 2004

JON W. DUDAS
*Acting Director of the United States Patent and Trademark Office*